United States Patent [19]
Brewster et al.

[11] Patent Number: 5,870,464
[45] Date of Patent: Feb. 9, 1999

[54] INTELLIGENT INFORMATION ROUTING SYSTEM AND METHOD

[75] Inventors: James A. Brewster; Srikanth Subramanian, both of Plano; Thomas D. Hite, Allen; Gene W. Lee; Gary L. Brannick, both of Plano, all of Tex.

[73] Assignee: AnswerSoft, Inc., Plano, Tex.

[21] Appl. No.: 747,831

[22] Filed: Nov. 13, 1996

Related U.S. Application Data

[60] Provisional application No. 60/006,663 Nov. 13, 1995.
[51] Int. Cl.[6] .................................................. H04M 3/00
[52] U.S. Cl. ........................ 379/219; 379/201; 379/220; 379/229; 395/685
[58] Field of Search ................................. 379/201, 219, 379/220, 221, 93.29, 211, 230, 229, 265, 309; 395/500, 685, 680

[56] References Cited

U.S. PATENT DOCUMENTS

| | | | |
|---|---|---|---|
| 4,747,127 | 5/1988 | Hansen et al. | 379/94 |
| 4,878,240 | 10/1989 | Lin et al. | 379/67 |
| 5,168,446 | 12/1992 | Wiseman | 705/37 |
| 5,202,963 | 4/1993 | Zelley | 395/325 |
| 5,206,903 | 4/1993 | Kohler et al. | 379/309 |
| 5,289,368 | 2/1994 | Jordan et al. | 364/401 |
| 5,404,528 | 4/1995 | Mahajan | 395/685 |
| 5,546,452 | 8/1996 | Andrews et al. | 379/219 |
| 5,590,188 | 12/1996 | Crockett | 379/225 |
| 5,604,896 | 2/1997 | Duxbury et al. | 395/500 |
| 5,627,888 | 5/1997 | Croughan-Peeren | 379/201 |
| 5,655,015 | 8/1997 | Walsh et al. | 379/201 |
| 5,689,799 | 11/1997 | Dougherty et al. | 455/2 |
| 5,727,156 | 3/1998 | Herr-Hoyman et al. | 395/200.49 |

*Primary Examiner*—Krista Zele
*Assistant Examiner*—Scott Wolinsky
*Attorney, Agent, or Firm*—Baker & Botts, L.L.P.

[57] ABSTRACT

An intelligent information router system comprising a telephony controller coupled to a private branch exchange through a link interface. The telephony controller may communicate with a handle manager and a script interpreter engine. The telephony controller may receive information from the link interface regarding telephone calls being placed to the private branch exchange. The telephony controller may initiate actions with the script interpreter engine that access information stored in a database through a database controller. In response to action of the script interpreter engine, the telephony controller may instruct the private branch exchange to route the call to an appropriate location within a company depending on the information received by the private branch exchange through automatic transmission of data or interaction with the calling party.

42 Claims, 11 Drawing Sheets

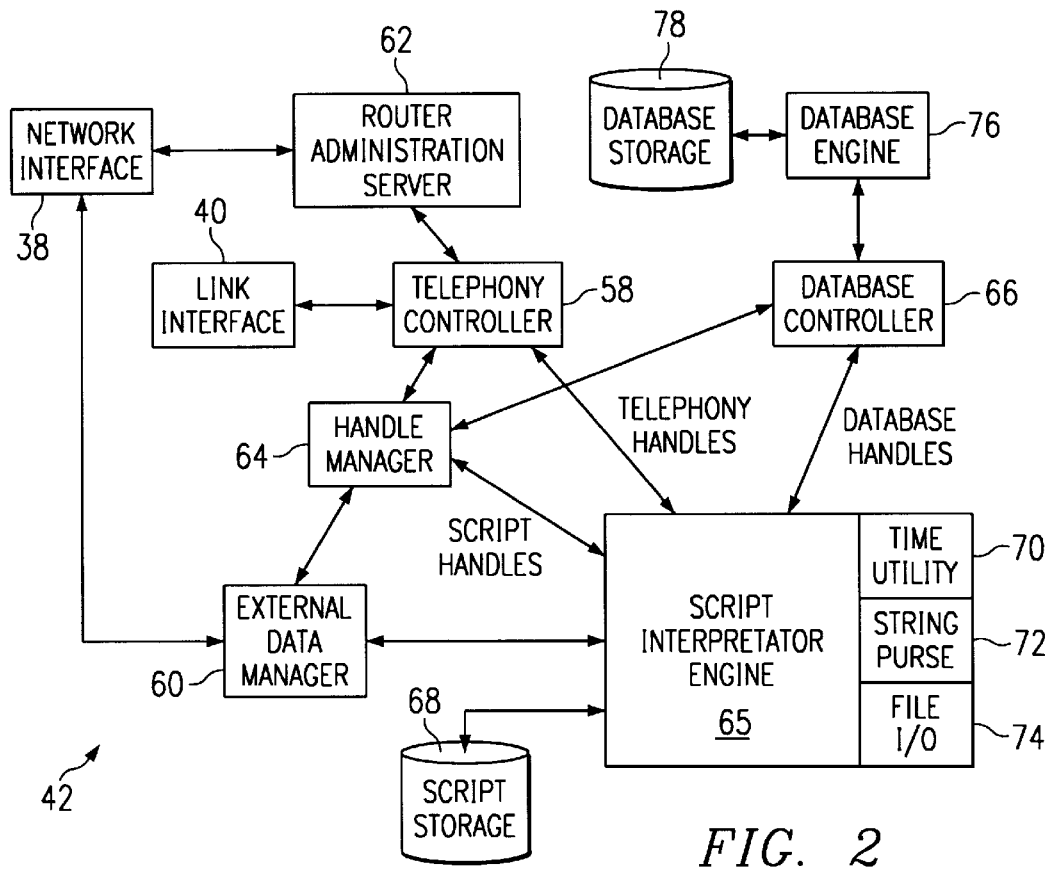
FIG. 2
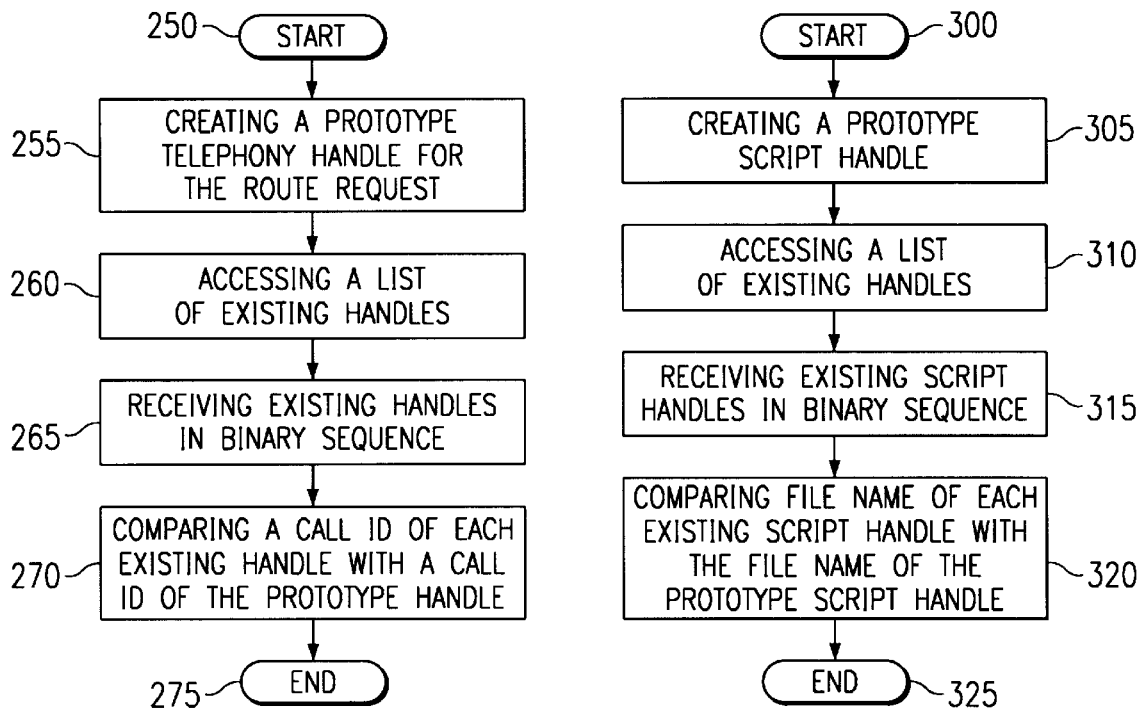
FIG. 3B
FIG. 3C

| | 601 | Agent can View? Modify? | | | Agent can View? Modify? |
|---|---|---|---|---|---|
| Test 1: | AccountNo | ☒ ☒ | Test 11: | Address | ☒ ☒ |
| Test 2: | LastName | ☒ ☒ | Test 12: | ZipCode | ☒ ☒ |
| Test 3: | FirstName | ☒ ☒ | Test 13: | City | ☒ ☒ |
| Test 4: | SocSecNum | ☒ ☒ | Test 14: | State | ☒ ☒ |
| Test 5: | AgentID | ☒ ☒ | Test 15: | Membership | ☒ ☒ |
| Test 6: | ForceExtension | ☐ ☐ | Numeric 1: | AcctBal | ☒ ☒ |
| Test 7: | CardNo | ☒ ☒ | Numeric 2: | NumCards | ☒ ☒ |
| Test 8: | Birthday | ☒ ☒ | Numeric 3: | | ☐ ☐ |
| Test 9: | HomePhone | ☒ ☒ | Numeric 4: | | ☐ ☐ |
| Test 10: | WorkPhone | ☒ ☒ | Numeric 5: | | ☐ ☐ |

Primary Key Definition
● None   ○ Field 1   ○ Field 1+2

602   604   606   Apply   608

:Ready    NUM

---

810

Find

Find What: [          ]   Start Find

809   Direction   Cancel
○ Up  ● Down

☐ Match Case:   Help

FIG. 9B

INTELLIGENT INFORMATION ROUTING SYSTEM AND METHOD

RELATED APPLICATIONS

This application claims the benefit of U.S. Provisional application Ser. No. 60/006663, filed Nov. 13, 1995.

TECHNICAL FIELD OF THE INVENTION

This invention relates in general to the fields of telecommunications and data processing and more particularly to an improved intelligent information routing system and method.

BACKGROUND OF THE INVENTION

Advances in interactive voice response systems and private branch exchanges have allowed for the development of systems which can interact with calling parties to solicit information in an automated fashion. In addition, modern database technology can allow for the characterization of a population in extremely fine detail. Finally, with the development of computer telephony interfaces, private branch exchanges and other private switching systems can be accessed and, in part, controlled by efficient and inexpensive personal computers and minicomputers. While all of these building blocks are in place, little work has been done to integrate these facilities to allow the use of the vast amounts of information stored in a company's database to be used to control the access to the company's staff through the telecommunications interfaces.

Accordingly, need has arisen for a system which responds in an intelligent fashion to information provided by a telecommunications system or other data provided by other systems to perform tasks in an automated fashion responsive to the information received.

SUMMARY OF THE INVENTION

In accordance with the teachings of the present invention, an intelligent information router system and method are provided that substantially eliminate or reduce problems associated with prior systems and methods. According to one embodiment of the present invention, an intelligent information router system is provided that comprises a telephony controller which is coupled to a private branch exchange through a link interface. The telephony controller communicates with a handle manager and a script interpreter engine. Telephony controller receives information from the link interface regarding telephone calls being placed to the private branch exchange. Telephony controller initiates actions within the script interpreter engine that, in turn, access information stored in a database through a database controller. Responsive to the action of the script interpreter engine, the telephony controller can then instruct the private branch exchange to route the call to an appropriate location within a company depending upon the information received by the PBX through automatic transmission of data or interaction with the calling party.

BRIEF DESCRIPTION OF THE DRAWINGS

A more complete understanding of the teachings of the present invention may be acquired by referring to the accompanying FIGURES in which like reference numbers indicate like features and wherein:

FIG. 2 is a schematic block diagram of the internal architecture of the intelligent information router system of the present invention;

FIGS. 3a, 3b and 3c and FIGS. 4a and 4b are flow diagrams illustrating the operation of various components within the intelligent information router of the present invention;

FIG. 7 illustrates the set-up screen, options and operations of the user interface to the intelligent information router system of the present invention;

FIGS. 9a–d illustrate simulator screens, options and operations of the user interface to the intelligent information router system of the present invention.

DETAILED DESCRIPTION OF THE INVENTION

Figure 1:
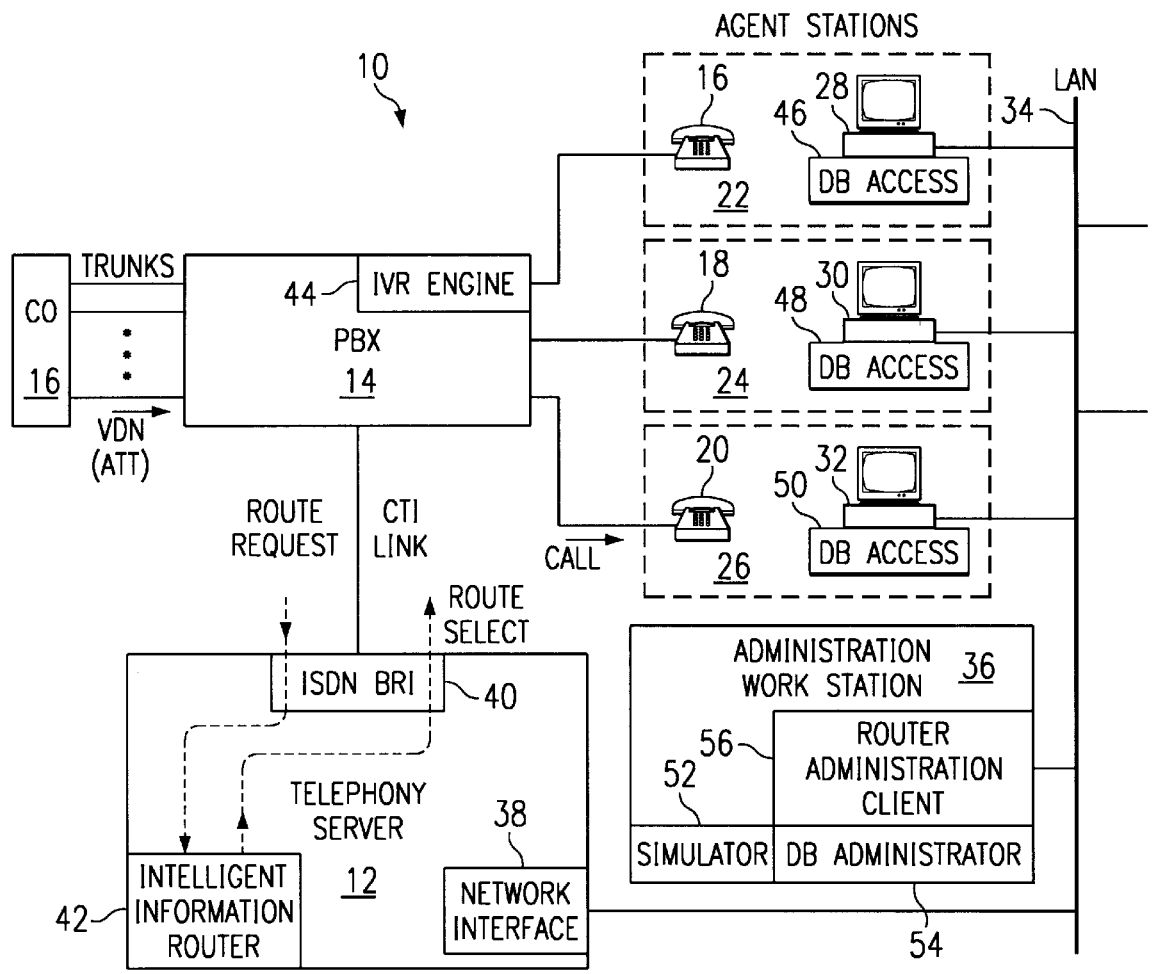
FIG. 1 is a schematic block diagram of the environment in which an intelligent information router system of the present invention may operate.

FIG. 1 is a schematic block diagram of a telecommunications system 10 which comprises a telephony server 12 which is coupled through a computer telephone interface link to a private branch exchange 14. Private branch exchange 14 is coupled through a plurality of trunk lines to a central office 16. In addition, private branch exchange 14 is connected to telephones 16, 18 and 20 within agent stations 22, 24 and 26, respectively. Agent stations 22, 24 and 26 also comprise agent work stations 28, 30 and 32.

The agent stations 28, 30 and 32 are coupled to a local area network 34. An administration workstation 36 is also connected to local area network 34. In addition, the telephony server 12 is connected to local area network 34 through a network interface 38.

The telephone server 12 is connected to the CTI link through a link interface 40. According to one embodiment of the present invention, the PBX may comprise a G-3 PBX manufactured by AT&T. Under this embodiment, the CTI link would comprise an AT&T ASAI link. The link interface 40 would comprise an ISDN-BRI board within the telephony server 12. Under this embodiment, the telephony server 12 may comprise a Pentium-class personal computer running the Novell netware telephony server system.

The telephony server provides a platform for an intelligent information router system 42. The architecture of the intelligent information router system 42 will be described more completely with reference to FIG. 2. However, in general, calls are received from central office 16 to virtual device numbers within PBX 14. The PBX 14 then generates route requests which are transferred via the CTI link to the intelligent information router 42 within telephony server 12. The intelligent information router 42 processes the route request and generates a route select or a request for further information which is transferred back to the PBX 14 through the CTI link. In some circumstances, the PBX 14 can request information from the calling party using an interactive voice response engine 44 resident on PBX 14. The PBX 14 can solicit customer information using the IVR engine 44 on its own or in response to a request for further information from the intelligent information router 42. Eventually, the intelligent information router 42 will finish processing the route request and will instruct the PBX 14 to route the call to one of the particular agent stations 22, 24 or 26. In addition, information is transmitted via the network interface 38 and the LAN 34 to database facilities 46, 48 and 50 within agent workstations 28, 30 and 32, respectively. In this manner, using information about the calling party, including an automatic number identification information or information which is solicited using the IVR engine 44, the intelligent information router 42 can access a database using predefined scripts to route the call to an appropriate agent and to supply that agent with information about the calling party. In this manner, for example, a sales organization can route a call to the particular agent assigned to a particular client and present the agent with a recent history of sales activity for that client before the agent says the first word to the client.

The administration workstation 36 is used to create new scripts using a simulator system 52. In addition, the database managed by the intelligent information router 42 is also accessed and administered using a database administration system 54 within the administration workstation 36. The intelligent information router 42 is also administered, maintained and modified using a router administration client 56 within the administration workstation 36. As will be discussed herein, great care is taken in the architecture of the intelligent information router 42 to allow for the alteration of scripts used by the router 42 while the system is active. In addition, the database accessed by the router 42 and the agent stations 22, 24 and 26 and the administration workstation 36 is constantly changing. Mechanisms are also in place within the architecture of the intelligent information router 42 to allow for these changes to take place without interfering from the current activity of the system.

FIG. 2 is a schematic block diagram which illustrates the architecture of the intelligent information router 42. As discussed previously, the information router 42 receives route requests and transmits requests for information and route select data to the PBX 14 through a link interface 40. The link interface 40 interfaces with a telephony controller 58 for all telephony related events, data transfers and instructions.

The information router system 42 receives other non-telephony related information as well as database accesses and updates through an external data manager 60 which is coupled to the local area network 34 through the network interface 38. Administration of the telephony controller and the remainder of the information router system 42 occurs through the operation of a router administration server 62 which is also coupled to the network interface 38 and communicates with the router administration client 56 within administration workstation 36 through the communication path formed by network interface 38 and local area network 34.

Events and processes which are managed and performed by the information router 42 are organized and monitored using a handle manager 64. The handle manager 64 communicates with the external data manager 60, the telephony controller 58 and a script interpreter engine 64 and a database controller 66. In general, all telephone calls that are being handled, data which has been accessed and retrieved, scripts which have been initiated, database accesses which have been initiated, files which have been retrieved, strings which have been parsed, and the like, are organized and monitored by creating handles associated with each of these objects. The handle manager 64 maintains a list of all active handles and is accessed by the remaining components of the information router 42 to insure the duplicative effort is not created. In addition, as will be discussed herein, through the careful operation of the handle manager and the remaining components, the system is allowed to operate constantly while scripts are updated, database information is changed, or any other components are altered.

The script interpreter engine 65 uses a script storage system 68 for the storage of the data files which comprise the script of activities to be performed by the system 42. The script interpreter engine also comprises a time utility 70, a string parse utility 72 and a file I/O utility 74. The time utility 70 is invoked to monitor and commence time-based events. The string parse utility 72 is used to perform string searches and to parse through alphanumeric and character-based data. The file I/O utility 74 is invoked to access data in files within script storage system 68 and other storage systems accessible to the system 42.

The database controller 66 accesses a database engine 76 which in turn accesses physical database storage system 78. The database engine 76 may comprise any suitable database such as a BTrieve-based system.

In operation, an external event is received by the router system 42 through the telephony controller 58 or the external data manager 60. As described previously, external telephony events are processed by the telephony controller 58 and all other external events are processed by the external data manager 60. In the telephony application described previously, a telephone call received by the PBX 14 creates a route request event which is received by the telephony controller 58. This route request is then processed by first creating a telephony handle using the handle manager 64. The script interpreter engine 65 is then invoked to process the call. The processing of the call may result in a variety of actions by the system 42, including a request for more information from the PBX 14 or an access to the database engine 76 to retrieve information about the calling party or the call. Finally, the telephony event may result in the telephony controller 58 forwarding a route selection command to the PBX instructing the PBX where to route the particular call.

The architecture shown in FIG. 2 is not limited to the telephony application described previously. For example, other events can be input into the system through the external data manager 60 to similarly cause scripts to be invoked through the script interpreter engine 65. For example, other application programs can communicate with the external data manager 60 using direct data exchange mechanisms or network data exchange mechanisms. These data transfers to the external data manager 60 can cause scripts to be invoked. For example, in one application, a separate application program may monitor a particular stock price. The application program can then cause a data transmission to the external data manager 60 when a particular threshold value for the stock is reached. A script could then be invoked using the script interpreter engine 65 to issue a buy or sell command that can be passed out through the external data manager 60 to a separate program that interfaces with a purchasing or selling agent in that stock.

According to another embodiment of the present invention, the same system 42 is also present in each of the agent stations 22, 24 and 26, and particularly the agent work stations 28, 30 and 32, respectively. According to this embodiment, when a particular telephone call is routed to the agent station telephone 16, 18 and 20, a network message informing the agent's workstations 28, 30 and 32 is also routed simultaneously. The network message is received by an external data manager 60 within, for example, the agent station 28. This network message causes a script within the agent workstation 28 to be invoked. This script could cause certain information to be displayed to the agent on the workstation 28. In addition, particular records within the database engine 76 may be retrieved. In this manner, the agent working at agent workstation 28 will simultaneously receive the call on the telephone 16 and will view the selected database information about the client-calling party simultaneously with the call ringing or even before the call rings.

As discussed previously, the administration workstation 36 functions to manage the operation of system 42. The simulator system 52 comprises a complete implementation of the system 42 within administration workstation 36. All of the components shown in FIG. 2 with the exception of the link interface 40 are present within administration workstation 36 and simulator 52. Link interface 40 is replaced with a graphical user interface to the administration displayable on the administration workstation 36. In this way, new scripts can be developed and tested using the simulator 52.

The database administration system 54 is used by the administrator working at administration workstation 36 to access the database engine 76 and the database storage 78 remotely. These accesses are routed through the network interface 38 and the router administration server 62. This same communication path is also used by the administration workstation 36 to download new scripts to the script interpreter engine 65 and the physical script storage facility 68.

The process of the present invention for routing a call using the intelligent information router 42 will now be described. It will be understood by those skilled in the art, however, that other types of information or data can be routed within the scope of the present invention with the intelligent information router 42.

Figure 3A:
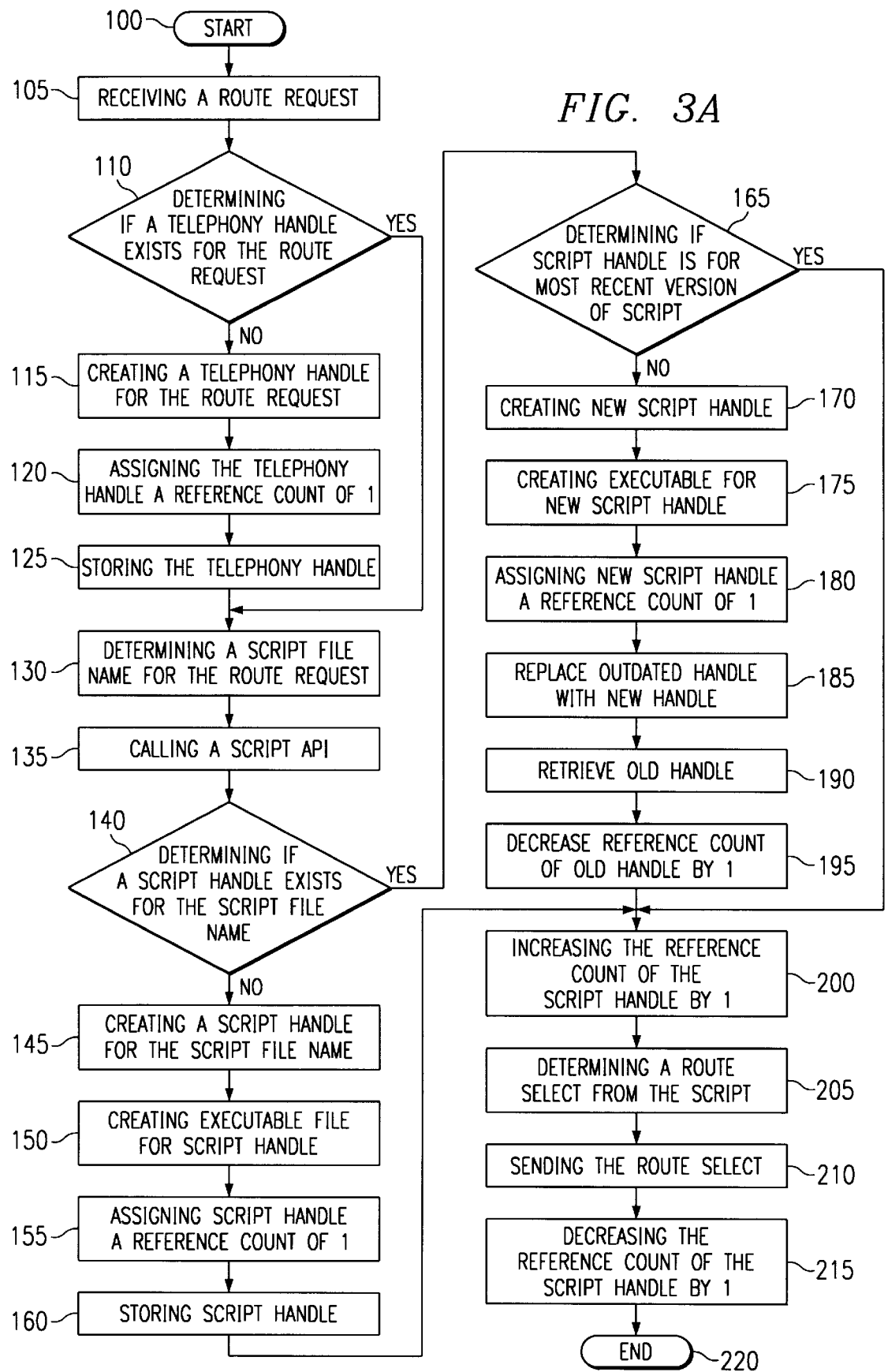

As shown by FIG. 3A, the method of the present invention for routing a call begins at step 100 and proceeds to step 105. At step 105, a route request is received by the telephony controller 58 from the link interface 40. As previously described, the telephony controller 58 continuously monitors the link interface 40 for route requests. In response to the route request, the telephony controller 58 determines at step 110 if a telephony handle exists for the route request.

The preferred method for determining whether a telephony handle exists is shown by FIG. 3B. However, those skilled in the act will understand that other methods of determining whether a telephone handle exists for a route request may be employed in accordance with the teaching of the present invention. As shown by FIG. 3B, the preferred method is a multi-step process that begins at step 250 and proceeds to step 255. At step 255, the telephony controller 58 creates a prototype telephony handle for the route request. Next, at step 260, the telephony controller 58 accesses the list of existing telephony handles stored on the handle manager 64. At step 265, the telephony controller 58 receives the existing telephony handles from the handle manager in binary sequence. The binary number of each telephony handle is determined by the numeric value of the handle's Call ID. Next, at step 270, the telephony controller 58 compares the binary number of the existing telephony handles received from the handle manager 64 with the binary number of the prototype handle created for the route request. If the binary number of an existing handle is the same as the binary of the prototype handle, then a telephony handle already exists for the route request. However, if no existing telephony handle has the same binary value as the prototype handle, then a telephony handle does not exist for the route request and one must be created.

Returning to FIG. 3A, if a telephony handle does not exist for the route request, the NO branch of decisional step 110 leads to step 115. At step 115, the telephony controller 58 creates a telephony handle for the route request. Next, at step 120, the telephony controller 58 assigns the telephony handle a reference count of 1. The telephony controller 58 then stores the telephony handle to the handle manager 64 at step 125. The telephony handle is stored in the handle manager 64 in accordance with its binary value. This is accomplished by calling the existing handles stored in binary sequence and locating the appropriate position for the new telephony handle. Step 125 leads to step 130 wherein the telephony handle is used to determine a script file name.

Returning to decisional step 110, if a telephony handle already exists for the route requests, the YES branch of decisional step 110 also leads to step 130 wherein the telephony handle is used to determine a script file name. At step 130, the telephony controller 58 determines a script file name for the route request. The telephony controller 58 determines the script file name by using the VDN of the route request, which is packaged with the telephony handle. Next, at step 135, the telephony controller 58 uses the script file name to call a script API to the script interpretation engine 65.

Step 135 leads to decisional step 140. At decisional step 140, the script interpretation engine 65 determines if a script handle exists for the script file name. The preferred process for determining whether a script handle exists for the script file name is shown by FIG. 3C. However, those skilled in the art will understand that other methods may be used within the scope of the present invention to determine whether a script handle exists. As shown by FIG. 3C, the preferred method of determination of whether a script handle exists is a multi-step process that starts at step 300 and proceeds to step 305.

At step 305, the script interpretation engine 65 creates a prototype script handle. Next, at step 310, the script interpretation engine 65 accesses the list of existing script handles stored on the handle manager 64. At step 315, the script interpretation engine 65 receives existing script handles from the handle manager 65 in binary sequence. The binary number of a script handle is determined by the value of the script file name. At step 270, the script interpretation engine 65 compares the binary number of each existing script handle with the binary number of the prototype script handle. If the binary number of an existing script handle matches the binary number of the prototype script handle, the script handle already exists. However, if the binary number of the prototype script handle does not match the binary number of an existing script handle, the script handle does not exist and one must be created.

Returning to FIG. 3A, if a script handle does not exist, the NO branch of decisional step 140 leads to step 145. At step 145, the script interpretation engine 65 creates a script handle. Next at step 150, an executable file is created for the script handle. Proceeding to step 155, the script interpretation engine 65 assigns the script handle a reference count of 1. The script interpretation engine 65 then stores the script handle to the handle manager leads to 64 at step 160. Stop 160 leads to step 200.

Returning to decisional step 140, if the script handle already exists, the YES branch of decisional step 140 leads to decisional step 165. At decisional step 165, the script interpretation engine determines if the existing script handle is for the most recent version of the script. Whether the script handle is for the most recent version of the script is determined by comparing the date of the prototype script handle that was created at step 140 with the date of the existing script handle. If the script handle is not for the most recent version of the script, the NO branch of decisional step 165 leads to step 170.

Proceeding to step 185, the script interpretation engine replaces the outdated script handle with the new script handle. However, the old script handle is not deleted. Rather, at step 190, the old script handle is retrieved to ensure that it is not deleted until all current calls using that script handle are complete. Next, at step 195, the reference count of the old script handle is decreased by 1. As a result, when all calls currently using the old script handle are complete, the reference count of the old script handle will become 0. Thereafter, the old script then will be automatically deleted by the handle manager. Accordingly, the present invention allows scripts to be updated and immediately used for calls received thereafter without interruption of current calls using an old script.

After a script handle has been created or an existing script handle is retrieved, the process proceeds to step 200 wherein the script interpretation engine 65 increases the reference count of the script handle by 1. Next, at step 205, the script interpretation engine 65 determines a route select based on the script. At step 210, the script interpretation engine 65 sends the route select to the telephony controller 58, which forwards the route select to the PBX via the link interface 40. The PBX then routes the call in accordance with the route select.

After a call is completed, the telephony controller 58 decreases the reference count of the script handle by 1 at step 215. Accordingly, when a script handle is in use, it has a reference count greater than 1. When a script handle is idle, it has a reference count equal to 1. When a script handle is outdated and thereafter becomes idle, its reference count drops to 0. Script handles having a value of 0 are automatically deleted by the handle manager 64. Script handles having a value of 1 are known by the system to be idle. Script handles having a value of 2 or greater are known to be in use and, even if outdated, will not have the reference count reduced to 0 and thereby be deleted until the current use is completed.

Figure 4A:
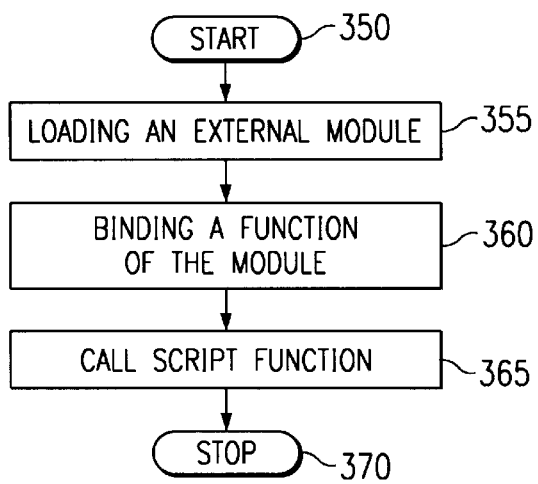

In another aspect, the present invention provides dynamic extensibility in executing scripts. As shown by FIG. 4A, the preferred script execution process of the present invention begins at step 350 and proceeds to step 355. At step 355, an external module is loaded. Next, at step 360, a function of the module is bound in the script. Thereafter, the script will execute the function when called at step 365.

Figure 4B:
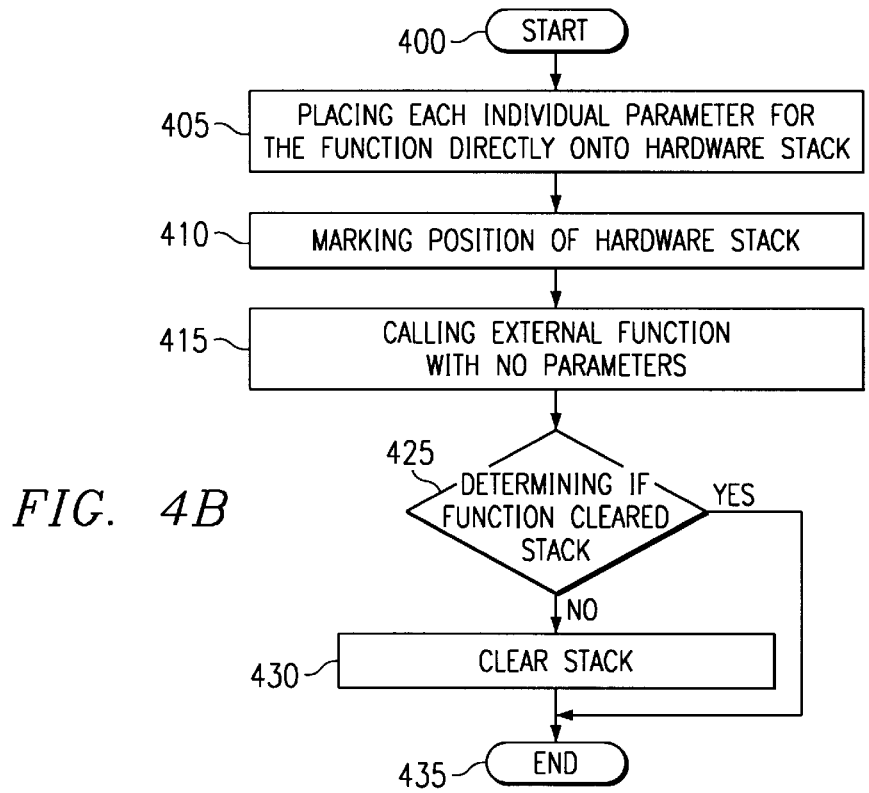

The preferred process carried out by the script when called is shown by FIG. 4B. The process starts at step 400 and proceeds to step 405. At step 405 the script interpretation engine 65 places each individual parameter of the function directly onto the hardware stack. At step 410, the script interpretation engine 65 marks the position of the hardware stack. This will enable the script interpretation engine 65 to later clear the stack.

Next, at step 415, the script calls the external function without parameters, which are already on the hardware stack. At step 420, the bound function is executed on the parameters on the hardware stack.

Next, at decisional step 425, the script interpretation engine 65 determines if the external function cleared the stack. If the function failed to clear the stack, the NO branch of decisional step 425 leads to step 430. At step 430, the script interpretation engine clears the stack. Returning to decisional step 425, if the external function cleared the stack, the YES branch of decisional step leads to step 435 wherein the process is complete.

Example 1 shows script including code that loads, binds and calls an external function in accordance with the dynamic extensibility of the present invention is provided for the benefit of the reader as part of the specification at the end of the description. In the exemplary script, the module "User32" is loaded and the "LineTo" function is bound to the new script word "LineTo". The function takes three parameters that are each integers. Accordingly, the parameters will be loaded directly onto the hardware stack and left for manipulation by the function. Thus, when the function is called, the function will directly manipulate the parameters on the stack to carry out the desired operation.

Example 1

```
global g_nICRLLogLevel as integer
local hUser32Handle, hGDI32Handle
local hDeskTop as integer
local hPen, hPen2, hOldPen as integer
local rad as integer
local cx, cy, icx, icy as integer
local pi, angle, x, y as double
local ntimes as integer
local RAND_MAX as double
local ltime as integer
g_nICRLLogLevel = 0
hUser32Handle = LoadModule("user32", "user32")
hGID32Handle = LoadModule("gdi32", "gdi32")
if (hUser32Handle < > 0 and hGDI32Handle < > 0) then
    if (BindFunction (hUser32Handle, "MessageBoxA",
"MessageBox", "INT", 4)) then
       println "Bind on MessageBoxA succeeded !"
    else
       println "Bind on MessageBoxA failed !"
    endif
    BindFunction(hUser32Handle, "wprintfA", "sprintf", "INT",
-1, 0, 1000)
    BindFunction(hUser32Handle, "GetDC", "GetDC", "INT", 1)
       BindFunction(hUser32Handle, "ReleaseDC", "ReleaseDC",
"INT", 2)
    BindFunction(hGDI32Handle, "LineTo", "LineTo", "INT", 3)
    BindFunction(hGDI32Handle, "MoveToEx", "MoveToEx", "INT",
4)
       BindFunction (hGDI32Handle, "CreatePen", "CreatePen",
"INT", 3)
       BindFunction(hGDI32Handle,      "SelectObject",
"SelectObject", "INT", 2)
       BindFunction(hGDI32Handle,      "DeleteObject",
"DeleteObject", "INT", 1)
    hdesktop = −1
    hdesktop = GetDC(0)
    println "hdeskcop == " + hdesktop
    hPen = CreatePen(0, 3, 0 x 000000ff)
    hPen2 = CreatePen(0, 3, 0 x 0000ff00)
    hOldPen = SelectObject(hdesktop, hPen)
    rad = 150
    pi = 3.141592654
    RAND_MAX = 0 x 7fff
    ltime = time(0)
    println "time( ) == " + ltime
    srand(ltime)
    rand( )
    cx = ConvertToDouble(rand( ))
    cy = ConvertToDouble(rand( ))
    cx = (cx * 1000) / RAND_MAX
    cy = (cy * 700) / RAND_MAX
#   icx = ConvertToInt(cx)
#   icy = ConvertToInt(cy)
    for ntimes = 0 to 10 step 1
    println "ring no. " + ntimes
```

-continued

```
    if ((ntimes / 2) == ((ntimes + 1) / 2)) then
        SelectObject(hdesktop, hPen)
    else
        SelectObject(hdesktop, hPen2)
    end if
    for angle = 0.0 to 2*pi step pi/60.0
        x = rad * sin(angle) + cx
        y = rad * cos(angle) + cy
        if (angle == 0.0) then
            MoveToEx(hdeskTop,    ConvertToInt(x),
ConvertToInt(y), 0)
        end if
        LineTo(hdesktop, ConvertToInt(x), ConvertToInt(y))
    next
    next
    SelectObject(hdesktop, hOldPen)
    ReleaseDC(0, hdesktop)
    DeleteObject(hPen)
    DeleteObject(hPen2)
    # MessageBox(0, "Cool !!!", "Cool !!", 0)
    end if
```

In addition to the detailed description of set forth above, Design and User's Guide documentation directed toward a specific embodiment of the present invention (Intelligent Information Router) is provided below. This document is provided for the convenience of the reader and does not limit the scope of the invention to that embodiment.

Design Document for Intelligence Information Router

Intelligent Information Router (IIR)

Introduction:

This document presents the design of AnswerSoft, Inc.'s Intelligent Information Router. The design description begins with an overview of the IIR design and continues with detailed descriptions of the subcomponent units which implement the design. This document ends with a closure section discussing extensibility issues of IIR for the future.

The IIR design is based on two overriding principles. First, extensibility is of utmost importance. Second, field maintenance requires that field upgrades be easy and cost effective to implement. This can mean, among other things that field upgrades should be possible without stopping the system. To support these requirements, the design uses a multiple module single level communication bus.

Figure 5:
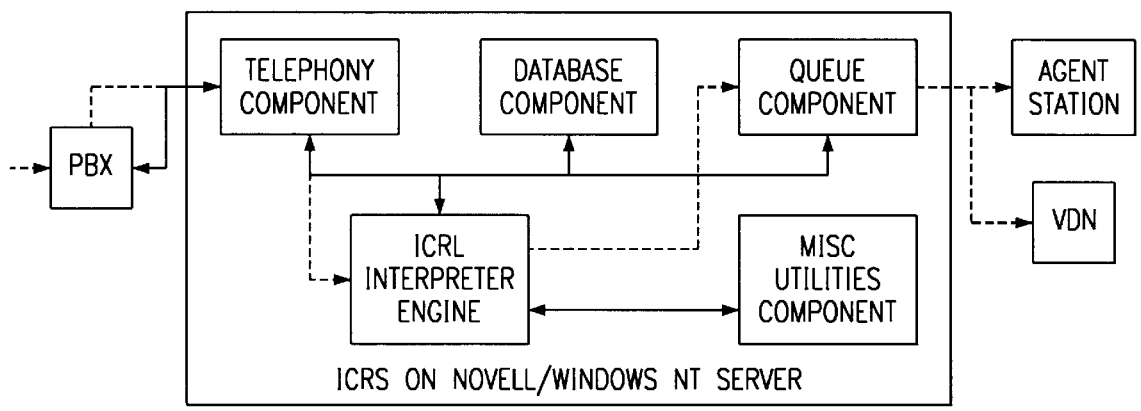
FIG. 5 illustrates a block diagram of a specific embodiment of the intelligent information router system of the present invention.

Four main components, shown in FIG. 5 and explained below, make up the IIR: the Intelligent Call Routing Language scripting engine (ICRL), the Intelligent Call Routing Telephony module (ICRTEL), the Intelligent Call Routing Customer Database module (ICRDB) and the Intelligent Call Routing General Utilities module (ICRMSC). Each module is responsible for the creation of information sets (data objects) which pertain to the module's subject. The information sets are created on behalf of ICRL. Once created and initialized handles to the information packets are given to ICRL which then manages access and destruction of the information sets. This is discussed in detail in the ICRHANDLE API Specifications. The information sets can be accessed and manipulated through the dynamically bound API's exposed to ICRL (and therefore available to scripts) by any of the functional modules.

In order to support internal Q/A, field technical support and user level debugging, IIR implements a multiple level Audit Trail execution dump facility. Audit Trail files provide a complete log of the execution path of a script and the code executed by the script. It is instructive, at this point, to present a short example of a call route prior to detailed descriptions of the modules which perform the work.

1. An incoming call arrives at the PBX
2. ICRTEL receives a corresponding event via the telephony system communicating with the CTI link.
3. ICRTEL creates (allocates) a data information packet which holds all known information about the call, including ANI, DNIS, Prompted Digits, etc.
4. ICRTEL calls a fixed (known) entry point inside the ICRL module which begins the call routing process.
5. The ICRL interpreter runs the relevant scripts to process the call. In doing so, the scripts can and will use the functions exported by the various dynamically bound components.
6. Using the function calls exposed to the ICRL interpreter, the scripts call ICRDB to access a customer database to either find or create a new customer record.
7. If a customer record is found, the script receives a handle to the record in which that customer's data is cached (in memory).
8. The script then calls another ICRDB function to look up the most recent agent to service the customer.
9. Finally the script calls an ICRTEL function to route the call to the agent's phone.

It is important to understand that the functionality used by the script, i.e. function calls, are not defined in the language of IRCL. They are defined by the functional modules, such as ICRTEL and ICRDB, and provided to the ICRL engine at system start time, or any time thereafter in the form of other (more basic) script language function calls. This is known as dynamic binding and language extension. ICRL depends heavily on dynamic binding to extend the functionality of its scripting language, without itself requiring changes. This dynamic extension of the ICRL interpretive language allows extreme flexibility to functionality upgrades as well as field repairs to bugs.

The Intelligent Call Router Language (ICRL)

Overview

ICRL is a free-form, interpreted language which has structured programming features. All functionality beyond language definition will be handled externally through script function calls, provided to ICRL, by other modules within the system. ICRL defines nothing about the services it gains from other modules of IIR, but requires them in order to carry out any interesting actions such as a call route. ICRL is built as a stand alone Windows DLL or a Novell NLM. The ICR prefix of the name is a misnomer of the project which bore out this design. ICRL is useful to any task automation process where information feeds can be attached and script functionality defined to access and manipulate the information.

Running Environment

All external modules of IIR will communicate only indirectly with the ICRL engine. ICRL provides a couple of intrinsic functions through which scripts can load an external module and then bind script function names to functions within the external module. ICRL adds these functions and the syntactical names to its table of known tokens in the interpreter.

This dynamic function extension mechanism alone provides virtually infinite extensibility of ICRL with no coding changes to ICRL itself. It is usually a good practice to run a set of scripts at system startup time which perform the operations of loading the various external IIR modules and binding all the functions each of these modules provide. This not only speeds up the process of a script later accessing an external function, but also simplifies it because the script writer need not bother loading the external module or binding the function that is needed. Once the function tables are initialized (at startup), the ICRL engine will go into a listening mode waiting for incoming script run requests.

ICRL Protocol

The run-time behavior of the ICR system with the ICRL engine at the core will be controlled through the following protocol.

ICRL Startup Phase: At system startup time, the ICRL engine will initialize itself which might include location and loading of global scripts.

ICRL Accept Request Phase: After step 1, the ICRL engine will go into a listening mode where it will wait for command process requests from any of the modules. The individual modules then may call ICRL API any time in this mode.

The ICRL engine provides two simple calls in its API either one of which external IIR modules can use to run scripts directly. They are ICRLRunScript( ) and ICRLRunScriptEx( ). There are two other functions provided by ICRL that can be used together run scripts in a two step process: ICRCreateScriptThread( ) and ICRExecuteScriptThread( ). ICRExecuteScriptThread( ) and ICRLRunScriptEx( ) accept variable number of arguments which are handed to the script as command line-like arguments.

For example, when an incoming call reaches ICRTEL, ICRTEL creates or updates the related information packet and calls ICRCreateScriptThread( ) and ICRExecuteScriptThread( ) with its module ID and the handle which identifies the modified information packet as an argument. The handle contains pertinent information about the call for which the event triggered a script run, such as CallID, ANI, DNIS, etc. The Telephony component creates such a handle for each active call. Functions called from scripts back into the telephony component can use the handle to retrieve information about the call. Handle usage and specifications are discussed in detail in ICRHANDLE API below.

System Startup: At system startup time, the ICRL engine loads a pre-defined script and runs it. This script may, in turn, load and run other scripts using ICRLRunScript( ) or ICRLRunScriptEx( ). Any of the startup scripts can make calls to the two ICRL intrinsic functions: LoadModule( ) and BindFunction( ) which allow loading of all external IIR modules and binding of script function names to function pointers within the external module.

The beauty of this design is that the ICRL engine requires no knowledge of the outside world—i.e. which events stimulate script runs and which functions are available during a script execution. The entire system is fully dynamic. This is the key to field upgradability. Since ICRL allows infinite external modules, different versions of the same module can be run at the same time. This allows the IIR to be upgraded while running.

The generation of script execution threads and script caching is handled in a layer built over ICRL and which interfaces to the functional modules of the IIR. This layer also handles issues closely related to the ICRL script engine by providing miscellaneous utilities such as memory management, information packet access referencing and destruction of the information packets when appropriate. One thing to note is that ICRL itself does not (and need not) distinguish between functions provided by this layer and functions provided by other components.

All functions in the function table can assume information packets which they manipulate are handle-based. That is, the allowed parameter types and return types of external functions are pre-defined and cannot be changed or added to. Though this may seem like a severe restriction, it is actually the exact opposite. This implementation frees ICRL from issues with respect to different data types, allowing it to indirectly handle all data types. The implication of is that ICRL does not support data structures or user defined types. If an ICRL script has to handle fields in a data structure, ICRL has to be given a set of Get/Set functions (in the function table) which work on a handle to that type of structure and return/set the individual fields in that structure. Therefore compatibility issues like Unicode or multi-byte (international character set) compliance do not arise as the script will have external handlers which do the necessary work to provide compliance as necessary.

ICRL Features

The various language constructs which will be supported by ICRL are listed in the IIR user documentation.

Implementation Issues

The ICRL interpreter engine is implemented using the UNIX compiler generation tools Lex and Yacc. Lex and Yacc together form a powerful compiler definition tool set through which syntax for a language definition can be specified in human readable form. The C source code generated by Lex and Yacc is encapsulated in a C/C++ layer that forms the complete parser/interpreter engine.

In addition to the ICRL parser, two other issues are handled by the ICRL module—memory management and string management. Memory management is completely handle based. All functional modules allocate their information packets on behalf of the ICRL engine. These packets are known as handles which relate events to the tied information. Handle aggregation is the technique used to tie the disparate pieces of information with reference counts and the modules that created and can act on the packets.

The ICRL module performs all handle management and owns all handles even though the functional modules create and initialize them. ICRL must own the handles because there may be multiple scripts running and accessing the same information simultaneously. Rather than let each module implement its own referencing strategy, a common strategy is implemented by ICRL. This is explained below in detail in ICRHANDLE API Specifications.

Error Reporting and Audit Trail Logging

ICRL allows two forms of error reporting. First, a syntax pre-parse of scripts will be performed on all scripts. Prior to running a script, whether for simulation purposes or actual implementation, ICRL reads and parses the script in order to build an execution tree. At each point in the script parsing, ICRL knows whether the script is in proper ICRL form and matches syntactical rules. If the rules are broken at any point in a script, ICRL will provide error reports stating the line number and expected syntax at the point the script is in violation and terminate the pre-parse. Termination is not strictly required, as the recursive decent parser of ICRL is capable of continuing, the parse state after a syntax error can't be guaranteed and significant syntax fallout can occur. In such a case, large amounts of errors will be generated which could actually be erroneous errors.

Second, as all modules of IIR require, ICRL will provide audit trail logging of each code entry point entered during the script execution. It is not possible to define, completely, at this point how much audit trail logging will exist in any given entry point. At the least, each entry point will provide two logs. First the entry which logs all parameters passed into the entry point. Second, the exit point and all parameters and all return values. Any information packet handle will be recursively dumped to the audit trail file.

It is useful to allow levels of audit trailing. The recursive dumps of handles can be expensive in terms of file space, as the information contained in the handle can be large. Therefore, ICRHANDLE objects will be logged based on the bLog member of the handle. This way, a script can turn ICRHANDLE level logging on and off at will to control the size of the audit trail dump.

ICRHANDLE API Specifications

The ICRHANDLE type is the object by which all IIR subsystems transfer their information into and out of the ICRL engine. All subsystems of the IIR must support the use of the ICRHANDLE to hold store and/or frame allocated information packets. The base handle consists of the following members listed below in Table 1:

TABLE 1

```
struct tagICRHANDLE
{
  CTINT nModuleID;            This is the unique module identifier
  CTINT nReferences;          Counter of entities which are
                              currently referencing this object.
                              If the references ever decrease to
                              zero, the IRCL engine will
                              automatically destroy the handle via
                              the handle's virtual HandleDestroy
                              API.
  CTINT bLog;                 TRUE if this object should be dumped
                              to the audit trail log. FALSE
                              otherwise. This defaults to FALSE.
  int                         Pointer to function, provided by the
  (*pHandleCompareFunc        subsystem, which is used by the ICRL
  )(                          engine to compare any two handles
    ICRHANDLE h1,             belonging to that subsystem.
    ICRHANDLE h2);
  int                         Pointer to function provided by the
  (*pHandleDestroyFunc        subsystem which is used by the ICRL
  )( ICRHANDLE h);            engine to free memory associated
                              with that handle after its lifetime.
};
    typedef struct tagICRHANDLE ICRHANDLEINFOSTRUCT;
typedef void* ICRHANDLE;
```

Making the ICRHANDLE a void* hides the ICRHANDLEINFOSTRUCT data members from modules which do not need to know what an ICRHANDLE is. They treat ICRHANDLEs as black boxes. Private modules which do need the ICRHANDLE structure can type cast an ICRHANDLE to the specific structure pointer they want. Any subsystem which registers itself with the ICRL engine must export the following entry points with respect to a handle as listed below in Table 2:

TABLE 2

| | |
|---|---|
| CTINT HandleCompare(ICRHANDLE h1, ICRHANDLE h2); | This entry point compares two handles and returns −1, 0 or 1 for h1 < h2, h1 == h2 and h1 > h2 respectively. |
| void HandleDestroy(ICRHANDLE); | This entry point cleans up all issues with respect to a handle of information and frees the handle itself. |
| void HandleDump(ICRHANDLE); | Dumps the handle to the currently active Audit Trail file. |

The ICRHANDLE API will handle all storage and lookup of all handles. The API exposes a high speed lookup mechanism for locating handles based on the contained information and the HandleCompare entry point. The following functions are exported to other subsystems by the ICRHANDLE API itself and need not be overridden or duplicated as listed below in Table 3:

TABLE 3

| | |
|---|---|
| HandleFind(ICRHANDLE hLooksLikeThis); | Locates a handle in the handle tables via a (possibly temporary) handle filled with enough information to complete calls to the HandleCompare method. At a minimum, the nModuleID must be provided, as well as any information required by the calling module's HandleCompare entry point. |
| HandleAddToTable(ICRHANDLE hAdd); | Adds a handle to the table of handles currently known to the system. This method should always be called after handle creation and initialization. Note that the ICRHANDLE API does not call HandleAddRef. This way calls to DecrementReference do not have to distinguish between whether a handle has a reference and if so, is it in the tables. The handle must be fully initialized before calling this entry point. |
| HandleRemoveFromTable (ICRHANDLE hRemove); | Removes a handle from the table of handles currently known to the system. This method should be required only rarely handle manager will automatically remove handles from its tables when they are about to be destroyed |
| void HandleDump(ICRHANDLE); | Dumps the base handle portion of a handle to the current Audit Trail file. |
| HandleDestroy(ICRHANDLE hDestroy); | Destroys the handle. This method automatically locates the correct module and entry point in that module to call for proper destruction. |
| HandleAddRef(ICRHANDLE hThis); | This method increases the reference count on a handle. Handles will not be destroyed until the reference count has dropped to zero or less. |
| HandleRelease(ICRHANDLE hThis); | This entry decrements, by one the reference count of a handle. If the reference count drops to zero, the handle will be removed from the handle tables and its destruction entry point will be called via DestroyHandle. |

As a simple example, a telephony subsystem would allocate information blocks which hold interesting information about telephony events similar to the following Example 2:

Example 2

```
struct tagTELINFOSTRUCT
{
    CTINT      nCallID;
    CTINT      nCrossRefID;
    CTCHAR     szDevice[32];
    CTCHAR     szInstrument[32];
    .
    .
    .
};
typedef tagTELINFOSTRUCT TELINFOSTRUCT,
*PTELINFOSTRUCT;
struct tagTELHANDLE
```

```
{
    ICRHANDLEINFO   BaseHandle;
    TELINFOSTRUCT   iTelInfo;
}
typedef tagTELHANDLE TELHANDLE, *PTELHANDLE;
CTINT g_nModuleID;
static FUNCTIONTABLE s_ftTable; /* this gets filled out
somewhere */
CTINT
TelCompareHandle(ICRHANDLE h1, ICRHANDLE h2)
{
    PTELHANDLE p1 = (PTELHANDLE)h1;
    PTELHANDLE p2 = (PTELHANDLE)h2;
    CTINT     nCompare = p1->nCallID - p2->nCallID;
    return    nCompare > 0 ? 1 :
    nCompare < 0) -1 :
    0;
}
void
TelDestroyHandle(ICRHANDLE hThis)
{
    PTELHANDLE pThis = (PTELHANDLE)hThis;
    /* close files, cleanup net connections, free store */
    UtsMscFree(pThis);
}
ICRHANDLE
RegisterAndMakeOne( )
{
    PTELHANDLE pThis = (PTELHANDLE) UtsMscMalloc(sizeof
(TELHANDLE));
    g_IRCLModuleID    =    ICRLRegister(s_ftTable,
TelDestroyHandle, TelCompareHandle);
    HandleAddToTable((ICRHANDLE)pThis);
    return (ICRHANDLE)pThis;
}
BOOL
TelProcessEventFromPBX(PEVENTTHING pEvent)
{
    TELHANDLE hTest;
    PTELHANDLE pThis;
    memset(hTest, 0, sizeof (hTest));
    hTest.nModuleID = g_TelModuleID;
    hTest->nCallID = pEvent->nCallID;
    pThis = HandleFind((&hTest);
    if (!pThis)
    {
        /* make a new handle and fill it up */
        pThis   =   (PTELHANDLE)UtsMscMalloc(sizeof
TELHANDLE);
        if (pThis)
        {
            pThis->nCallID = pEvent->nCallID
            /* and so on */
            HandleAddToTable((ICRHANDLE)pThis);
        }
    }
    /* do whatever should be done to actually handle the
event
    * like fill up the structure and whatnot
    */
    return CTIERR_ALL_OK;
}
```

Intelligent Call Routing Telephony Module (ICRTEL)
  Overview:
  The IIR's main purpose at revision level 1.0 will be efficient, intelligent call routing. For this to take place, a complete telephony module must be included which implements the functionality required to perform the route command based on the decision logic in the routing scripts. ICRTEL is this module.
  The functionality of this module is rather limited, in that its only job is to provide Get/Set methods on the information packets created to represent active calls, methods to perform route sequences. Routing sequences are defined in the ICRL scripts. The route requests within the scripts are carried out by this module.

The general nature of this module follows:
  1. A Call becomes available at the PBX
  2. The PBX delivers the call events across the CTI link to the telephony server
  3. ICRTEL receives the event message and creates an information packet which holds all pertinent information and history about the call.
  4. ICRTEL calls ICRCreateScriptThread( ) and ICRExecuteScriptThread( ) to run a script and passes the ICRHANDLE which represents the information packet.
  5. The Script makes Database lookups as necessary to determine the correct route
  6. The Script calls ICRTEL indirectly through the dynamically bound script functions.
  7. ICRTEL performs the desired request, which may be a Get/Set request or a route. A route takes two forms, temporary or terminating. A temporary route is a request to route the call to a VDN in order to collect additional InfoDigits. The script which requests a temporary route does not terminate, rather it is suspended until the VDN collection is complete, after which the script resumes. Prior to resuming the script, ICRTEL fills additional InfoDigit packets in the call information packet corresponding to the call. This additional InfoDigit information is appended to the InfoDigit information already present. Appendage is required in order to allow historical decisions based on the VDN paths during a complete route.

Terminating route requests are routes which are known to have reached the call's final destination. This is representative of a call being sent to a specific agent or agent group. The terminating call route does not, however, terminate the script. It simply terminates the call's ability to be routed to additional sites. The only exception to this rule is if PBX allows a call to be removed from a queue, assuming the call is still in a queue. In such a case, another ICRTEL script API might provide access to that functionality. The script resumes even after a terminating route request, though, so additional logging might be made or other not-routing commands.

Since the ICRL engine provides for information packet handle management, ICRTEL does not attempt to manage the handles it creates. ICRTEL inserts, via HandleAddToTables( ), handles to the information packets it creates. No other memory and/or handle management is required. Examples of ICRTEL API exposed to scripts follows in Example 3.

Example 3

ICRTEL API
  ICRTELGetANI(ICRHANDLE); qwer
  ICRTELSetANI(ICRHANDLE); qwer
  ICRTELGetDNIS(ICRHANDLE); qwer
  ICRTELSetDNIS(ICRHANDLE); qwer
  ICRTELGetCallID(ICRHANDLE); qwer
  ICRTELRoute(ICRHANDLE); qwer
  ICRTELRouteInfoDigits(ICRHANDLE); qwer
Intelligent Call Routing Database Module (ICRDB)
  Overview:
  The IIR's main purpose at revision level 1.0 will be efficient, intelligent call routing. For this to take place, a complete database module must be included which implements the functionality required to perform the route command based on customer database information. ICRDB is a generic implementation of customer records.

The first version of ICRDB allowed only simple single field queries. The current version of ICRDB (ICRDBSQL) implements a generic SQL query and update ability. The most important feature of this external module is that it is designed to be independent of the actual database engine used.

ICRDB provides methods to perform queries on the database, find the count of records matching a query and standard forward/reverse traversals (enumeration) of the records. Additionally, within each record, ICRDB provides Get/Set methods per field. This is a difficult issue and may change in design before final shipment of the IIR.

The nature of this module is as follows:

1. A Call becomes available at the PBX
2. The PBX delivers the call events across the CTI link to the telephony server
3. ICRTEL receives the event message and creates an information packet which holds all pertinent information and history about the call.
4. ICRTEL calls ICRCreateScriptThread( ) and ICRExecuteScriptThread( ) to run a script and passes the ICRHANDLE which represents the information packet.
5. The Script makes a query on the customer database based on ANI.
6. ICRDB runs an SQL statement against the database engine which generates a record set of matches. The records are stored in an ICRHANDLE subclass and the handle is returned to the Script.
7. The Script requests from ICRDB, the number (count) of matching records in the record set.
8. The Script rolls (traverses) through the matching records and calls ICRDB to determine, for instance, the speaking abilities of the customer.
9. The Script decides, after locating the correct record, that a Spanish speaking agent is required.
10. The Scripts requests ICRTEL to route the call to a Spanish speaking agent.

Since the ICRL engine provides for information packet handle management, ICRDB does not attempt to manage the handles it creates. ICRDB inserts, via HandleAddToTable( ), handles to the record sets created during the running of a script. The disadvantage of this is that it is the responsibility of the script programmer to request that ICRL remove the record set handles prior to script termination. No other memory and/or handle management is required. Examples of ICRDB API exposed to scripts follows in Example 4.

Example 4

ICRDB API
    ICRDBRunQuery( )
    ICRDBGetStringFieldValue( )
    ICRDBSetStringFieldValue( )
    ICRDBGetNumericFieldValue( )
    ICRDBSetNumericFieldValue( )
    ICRDBMoveNextRecord( )
    ICRDBMovePreviousRecord( )
    ICRDBMoveUpdateRecord( )

Future

The design of ICRL is based on extensibility requirements. The separation of language features from external functions and dynamic binding of functions makes ICRL very flexible. New functions or even whole components and media (information) feeds could be added to the IIR with minimal effort. The usage of Lex and Yacc guarantees not only good maintenance of code but also extensibility of language features for future releases.

User's Guide Documentation for Intelligent Information Router

Contents of the User's Guide is shown by Table 4.

TABLE 4

1-Getting Started
    Requirements
        Hardware
        Software
    Getting Help
        Understanding Typographical Conventions
    Installing the Program
        Installing Over Existing Files
        Beginning the Installation Routine
        Installing the System Modules
    Using the Program for the First Time
2-Using the Database Administrator
    Setting Up Fields
    Defining Primary Key Fields
3-Using the Agent Station
    Searching the Database
        Using Wild Card Characters
    Modifying the Database
        Adding a Record
        Modifying a Record
        Deleting a Record
4-Writing Scripts
    Using the Simulator Window
        Changing the Appearance of the Simulator Window
    Writing Script
        Opening a Script
        Formatting a Script
        Saving Your Script
    Printing a script
        Previewing a script
        Setting up the printer
        Selecting a printer font
5-Testing and Implementing your Scripts
    Testing Scripts
        Test Non-Telephony Scripts
        Testing telephony Scripts
        Viewing the Results
    Making the Script Available
    Using the VDN Administrator
        Adding a Script
        Starting and Stopping a Script
        Refreshing the VDN Settings
        Deleting a Script
        Modifying the VDN Settings
6-Using the Scripting Language
    Understanding the IIR Environment
        Integrating IIR with the AT&T Switch
    Using Operators and Expressions
        Variables (Declaration, Usage)
        Simulating Constants with Variables
        Arithmetic Operators
        Relational and Logical Operators
        Assignment Operators and Expressions
        Script Output and String Operators
        Comments
    Control Flow
        Statements and Blocks
        If-Else-Endif
        Select Statement
        Loops: For-Next and Do-Loop Until
    Program Structure
        IIR Function Categorization
        Guidelines to Follow
    Command Summary
A-Command Reference
    Function ClearRecord
    Function ClearDBHandle
    Function CreateTimeHandle
    Function DestroyDBHandle
    Function DestroyTimeHandle

TABLE 4-continued

Function GetAgentAvailable
Function GetAgentState
Function GetAgentTalkState
Function GetAgentWorkMode
Function GetAscTime
Function GetCallingDevice
Function GetCurrentTime
Function GetDayOfMonth
Function GetDayOfWeek
Function GetDayOfYear
Function GetDst
Function GetHour
Function GetIncomingUUIData
Function GetIncomingUUILength
Function GetIncomingUUIType
Function GetIVRCollectVDN
Function GetIVRDigits
Function GetIVRIndicator
Function GetIVRType
Function GetLookAheadHours
Function GetLookAheadMinutes
Function GetLookAheadPriority
Function GetLookAheadSeconds
Function GetLookAheadSrcVDN
Function GetLookAheadType
Function GetMinute
Function GetMonth
Function GetNumericFieldValue
Function GetNumIVRSets
Function GetSecond
Function GetStringFieldValue
Function GetTrunk
Function GetVDN
Function GetYear
Function ICRLAtoi
Function ICRLLeft
Function ICRLMid
Function ICRLRight
Function ICRLStrCopy
Function ICRLStrIndex
Function ICRLStrLen
Function ICRLStrStr
Function InsertRecord
Function MoveNextRecord
Function MovePreviousRecord
Function QueryAgentState
Function RouteFinal
Function RouteMore
Function RouteUnknown
Function RunQuery
Function SetCurrentIVRSets
Function SetDestRoute
Function SetDirectedAgentCallSplit
Function SetNumericFieldValue
Function SetOutgoingUUI
Function SetPriorityCall
Function SetRouteSelected
Function SetStringFieldValue
Function SetUserProvidedCode
Function UpdateRecord
B-Sample Scripts
C-Terms and Acronyms
D-Error Codes
    IIR Simulator Errors
    IIR Database Administration Tool
    IIR Agent Tool
  Error Codes
    Time Command Errors
    Database Error Codes
    Telephony Error Codes
    Miscellaneous Low Level Error Codes

Chapter 1—Getting Started

The Intelligent Information Router (IIR) is a server-based application for routing incoming telephone calls based upon call information and a set of rules.

The IIR application has the following components:

TABLE 5

| | | |
|---|---|---|
| On the NetWare Server | Route Engine | A collection of network loadable modules: A script engine determines which scripts to start and subsequent routing/distribution decisions. A telephony module allows the route engine to talk to the T-server A database module allows the script engine to communicate with the databaseDatabaseData that you enter into the system. The database contains 15 text fields and 5 numerical fields. |
| On the Client | Simulator | Module used for writing and testing scripts, viewing output. |
| | Database Administrator | Module that allows the administrator to label and define the fields in the Agent Station. The administrator also assigns Agent viewing and modifying privileges for all fields. |
| | Agent Station | Module that allows agents to search, view, and (in some cases) modify database information. |
| | VDN Administrator | Module which matches scripts to Vector Directory Number (VDN) information for the routing engine. It also starts and stops scripts. |

Requirements

Check your system to be sure that you have the hardware and software the Intelligent Information Router needs to operate successfully.

Hardware

The following hardware requirements listed in Table 6 are minimum requirements.

TABLE 6

| For your NetWare server | For your client machines |
|---|---|
| Pentium, 100 MHz | 486-33 MHz |
| 5 megabytes free hard drive space | 10 megabytes free hard drive space |
| Recommend I gigabyte with 12 ms access time | |
| 24 megabytes RAM | 8 megabytes RAM (16 megs recommended) |

Software

The following software requirements listed in Table 7 are minimum requirements.

TABLE 7

| For your NetWare server | For your client machines |
|---|---|
| Novell NetWare 3.11 | Windows 3.1 |
| Novell Telephony Services, v. 2.2 | MS-DOS 5.0 |
| ATT G3 PBX Driver, v. 2.2 | Win32S (for IIR Simulator only) |

TABLE 7-continued

| For your NetWare server | For your client machines |
| --- | --- |
| Btrieve 6.15.525 | Btrieve ODBC Interface (v.1.0) for Windows Btrieve Client Engine for Windows, v. 6.15 |

Getting Help

The following IIR User Guide documentation explains how to use the Intelligent Information Router. Chapter 1 describes the basic requirements needed to run IIR successfully, explains how to install the program files for both the server and client components, and discusses the architecture of the system. Chapter 2, "Using the Database Administrator," describes the graphical user interface the Database Administrator uses to set up and modify the fields on the Agent Station. Chapter 3. "Using the Agent Station," discusses the features and operating techniques for the graphical user interface used by the Agents. Chapter 4, "Writing Scripts," provides detailed instructions for operating the script editor and the script simulator window. Chapter 5, "Testing and Implementing your Scripts" explains how to test scripts and how to move them to your production environment. It also introduces the VDN Administrator module. Chapter 6, "Using the Scripting Language," provides comprehensive information for writing scripts. This chapter describes the components of scripts in detail. Appendix A provides reference commands for the scripting language you will use to build the IIIR scripts. Appendix B shows samples of typical scripts. Appendix C lists the terms and acronyms used in this manual. Appendix D lists the error messages and the appropriate actions to take for each. From within the program, you can also open the online help topics for quick access to commonly-requested information. Each module has its own self-contained help file. You can open online help from the help menu in any major window for the topics specific to that window.

Understanding Typographical Conventions

The information below will help you find and use the information in the documentation for the Intelligent Information Router. Sequential instructions are numbered steps that must be followed in the order in which they are presented. Filenames appear in this font: autoexec.bat (filename) to set it apart from information in the text. Text that you are to type, such as text for scripts, is shown as this: declare local variable.

Installing the Program

The installation routine for the Intelligent Information Router allows you to install all or a portion of the program files.

You will need to know a few details about your system to install the files successfully, so please take a moment to review this chapter before you begin to ensure that you have all the information you will need.

1. Read each section carefully before you begin.
 2. Write the information required for each step beside the illustrations as you review the chapter to make it readily accessible at the appropriate step.
 3. Open Windows (Program Manager or File Manager).
 4. Make sure that you have Btrieve installed on the server and the Btrieve ODBC Interface for Windows installed on the client (see Hardware Requirements).
 5. Make sure that you are logged on to the NetWare server when you begin installing the program.

Installing Over Existing Files

If you are reinstalling any of the IIR modules over a previous installation, you must follow the steps below before beginning the new installation.

1. Make certain that any existing NetWare Loadable Modules/(NLMs) are not running on the server. All existing NLMs must not be running when you install the NLM. Check this by running "modules" at the NetWare system prompt. Key IIR NLMs include ICRCTL, ICRL, CTNET, CTIPX, CTUTS. To Unload Existing NLMs, quit ICRS CONSOLE and unload ICRS by running "ulicrs" at system console prompts. Also, if you are installing NLMs on a separate NetWare and Telephony servers, you must move three NLMs (osfasnl.nlm, tslib.nlm, attpriv.nlm) from NetWare server to the Telephony server.
 2. Back up your existing scripts and databases (both production and simulation) in a directory other than the one to which you are installing now. The current installation overwrites some of these files, though you should receive a warning prompt for this action.

Beginning the Installation Routine

To start the installation,

1. Insert Disk 1 of the set of installation disks into your floppy disk drive.
 2. From the File menu, select Run.
 3. In the command line, type a: \setup
    where a: is the floppy drive.
 4. Press Enter.

Entering Your User Information

Figure 6A:
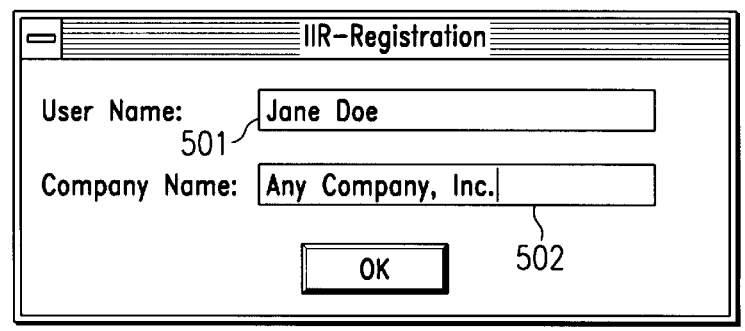
FIG. 6a–g illustrate the installation screens, options and operations of a user interface to the intelligent information router system of the present invention.

As shown by FIG. 6A, The first window to appear is the setup window 500. This window identifies you as the user.

1. Type your first and last names 501.
 2. Type the name of your company 502.

Installing the System Modules

Figure 6B:
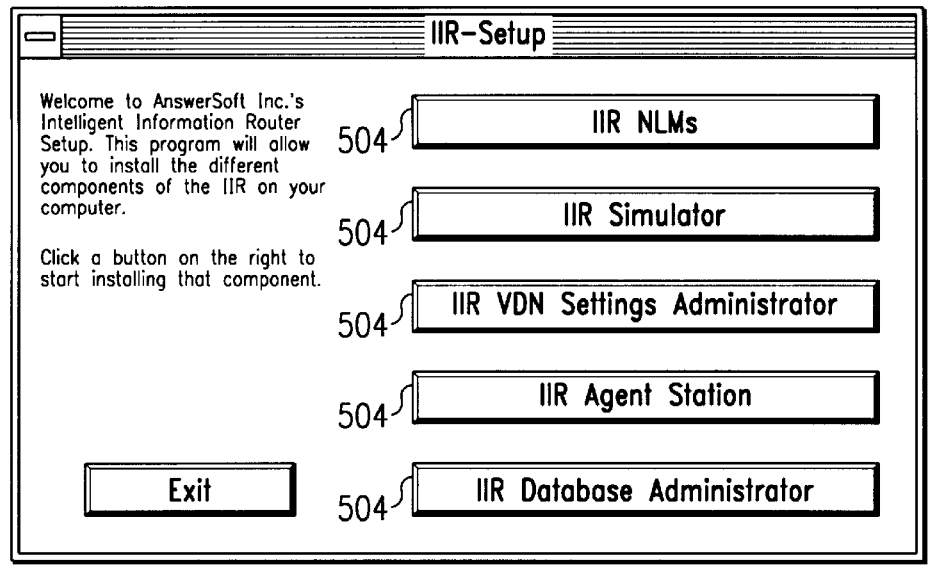

As shown by FIG. 6B, in the IIR Setup window 503, you can select which of the IIR module you want to install. You may install the modules in any order, although if you are installing the IIR on a system with no previous IIR installations, it usually works best to install from top to bottom (i.e., begin with NLMs; end with database administrator).

Installing All Modules—General Information

To use the setup window 503 for each module 504, follow the general options below.

1. Click the button of the module 504 you want to install (the order is unimportant).
 2. In the setup window, type the information required. When typing a path and filename, include the drive. For example,
    c:\icrs\admin\admin.exe
    If you type a path for a directory that does not exist, the IIR installation routine creates the directory for you.
 3. Click the Start Install button.
 4. Change diskettes when prompted.
 5. Click the OK button in the dialog box announcing successful installation.
 6. Select a program group for the icon.
 7. (Optional) Check the option for Add to Start Up Group to open the module every time you start Microsoft Windows.
 8. Click the OK button to return to the IIR Setup window 503.

In the IIR Setup window 503, you can continue installing IIR modules, or you can exit the window.

Notes about the Database Path

When you install the modules, the installation looks for existing database files. If you have existing database files, a dialog box appears and asks if you want to overwrite the old database. Use the following guidelines. If you have backed up the database file, click the Continue button (you can copy your old database file later into the directory if necessary). If you have not backed up the database file, but do not want to overwrite the file, click the Quit button to stop the installation process and return to the IIR Setup window. If you want to overwrite the old database, click the Continue button. When you install more modules within the same installation session, the message will not appear again.

NLM

Figure 6C:
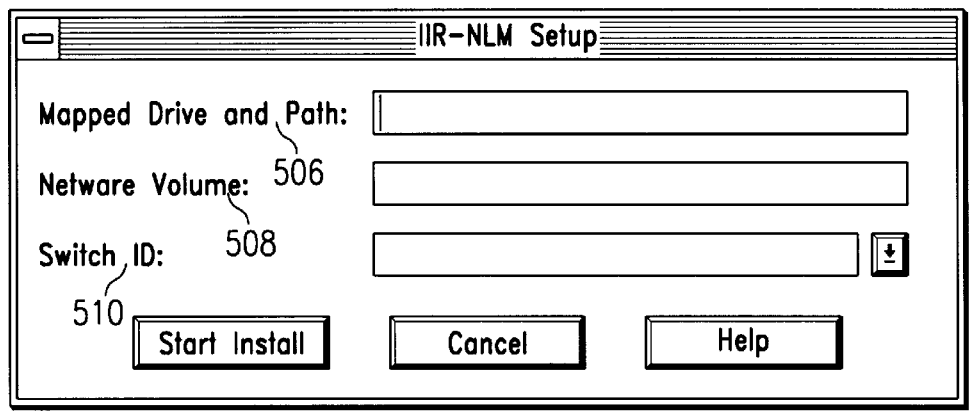

As shown by FIG. 6C, the NLM window 505 installs the NetWare Loadable Module (NLM) on the server. If you are reinstalling this module over an old one, make certain that the existing IIR NLM module is not running.

Type the following information. For Mapped Drive and Path 506 type the drive and path where IIR will install the files. For NetWare Volume 508 type the server's volume name (for example ASI1). For Switch ID 510 type (pull-down list only) the name of the telephony switch (should display the default switch ID).

Simulator

Figure 6D:
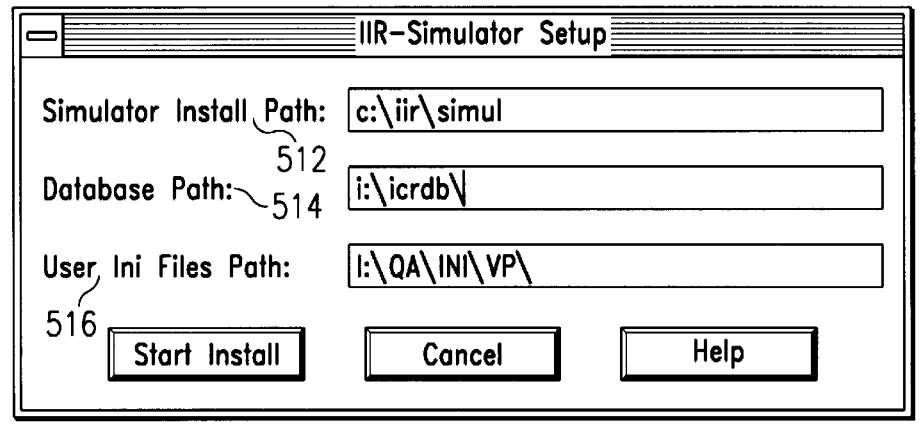

As shown by FIG. 6D, the simulator window 511 installs the script simulator, designed to run on Win 32S. For Install Path 512 type location to install the Simulator module. For Database Path 514 type location for the IIR to create the database. If this path does not exist, the IIR creates it. If the path and database do exist, the IIR overwrites them. For User Ini Files Path 516 type location for the user initiation files.

VDN Administrator

Figure 6E:
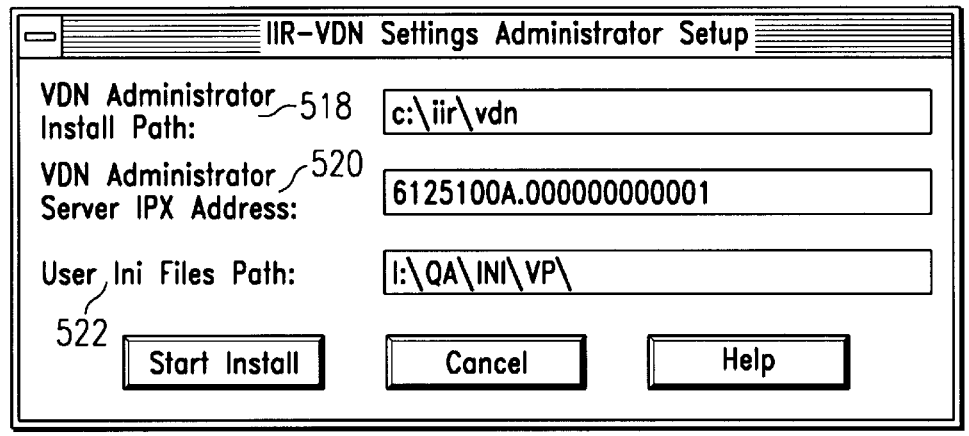

As shown by FIG. 6E, the VDN Administrator window 517 installs the VDN Administrator for matching scripts to the Vector Directory Number (VDN). For Install Path 518 type location to install the VDN Administrator module. For Server IPX Address 520 type IPX address of your server. The IPX address is defined in the autoexec.ncf file in the system subdirectory of the NetWare server. The line titled ipx internal will provide the first eight characters of the IPX address (network address) followed by the entity within the network or server domain (usually "1" for the server). For example, if the line says "ipx internal net 6125100A" then the address is "6125100A.000000000001." For User Ini Files Path 522 type location for your user initiation files.

Agent Station

Figure 6F:
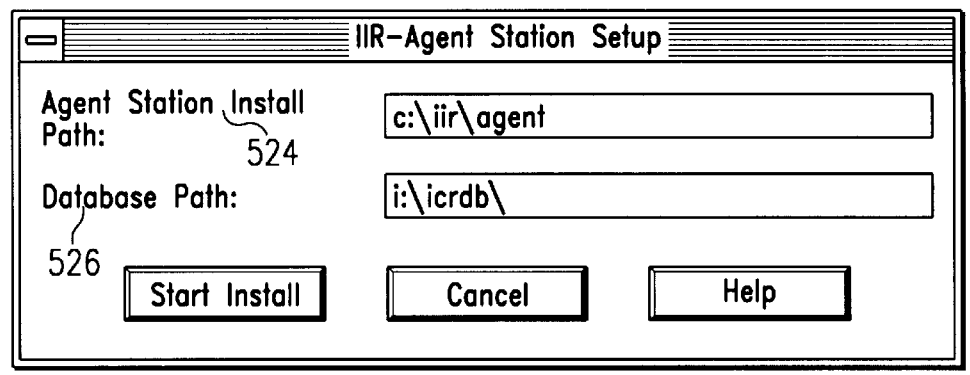

As shown by FIG. 6F, the Agent Station Window 523 installs the Agent Station module, which Agents use to modify information in the database. For Install Path 524 type location to install the Agent Station module. For Database Path 526 type location of the production database path on the network server. This path is a combination of the network drive with the NLMs and the subdirectory containing the database. For example, if your network drive is L, and your subdirectory is \iir, then use the database path L: \iir\data.

Database Administrator

Figure 6G:
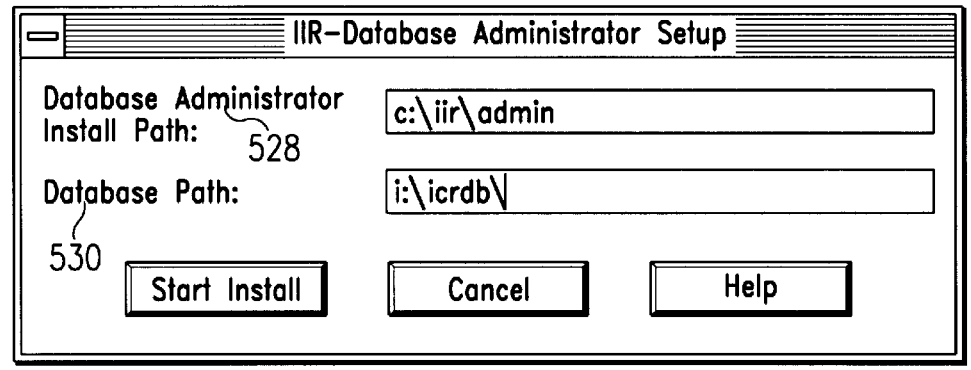

As shown by FIG. 6G, the Database Administrator Window 527 installs the Database Administrator module, which Administrators use to set up the Agent Stations. For Install Path 528 type location to install the Database Administrator module. For Database Path 530 type location of the production database path on the network server. This path is a combination of the network drive with the NLMs and the subdirectory containing the database. For example, if your network drive is L, and your subdirectory is \iir, then use the database path L: \iir\data.

When you have finished installing the modules that you selected, you can exit the installation process from the Installation Setup window (see FIG. 6B—Setup Window). Click the Exit button. This program returns you to the Windows Program Manager.

Using the Program for the First Time

The IIR does not use a common interface for all tasks. Ordinarily you simply open the IIR folder and click the icon for the module you want to use. If you have just installed the IIR, however, you will first want to understand where to go from here, and why. You have just installed up to four client applications for the Intelligent Call Router: Database Administrator, Agent Station, Simulator and VDN Administrator.

You can, of course, open any of the applications, but the logical sequence below is for using the IIR the first time:

1. Set up your field labels—You must define and set up the labels and properties of the fields in your customer database. To do this, open the Database Administrator. Chapter 2 discusses this module.
2. Populate the customer database.
3. Write the scripts—The scripts are the heart of the IIR. The tool for writing scripts is the Simulator. Chapter 4 discusses the Simulator window and how to use the scripting editor. If you are unfamiliar with script writing, you can read Chapter 6 for a comprehensive overview and guide to the IIR scripting language.
4. Test your scripts—When you have written a script, you must use the Simulator to test it. Chapter 5 explains this process.
5. Associate the script to a Vector Directory Number (VDN)—When you have tested your script and found it to be successful, you must associate it with the VDN, using the VDN Administrator. The last section of Chapter 5 explains how to associate the VDN to the script and create settings for each script.
6. Modify customer records—This step comes only after the IIR is running successfully and executing scripts. To modify records in the customer database, use the Agent Station module, as discussed in Chapter 3.

Chapter 2—Using the Database Administrator

The Database Administrator allows anyone with administration privileges to set up the database and perform other tasks which globally affect the Intelligent Information Router. As shown by FIG. 7, the Database Administrator has a single window 600, which allows you to set up the fields that appear in the IIR Agent Station window. You can label the fields, designate agent privileges (view and modify) for each of the fields, and define the primary key fields.

Setting Up Fields

You may label up to 15 text fields and 5 numeric fields. For each field, you may also designate agent viewing and modifying privileges.

1. Type the labels (maximum 20 characters) next to the field number.
2. To allow agents to view the field, click the View check box.
3. To allow agents to modify the contents of the field, click the Modify check box.

Notes: Check box with an x (☒) means that the option is enabled. Modify option is void unless you also check the View field. Field 1 601 has special weight. If you allow agents to view and modify this field, agents can add or delete any record. If you allow agents to view but not modify this field, you can check the modify option on other fields.

Agents can then modify information in fields other than Field 1. They cannot add or delete records. Text fields may contain spaces (for example, an address field: New York). Numeric fields default to integers.

Defining Primary Key Fields

The Primary Key fields 602 protect against duplicate data. You can choose one of three options in the Primary Key Definition area. None 604 turns off the Primary Key Field designation. Field 1 606 sets the first field as Primary Key. Field 1 and 2 608 sets the first and second fields as Primary Keys.

To select an option,

1. Click the option button for the option you want.
2. Click the Apply button to activate your labels and key definition.

The next chapter explains how to use the Agent Station window that you have just defined.

Chapter 3—Using the Agent Station

Figure 8:
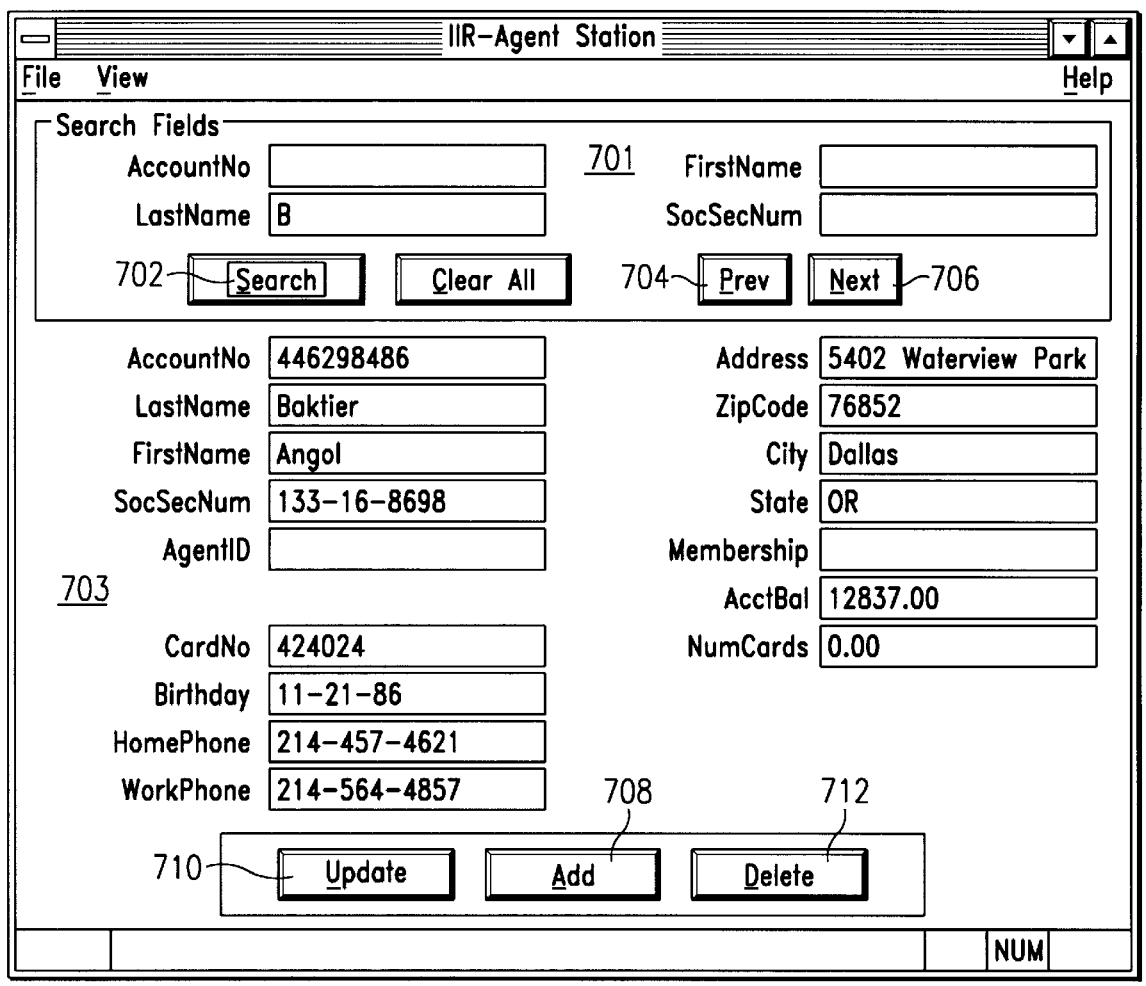
FIG. 8 illustrates agent station screens, options and operations of the user interface to the intelligent information router system of the present invention.

As shown by FIG. 8, the Agent Station window 700 is predefined by the Database Administrator (described in the previous chapter). With this window, an agent can modify the information in the database. To modify the fields shown, you must have modification privileges (see "Setting Up Fields").

Searching the Database

The first four fields contain information that the IIR engine uses to search the database. When it finds a match, it displays all fields for the record.

To search the database,

1. Type the search information in the Search Field(s) 701.
2. Click the Search button 702.

The search results appear in the fields 703 outside/below the Search Fields section. To move forward or backward in the database, click the Prev 704 or Next button 706. These buttons scroll one record at a time.

Using Wild Card Characters

When you search the database, the IIR produces exact matches only, with one exception. If you type "Donald" but have no matching data, IIR continues searching for any wild card characters to the right of the letters you type. So, for example, if the database contains a Donaldson, the IIR also finds that name.

Multiple Characters

If you are unsure of the spelling, use the percent sign as a wild card. For example, if you want to find a name but are not sure if the spelling is Anderson or Andersen, you would type "Anders%n." The IIR search engine finds all records that match the other letters: Anderson, Andersen, Andersan, Andersun, Andersian (the wild card can represent more than one letter). The search engine would display the first available match and you could then use the Prev or Next buttons to scroll back and forth through additional records. Depending upon your ODBC drivers, the search may or may not be case sensitive.

Single Character

You can also search for a single wildcard character by using the underscore character (_). (Insert: (_)). For example, in the case above with the name Anderson, if you type Anders_n, the search would not match the name Andersian, because it has two characters between the letters s and n.

Modifying the Database

Modifying the database includes adding, changing, or deleting information. Because the changes affect the record in the database, you must have privileges assigned by the Database Administrator.

Adding a Record

To add a record you must have modification privileges to Field 1.

1. Type the information in the fields 703 below the Search Fields 701.
2. Click the Add button 708 to create a new record.

Modifying a Record

To modify a record, you must have modification privileges to the field you want to modify.

1. Search the database for the record you want to modify, if it is not already displayed.
2. Click the Update button 710 to change the information.

Deleting a Record

To delete a record, you must have modification privileges to Field 1.

1. Search the database for the record you want to modify, if it is not already displayed.
2. Click the Delete button 712.

The record erases the record from the database and is not recoverable.

Chapter 4—Writing Script

Scripts are powerful tools that enable you to write a set of commands to automate for running repetitive tasks. The Intelligent Information Router engine reads and executes the commands, which you write in a special scripting language. The scripts are made even more powerful by allowing you to use conditional logic.

This chapter introduces you to the scripting process, including creating, modifying, and printing with the IIR script editor.

Using the Simulator Window

Figure 9C:
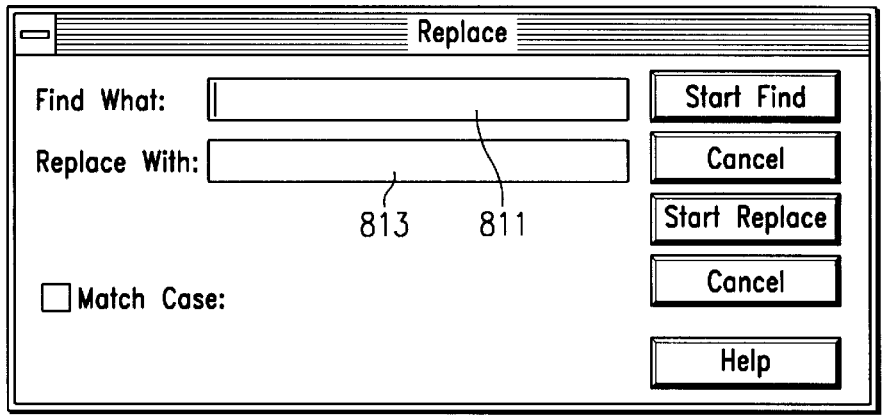
Figure 9A:
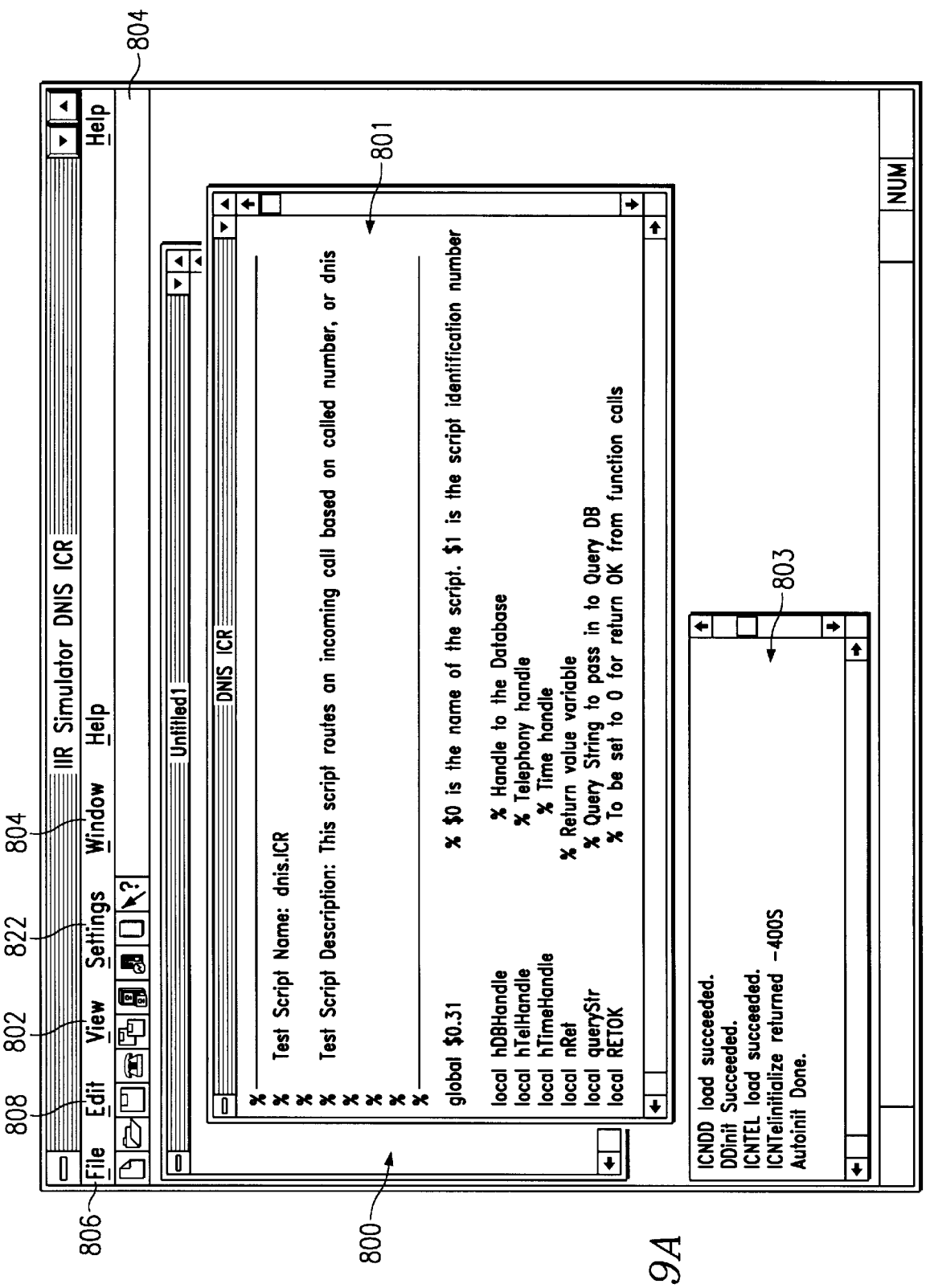

As shown by FIG. 9A, the Simulator window 800 has two sections: script section 801 and output section 803. The script section in the upper portion of the window displays the script windows. Each window serves as a script editor for writing and modifying your scripts.

Use the output section 803 in the bottom of the window to view the results of testing your script commands. When you open the window, this section also contains initialization information for related files. If you do not see this information, the simulator is not properly initialized.

You may open multiple edit windows and organize them in various arrangements (tile, cascade, etc.). The simulator window 800 shown in FIG. 9A has two scripts open. By default, the window opens with a blank page in the script window. When you save this script, the name of the script appears in the title bar of the script window.

Changing the Appearance of the Simulator Window

You can change the appearance of the Simulator window 800 to allow more workspace. From the View menu 802, click Toolbar and/or Status Bar to hide or unhide these objects. From the Windows menu 804, select Cascade to stagger your script windows. From the Windows menu 804, select Tile to see the scripts in rows. From the Windows menu 804, select Arrange Icons to align minimized (iconized) script windows. Move the output window. This window is dockable, meaning that if you move it to another border, it attaches itself to the border. You can also use it as standalone. To move the output window, grab it with your mouse and drag to another location. If you close the output window, you cannot reopen it until you exit the Simulator window and reopen.

Writing a Script

The IIR allows you to write as many scripts as you need. The IIR Script Editor is a simple ASCII text editor with a few enhanced options. With the IIR script editor, you can use formatting options (including fonts) and you can copy from other scripts, using standard Windows-based copy-and-paste techniques.

Opening a Script

When you open the Simulator application, a blank window appears by default. You can use this window to write a new script, open additional new windows, or open existing scripts.

New Script

If no blank windows are available, or to open additional blank windows,

1. From the File menu, select New.
2. Proceed to the section on page 19, "Formatting the Script."

Existing Script

To open an existing script,

1. From the File menu, select Open.
2. In the Open dialog box, select a script (scripts have the file extension .icr). This dialog allows you to search your directories for scripts. When you install the IIR Simulator, it creates a subdirectory named userscr for storing your scripts. If you want to have this dialog box open to this subdirectory, follow these steps. In Windows program manager, click to select the IIR Simulator icon. From the File menu, select properties. In the "working directory" field, enter the full path of the userscr directory. For example: c: \iir\sim\userscr. Click the OK button.
3. Click the OK button.
4. Proceed to the section, "Formatting the Script."

Formatting the Script

The general procedure for editing a script includes the steps below:

1. Place your cursor in a script window.
2. Begin typing. For information on the IIR scripting language, please refer to Appendix B.
3. From the File menu, select Save or Save As to save your script. The IIR uses the standard Windows Save dialog.

The formatting options are available from the Settings menu. Select Tab Stops to set the number of spaces to use for tabs. You may select from 1 to 16 spaces for tabs. The tab settings affect only the active script. Select Editor Font to select a font for the script editor (see "Choosing Fonts" on page 19 for information. The font setting affects all script windows. Select Word Wrap to wrap text from one line to the next without a line break. The Word Wrap option affects only the active script.

Copying from Other Scripts

The IIR script editor allows you to copy from other scripts by using Windows techniques for copy-and-paste. The script editor does not support drag-and-drop copying. Please refer to your Windows documentation if you need help with these techniques.

Choosing Fonts

Font choices apply to all scripts. You cannot maintain scripts with different fonts. IIR allows you to select True Type fonts for both screen and printer, although these fonts may produce undesirable results. Most True Type fonts are proportional, which means that each character uses a different amount of space. For example, the letter i uses less space than the letter w. In contrast, nonproportional fonts such as the Courier typeface are proportional. All these letters take up exactly the same space.

For printing, proportional fonts are considered easier to read. For formatting scripts, however, you cannot always vertically line up individual characters or lines of text if you use proportional fonts. If spacing is important to you, use a nonproportional font such as Courier, Terminal, MS Sans Serif, or MS Serif.

Also, you can edit any IIR script in any ASCII text editor, but not all text editors can use proportional fonts. If you open a script in one of these editors, your spaces and alignments will change and font appearance may be unpredictable.

Using the Find Dialog

To find a string of characters,

1. Place your cursor in the script you want to search.
2. From the Edit menu 808, select Find.
3. As shown by FIG. 9B, in the Find What field 809, type the string.
4. (Optional) Check the Match Case option to find only occurrences with exact match of uppercase and lowercase letters.
5. Check the direction for your search, Up (this point to beginning of script) or Down (this point to end).
6. Click the Find Next button to go to the string.

The dialog box does not close, allowing you to continue searching through the script text.

Using the Find and Replace Dialog

To find and replace a string of characters:

1. Place your cursor in the script you want to search.
2. From the Edit menu 808, select Find and Replace.
3. As shown by FIG. 9C, in the Find What field 811, type the string that you want to replace.
4. In the Replace With field 813, type the new string.
5. (Optional) Check the Match Case to find only occurrences with exact match of uppercase and lowercase letters. The editor replaces these strings with the exact case of the string in the Replace With field.
6. Click the Find Next button to go to the string.
7. When the string is found, click the Replace button to replace the string and find the next occurrence.

Or, click the Replace All button to replace all matching strings.

8. Click the Cancel button to close the window.

The dialog box does not close, allowing you to continue searching through the script text.

Saving Your Script

You can save your changes at any time. When you close the script or exit the IIR Simulator with unsaved changes, a dialog message prompts you to save your changes.

To save anytime, choose one option. From the File menu 806, select Save. If you are saving an existing script, this dialog saves changes to the existing file name. From the File menu 806, select Save As. If you are saving an existing script, this dialog prompts you for a new filename. It saves changes to the new filename, leaving the old file unaffected.

To save changes when you exit the IIR Simulator,

1. From the File menu 806, select Exit.
2. In the Save dialog message, choose click one button. Yes—Saves the changes to the filename shown in the dialog. No—Closes the application without saving any changes. Cancel—Returns to the program. Changes in your script are still intact, but the script is still unsaved.

Printing a Script

Figure 9D:
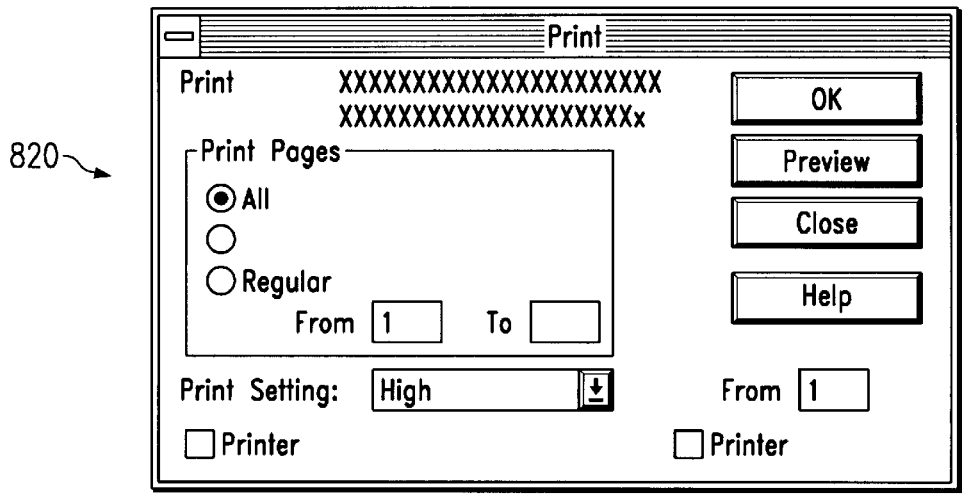

As shown by FIG. 9D, the IIR editor allows you to print your screen to paper or a file (ASCII). Your dialog window 820 may differ slightly from the one in FIG. 9D, depending upon your printer driver. Please refer to your Windows documentation if you need help with using the Print dialog window.

Previewing a Script

Before you print, you can see your script as it would print.

1. From the File menu 806, select Print>Preview.

2. Use the command buttons at the top of the Preview window to change the view.
3. Click the Close button to return to the editor.

Setting up the Printer

The IIR uses the Windows print setup dialog.

Selecting a Printer Font

By default, the IIR uses the System (non-True Type, nonproportional) font. You can change this font. Please refer to "Choosing Fonts" for information about proportional versus nonproportional fonts and how they affect your scripts.

To select a printer font,
1. From the Settings menu 822, select Printer Font.
2. Select Change to open the Font dialog box. Select Same as Display to use the same font that you use in the editor (no dialog box).

The next chapter provides more information on using the Simulator window.

Chapter 5—Testing and Implementing Your Scripts

The following stages explain the basic processes of creating and using scripts. Create the script, using the script editor in the IIR Simulator window. Test your scripts with simulated data and view their output in the IIR Simulator window. Implement the scripts with the VDN Administrator. This module sets up the scripts to work on your development platform. This chapter explains how to test and implement the scripts.

Testing Scripts

The IIR Simulator opens with a blank page in the screen editor. As shown by FIG. 9A, you can use the editor to write a script on this blank page or open an existing script. Generally, your scripts fall into one of two categories: telephony (involving data received from an incoming call or data supplied by the caller dialing more digits) or non-telephony (scripts which do not test telephony calls). The non-telephony calls probably represent a very small percentage of your scripts.

Testing Non-Telephony Scripts

To test a script,
1. Open the script if it is not already open.
2. Click the title bar of the script to make it active. A script must be active (on top, if you have more than one screen showing) for you to test it.
3. (Optional) From the Settings menu, select Hide While Running to hide the entire window while you are running the Simulator.
4. From the File menu, select Run Direct.
   Or, click the Simulate icon  on the toolbar.

Testing Telephony Scripts

To test a script,
1. Open the script (see "Opening a Script" for help) if necessary.
2. Click the title bar of the script to make it active.
3. (Optional) From the Settings menu, select Hide While Running to hide the entire window while you are running the Simulator.
4. From the File menu, select Simulate.
   Or, click the Simulate icon  on the toolbar.

Using the Telephony Handle Simulator

Figure 10A:
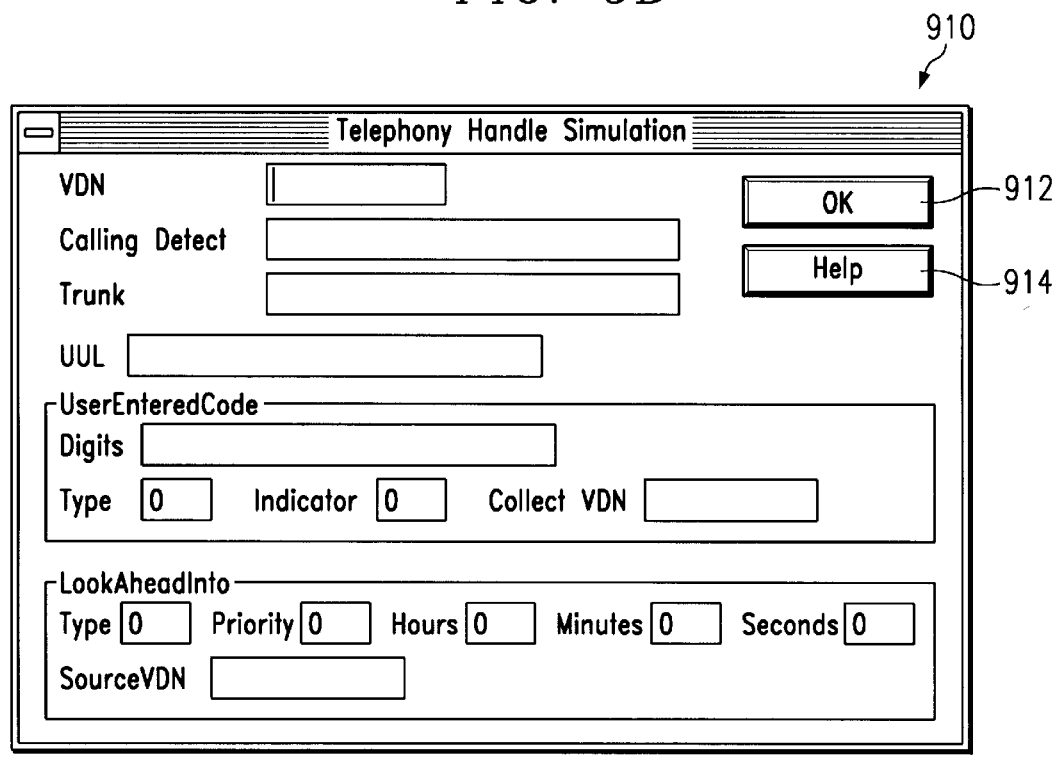
FIGS. 10a–e illustrate testing screens, options and operations of the user interface to the intelligent information router system of the present invention.

As shown by FIG. 10A, a new window 910 appears if you are simulating a telephony script. This window allows you to enter the information here to simulate the information that the route request would ordinarily provide for a live call.

To use this window
1. Enter the information you want to simulate. See Table 8 below.

2. Click the OK button.

The results of the test or simulation appear in the output window.

TABLE 8

| Fields | Description |
| --- | --- |
| VDN | Enter the VDN that would normally handle calls for this script. If you do not use VDN in your script, you do not need to enter anything in this field. |
| CallingDevice | Enter the calling device that represents a call that would normally route through your script. If you do not use CallingDevice in your script, you do not need to populate this field. |
| Trunk | Enter a trunk group that represents a call that would normally route through this script. If you do not use Trunk in your script, you do not need to populate this field. |
| UUI | Enter User-To-User Information (UUI) that represents a call that would normally route through this script. If you do not use UUI in your script, you do not need to populate this field. |
| UserEnteredCode Digits | Enter UserEnteredDigits that represents a call that would normally route through this script. If you do not use UserEnteredDigits in your script, you do not need to populate this field. |
| UserEnteredCode Type | Enter UserEnteredType that represents a call that would normally route through this script. If you do not use UserEnteredType in your script, you do not need to populate this field. |
| UserEnteredCode Indicator | Enter UserEnteredIndicator that represents a call that would normally route through this script. If you do not use UserEnteredIndicator in your script, you do not need to populate this field. |
| UserEnteredCode CollectionVDN | Enter UserEnteredVDN that represents a call that would normally route through this script. If you do not use UserEnteredVDN in your script, you do not need to populate this field. |
| LookAheadInfo Type | Enter LookaheadType that represents a call that would normally route through this script. If you do not use LookaheadType in your script, you do not need to populate this field. |
| LookAheadInfo Priority | Enter LookaheadPriority that represents a call that would normally route through this script. If you do not use Lookahead Priority in your script, you do not need to populate this field. |
| LookAheadInfo Hours | Enter LookaheadHour that represents a call that would normally route through this script. If you do not use Lookahead Hour in your script, you do not need to populate this field. |

TABLE 8-continued

| Fields | Description |
| --- | --- |
| LookAheadInfo Minutes | Enter LookaheadMinutes that represents a call that would normally route through this script. If you do not use Lookahead Hour in your script, you do not need to populate this field. |
| LookAheadInfo Seconds | Enter LookaheadSeconds that represents a call that would normally route through this script. If you do not use Lookahead Seconds in your script, you do not need to populate this field. |
| LookAheadInfo SourceVDN | EnterSourceVDN that represents a call that would normally route through this script. If you do not use Lookahead SourceVDN in your script, you do not need to populate this field. |

When you have entered the information required, you can begin the test. Click the OK button 912 to begin the simulation. Click the Cancel button 914 to end the Simulation.

Viewing the Results

Figure 10B:
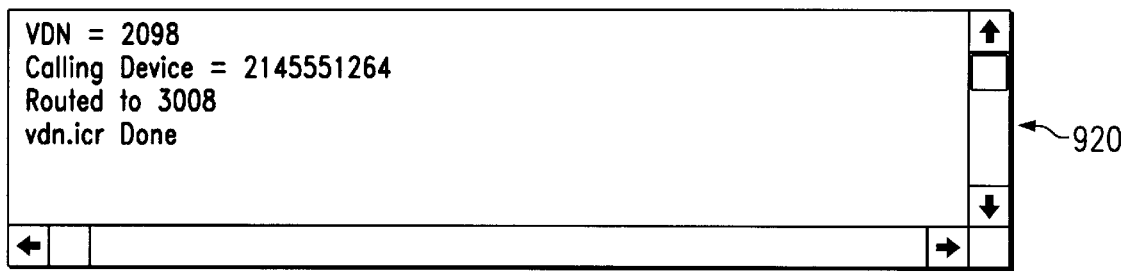

As shown by FIG. 10B, if you have print or println commands in your script, the results of your test appear in the output window 920 at the bottom of the screen.

Changing the Position

You can move the output window to any position on the screen, including leaving it as standalone or docking it to the top or sides of the window, but not resize it.

To move the window,
1. Click the window in the gray border area.
2. Drag to the new location.

To clear the output window, select Clear Output from the Edit menu.

Making the Script Available

When you have tested a script and viewed the successful output, you are ready to make the script available to your production environment.

To copy the script to another location,
1. Click the title bar of the script to make it active.
2. In the File menu, select Save As.
3. Save the script to your production subdirectory on the NetWare server usually \userscr.

You can also use Windows File Manager to copy the script to the appropriate subdirectory. When the script is in place, it is ready for you to associate with a Vector Directory Number (VDN), using the VDN Administrator.

Using the VDN Administrator

Figure 10C:
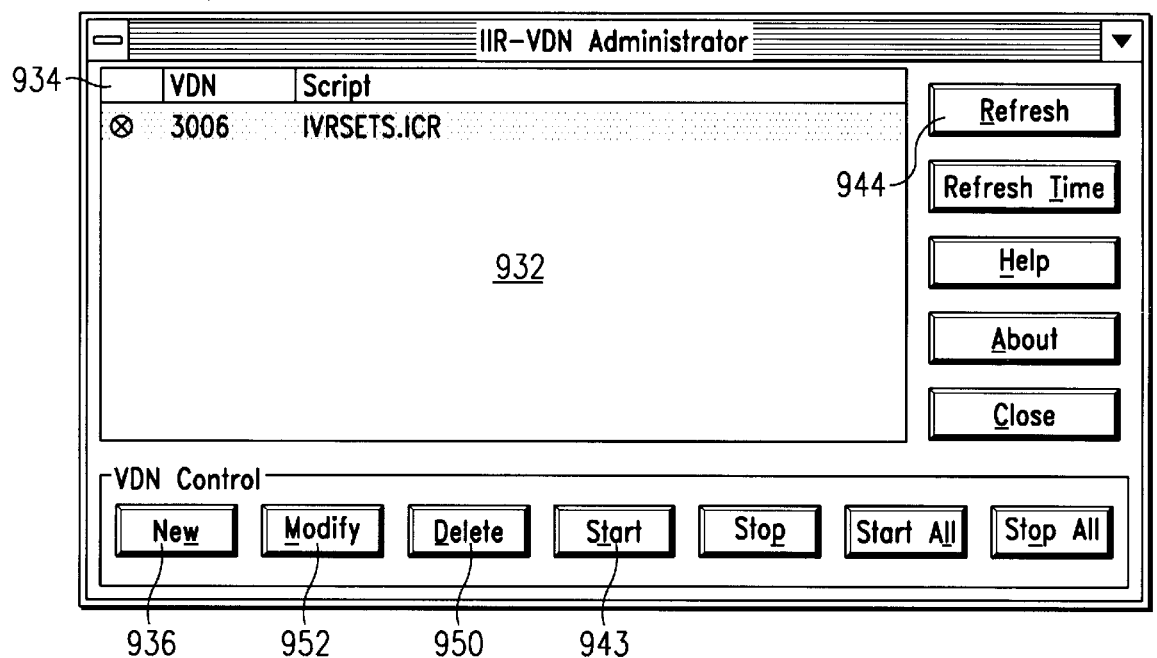

As shown by FIG. 10C, the VDN Administrator matches the scripts to the VDN and starts and stops the scripts on the production system. When you open the VDN Administrator window 930, a list box 932 displays all scripts that are set up for the system. You can click the column title (VDN or Script) to sort the list on that column.

Adding a Script

Figure 10D:
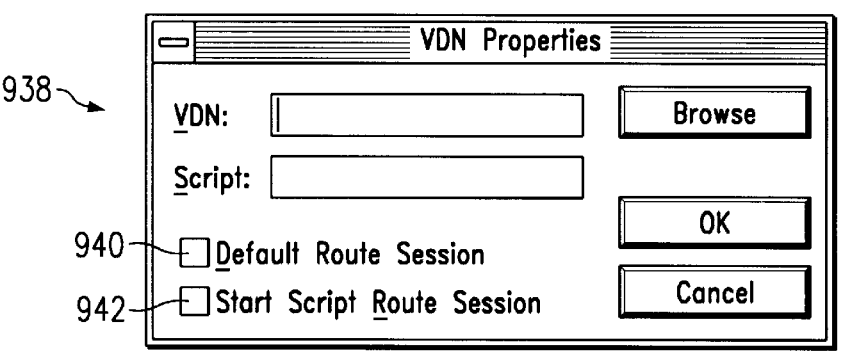

To add a script,
1. Click the New button 936 to open the VDN Properties window 938 shown by FIG. 10D.
2. Enter a VDN to associate with the script.
3. Enter the script filename (use the Browse button to find it).
4. Check one or both options. Set Default Route Session 940 to set all unassigned VDNs to run a designated script. Set Start Script Route Session 942 to assign a VDN to a script and sets the script to start immediately. You may set only one script for one VDN, but you may set more than one VDN for a single script.

Starting and Stopping a Script

Returning to FIG. 10C, if a script is not started or is inactive, the check box is empty and the script name appears as light gray. You may start a script with any of three methods. Click the Start button 943. Click the check box next to the VDN in the VDN Administrator window. Click the check box for Start Script Route Session in the VDN Properties window.

Refreshing the VDN Settings

The Refresh feature is helpful for determining which scripts are currently active or "started." For example, if a script is accidentally deleted or stopped, this window reflects the status when refreshed.

Using Refresh Command

To force the VDN Administrator to refresh the settings at any time, click the Refresh button 944. You can also set the screen to refresh automatically as shown in the next section.

Setting the Refresh Time Rate

Figure 10E:
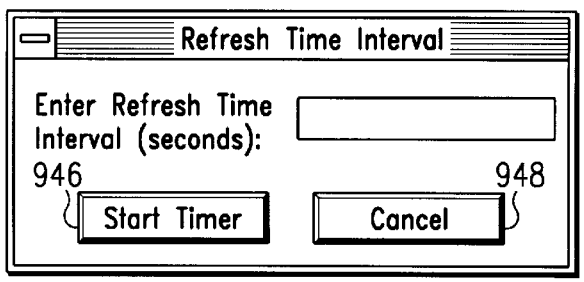

As shown by FIG. 10E, to set the automatic refresh rate,
1. Enter the refresh time using seconds.
2. Click the Start Timer button 946.

The default is ten (10) seconds. You may set any value from 10 to 64. To set the refresh to never refresh automatically, click the Cancel button 948.

Deleting a Script

Returning again to FIG. 10C, the Delete command in the VDN Administrator window does not remove the script from the directory. Instead, it removes the script from the window only.
1. Select the script you want to remove.
2. Click the Delete button 950 below the script list box.

Modifying the VDN Settings

Use the VDN Properties window to modify settings also.
1. Select a script in the list box.
2. Click the Modify button 952 to open the VDN Properties window 938.
3. Change the settings (see "Adding a Script" for further information).
4. Click the OK button to save your changes and close the window.

Chapters 5 and 6 have explained the overall concepts of the IIR Simulator window. The next chapter provides a detailed look at the IIR scripting language.

Chapter 6—Using the Scripting Language

The Intelligent Information Router (IIR) system is designed to route calls in a call center environment. The IIR is more intelligent and flexible than the existing ACD/PBX equipment, using the IIR Script as the mechanism through the system obtains the advanced intelligence and flexibility.

To develop the IIR scripts, you can use the IIR Simulator, a primary component of the IIR. The IIR Simulator provides an interactive script development environment for testing and debugging of scripts without leaving the tool. If you have not already become familiar with the IIR Simulator tool, please read the sections on "Writing Scripts" (beginning on page 17) and "Testing and Implementing your Scripts" (page 23) before continuing.

This chapter provides development-related details on the IIR script language, including standards, pragmas, and syntax.

Understanding the IIR Environment

It is important to understand how the IIR scripts integrate with other components in the call center. The IIR is an intelligent adjunct router when viewed from the switch perspective. The AT&T switch views the IIR as one of possibly several adjunct processors that will provide call routing direction back to the switch when requested.

Although the PBX/ACD can make rudimentary decisions about routing of calls through vector processing commands, it makes global routing decisions rather than customer-oriented routing decisions. For example, the PBX/ACD can determine routing based upon the number of agents available for a particular queue or time of day (for after-hours handling). The routing capability stops there, however, as the PBX/ACD does not have access to customer specific data nor the operations available to process such data in the vectoring commands. Although this type of routing was an advanced feature a few years ago, today's call centers are demanding more customer-oriented routing capabilities which is where the IIR takes over.

By integrating the IIR to the PBX/ACD as an adjunct routing controller, an option available through the vectoring capabilities on the switch, the IIR easily performs customer-specific routing. Through sophisticated logic control combined with access to customer-specific databases, the IIR increases productivity and service by allowing customer-specific routing.

Customer-specific routing can combine information such as ANI, customer-entered digits, or the VDN from which the caller is being routed to make determinations about the routing destination of the caller. For example, when the IIR receives the adjunct route request, it also receives the TSAPI route request message containing all pertinent information about the caller including ANI, originating VDN (DNIS), user-entered digits (DTMF collected), and many other fields. The IIR then uses this information to provide a database lookup and an eventual route based upon the logic in the IIR script.

The service and efficiency possibilities become almost limitless with this intelligent adjunct router. Consider the following scenario where the routing of the caller is determined by multiple factors in a specified order of priority.

A call center manager needs to provide three levels of service for the bank card customers. All bank card customers have been classified into three membership categories including Platinum, Gold, and Standard. The customer classification, along with the customers home phone, business phone, account number, current balance, account limit, and other information are stored in the IIR customer database. The call center manager designs multiple service queues for the different customer classification to provide the shortest waits along with the most experienced Customer Service Representatives (CSRs) to the Platinum, while the standard customers receive the longest queue times and least experienced representatives.

The switch sends all service calls to the IIR, The IIR then performs a lookup on the ANI information. If it finds a match, it determines the customer classification and returns the route for the appropriate agent queue. If it does not find a match, the IIR performs a RouteMore command that sends the call back to the switch for collection of account number digits. Then, based upon these digits, the IIR performs a lookup, matches the customer classification, and routes the call to the correct agent queue. Through this very simple case, the call center has transparently provided differentiated service without having to manage, publish, and maintain updates on different marketing numbers for different classes of service.

At this point, the call center administrator might decide to provide continuity to its Platinum members by always queuing them to a specific customer service agent, if available, while a customer related problem maintains an open state. The IIR can then match the service, determine Platinum, and then route the call to a specific agent, based upon dynamic updates made by the customer service agents. The IIR can determine not only if a specific agent is logged in, but also determine whether the agent is currently on an active call. By using combinations of priority and agent skills, the IIR could queue Platinum callers to a specific agent for preferential treatment.

The routing possibilities are extraordinary with the use of the IIR adjunct. The remainder of this chapter will explain how to develop an IIR script instead of the logical application. Scripting constructs, control flow, program structure, and script language reference will provide you with the knowledge to empower your call center.

Integrating IIR with the AT&T Switch

The section above discussed at a high level the integration of the IIR and some possible applications. Before attempting the language constructs, you will need to examine the functional integration of the IIR with the AT&T switch.

The first integration issue to consider is the component which actually controls whether the IIR is requested to determine a route: the PBX/ACD. The mechanism on the PBX/ACD which invokes the IIR is a combination of the Vector Directory Number (VDN) and call vectoring. Call vectoring is a limited "scripting" language on the switch which provides sequential handling of calls. A standard part of the call vectoring language is the adjunct route request step.

The adjunct route request step requires that the adjunct connect to the PBX/ACD via the ASAI link. In this case, a system running telephony services for the AT&T DEFINITY G3 connects to the switch and serves as the "information link" between the IIR and the switch. When the adjunct route request is encountered in the call vectoring sequence, the switch sends a Route Request Service from the switch to the IIR via the telephony server. This route request contains detailed information about the call that the IIR uses to route the call (which includes ANI, originating VDN, trunk, user-entered data [DTMF collected digits], and other information).

The IIR, a client to the telephony server, receives the route request service event and associates the originating VDN with one of the IIR scripts. All of the information in the Route Request Service request is available within the IIR script to use in determining the appropriate route. The IIR also has access to a customer database using one or several of the route request fields as a key to the database (i.e., it can match ANI against the phone number in the database to determine a record match).

Once the IIR has determined where to route the call, it issues a Route Select Service message back to the PBX/ACD via the telephony server. The Route Select Service message contains a destRoute field that the IIR fills in with the destination extension number (can represent VDN, agent login-id, etc.). The Route Select Service message can also be sent back with other fields used for application to application communications.

The general concept is fairly simple. The AT&T switch requests a route to be performed through the adjunct route request step in call vectoring. This sends a Route Request Service message to the IIR. The IIR determines which IIR script to execute based upon the origin VDN and executes this script. The script interacts with the customer database, applies logic to the information, and determines a route destination. This information is placed into the Route Select Service message which returns to the call vector awaiting routing direction.

The logic within the IIR script varies with each script, but the same basic process exists in each script. The following sections detail the actual functions used to perform these operations, along with details on all logic capabilities available in the IIR script language.

Using Operators and Expressions

This section explains operators and expressions of the IIR script language. Operators include arithmetic, logical (comparison), assignment operators, and others. Expressions include variable declarations, assignment expressions, and general expressions. The sections below explain how operators and expressions interact.

Variables (Declaration, Usage)

Variables fall into two classifications in the IIR scripting language: local and global. You must define all variables before referencing them in the script. Normally, you declare the variables near the top of a script, although you can declare them just before the section where they are used.

Local variables require the keyword local before the name of the variable. All local variables are variant in nature: they can contain either numeric (integer or float) or string data. The information associated with a variable depends upon the type of data assigned to the variable. Normally, the assignment is to a numeric or string valued returned from one of the IIR functions.

Local variables are created for each script execution and only exist throughout the execution of the script. Future invocations of the same script for a different call will reinitialize variables to default values. Local variables can be declared one per line, or can be combined on a single line within the script as shown by Example 5.

Example 5

| local | varOne |
| local | varTwo |
| local | varThree |
| local | varOne, varTwo, varThree |

Variable names can consist of up to 32 characters, and can have a combination of numeric and alpha characters and mixed case. Good programming practice dictates comments for each variable or set of variables. Comments can exist on the same line as the declaration, and each is prefaced with a '#' (pound) sign. The value of a local variable cannot be referenced until it has been assigned a value within the script as shown by Example 6.

Example 6

| local | varOne | #This is the first variable in the script |
| local | varTwo | #This is the second variable, used for string manipulation |
| local | varThree | #This is the third variable . . . |

Global variables are IIR specific variables that can be referenced or set in the script. These variables normally pass system information into the script (such as the script name, script execution id, or logging level for the particular script).

The global variables are not global between scripts, but instead apply to the instance of the script being executed. In addition, no global variables other than those defined by the system can be declared. In other words, the global definition only provides access to pre-existing system global variables and is not a declaration of a new global variable. Global variables are defined in the script by prefacing the variable name with the keyword global as shown by Example 7.

Example 7

| global | g_nICRLLogLevel | # Global variable to control logging level from this script |
| global | $0, $1 | # $0 is the name of the script being executed<br># $1 is the telephony event hande used to obtain the call information |

NOTE: Global variables '$0' and '$1' are necessary for obtaining the route request information for all telephony functions. These global variables should be, as a practice, exposed in all scripts by declaring them as shown above.

Simulating Constants with Variables

This scripting language does not provide true constants, although good programming practice defines at the top of the script the local variables that would normally be set as constants for ease in maintenance.

The following examples of Example 8 show variables declared and then assigned to be used as constants throughout the application. Note that the variables have been declared in all capitals, which is not necessary but allows for differentiation throughout the script.

Example 8

| local | RET_OK | # Valid return from all but handle allocations of 0 |
| local | DEFAULT_RTE | # Default route to send caller to |
| local | AFTERHR_RTE | # After hours default route |
| RET_OK=0 | | |
| DEFAULT_RTE=2999 | | |
| AFTERHR_RTE=3999 | | |

By defining these values at the top of the script, you can easily modify these values in a single location, even if you reference them many times in the script. This practice is particularly useful in setting up default routes that might change on an infrequent basis.

Arithmetic Operators

The binary arithmetic operators are (+, −, *, /). You can apply these operators to any numeric variables in the script, basing the result upon whether the arguments are integers or float. If either variable being operated on is float, the result is a float. If both variables are integer in type, the result is integer. You may combine integer and float variables in arithmetic operations without casting.

The following Example 9 shows examples of code and the result:

Example 9

```
local     numOne, numTwo, result      # declare
                                      variables for math
                                      ops
numOne = 4.8
numTwo = 2
result = numOne/numTwo        <result = 2.4>
result = numTwo * numTwo      <result = 4>
result = numOne – (numTwo * numTwo)    <result = 0.8>
```

Relational and Logical Operators

The following relational operators in Table 9 can compare numeric as well as string data.

TABLE 9

"==" — comarpison of equal
"<>" — comparison of does not equal
"<" — comprison of less than
">" — comparison of greater than
"<=" — comparison of less than or equal to
">=" — comparison of greater than or equal to The logical operators for forming expresssions are shown by Table 10:

TABLE 10

"Not" "And" "Or"

Some legal combinations of the above in an 'if' statement are shown by Example 10:

Example 10

If varOne is less than varTwo and varOne is not zero
if ( (varOne < var Two) And (varOne <>0)) then . . .
if ( (varOne < varTwo) And (Not varOne)) then . . .

Assignment Operators and Expressions

The only valid assignment operator is the "=" (single equal sign). This assignment operator can be used to assign numeric or string values to any variable. For example, the following assignments in Example 11 are all valid:

Example 11 local variantVar
variantVar=2
variantVar=3.0
variantVar="Eric"

The variable contains the last value assigned to it. The expressions to the right of the "=" assignment operator can be complex and can also evaluate to a binary value. In this scripting language, binary values are stored as integers with '1' as true, '0' as false. See Example 12.

Example 12

```
local     varOne, varTwo, result
varOne = 10
varTwo = 5
result = ((varOne/varTwo) == 2)
println "Result is = "+ result        <would print
                                      "Result is =
                                      1">
```

The following Example 13 shows the precedence order from top (highest) to bottom (lowest) of the expression operators.

Example 13

( ) (parenthesis always override other precendence rules)
* / (multiplication and division)
+– (addition and subtraction)
<<=>>= (relational operator)
==<> (equality checking)
And Or Not (logical operators)
= (assignment operator)

All operators on the same line are evaluated from left to right. All operations on a line higher than the line on which an operator is found will be evaluated before the operator in question. If you have any question about the precedence order of evaluation, use "( )" (parenthesis) to assure it is evaluated in the intended order. The following Example 14 shows how an expression would be evaluated based upon the above rules of order.

Example 14

```
local     numOne, numTwo, result
numOne = 3; numTwo = 2
result = numOne + numTwo * numOne  <result = 9>
```

Why is the result 9? The order of evaluation shows that all multiplication and division will be performed before addition and subtraction. Thus 'numTwo * numOne' is evaluated first, resulting in 6, and then added to numOne last. So the default evaluation, if containing parenthesis, would look like the following Example 15.

Example 15 result=numOne+(numTwo * numOne)

Always use parenthesis whenever doubt exists about the order of evaluation.

Script Output and String Operators

The string operators in the IIR scripting language are very easy to use. Strings can be combined using the '+' operator. In addition, non-string variables will automatically be converted to their string equivalents by adding them to an existing string as shown by Example 16.

Example 16

```
local     numVar, strVar, strVar2
numVar = 3
strVar = "This is a string, and a number"
strVar2 = strVar + numVar        <result would be
                                 "This is a string,
                                 and a number 3">
```

Multiple strings and variables can be concatenated on the same line. In addition, the comparison operators defined above in the relational operators section can be used to determine the equality of two strings.

Strings can be output in both the simulation and production modes. The output in the simulation mode is directed to the small output window in the lower portion of the simulator window. The output appears on the production system if the output is left intact in the script. The location of the output will be the ICRS Console session.

The commands for producing output to the debug window and ICRS console are print and println. Both commands take string arguments or expressions that evaluate to strings. The print statement does not go to a new line after printing the string, but the printin statement does. The print and println functions are extremely valuable for debugging in the simulator, but may result in cumbersome output to the screen on the production server. For this reason, consider commenting out all print/println statements in the script after you are convinced of its correct operation.

For the production server, the print/println can be a useful tool if common debugging statements are removed by only outputting those errors or events considered to be critical in nature. This method provides a real-time monitor of critical errors that can easily be monitored for activity.

One last form of output is via the logExpr function. This function works exactly like the println function with one difference: the destination of the output. The logExpr function's output is destined for the LOGn files in the \LOG subdirectory off of the simulator directory on the development system and off of the \ICRS directory on the production system.

Comments

Comments exist on any line of the script. The pound sign ('#') precedes all comments and defines the remainder of the line as comments. The '#' can be placed at the end of a valid line of logic or declarations, such as shown above in the variable declaration section. Any information following the comment declaration symbol serves as comment only on that line.

The following lines of Example 17 are all valid examples of comments.

Example 17

```

# Script Name: <your script>

# Description: <script description>

global $0, $1        # $0 is the script name, $1
                     is the call identifier
local    hTelHandle  # To hold
                     telephony handle
hTelHandle = ICRLAtoi($1)  # Convert the
                           telephony handle
                           to numeric
```

In this example, notice that some of the comments are placed at the beginning of the line, while others follow valid scripting components such as variable declarations.

Control Flow

Statements and Blocks

Statements consist of a single logical expression or assignment, such as Example 18 below:

Example 18

```
varOne = varTwo * 3
println "VarOne now equals "+ varOne
```

Multiple expressions can exist on the same line if separated by a semicolon separator(;). The separators provide a means of putting multiple short statements on a single line, as shown in the following Example 19:

Example 19 varOne=3; varTwo=6; varThree=14

Except for this case, lines in the script do not need to terminate with a terminating symbol. Blocks of statements fall sequentially in the scripting language into groups dictated by the beginning and end of constructs. No specific block begin/end symbol exists, but each construct (such as the if-else-endif) has self-defining block definitions.

If-Else-Endif

The if-else-endif construct expressed decisions. The formal syntax is as shown below in Table 11:

TABLE 11

```
if (expression) then
    <statement block 1>
else
    <statement block 2>
endif
``` where the else portion of the statement is optional. The expression is evaluated and if true, <statement block 1> is executed. If false, and the else portion is included, <statement block 2> is executed instead.

The <statement block n> may contain any combination of statements including more if-else-endif constructs. The endif portion of the statement must always be specified to terminate the block of statements being executed for the given expression.

The following Example 20 illustrates a three-way decision that would require an if-else-endif construct embedded within the else statement block.

Example 20

```
if ((tmpVal < 6) And (tmpVal <>0)) then
    <statement block 1>
else
    if ( tmpVal == 0) then     # tmpVal is 0
        <statement blcok 2>
else           # tmpVal >= 6 and not zero
        <statement block 3>
    endif
endif
```

Deeply nested if-else-endif statements can be cumbersome. If the test is simply to detect one of multiple values, the case statement may be a better operator as described below.

Select Statement

The select statement shown by Table 12 tests whether an expression matches one of a number of constant integer or string values, and branches accordingly.

TABLE 12

```
Select Case expression
    Case <value>
        <statement block 1>
    End Case
    Case <value2>
        <statement block 2>
    End Case
        .
        .
        .
    Case Else
        <Statement block n>
    End Case
End Select
```

Each case is labeled by only one integer or string value constant. If a case matches the expression value, execution starts at that case and continues to the End Case statement. Each case value must be different, while the case labeled Else is executed if none of the other cases are satisfied. Comparison values must either be integer values or strings (enclosed in double quotes) and cannot be mixed within the same select statement. The Else case is optional. If this case is not present, and if none of the cases match, no action takes place.

Loops: For-Next and Do-Loop Until

Both the For-New and Do-Loop Until constructs provide a means of looping through multiple iterations of a statement block. The For-Next construct is preferable when there is a known number of iterations for the loop, while the Do-Loop Until construct is preferable when looping until a specific condition is met.

The syntax of the For-Next construct is shown by Table 13:

TABLE 13

ForCountVariable=StartToEndStepIncrement
<statement block>
Next

In this syntax, Start and End indicate the beginning and ending increment value (for example, to loop from 1 to 20, Start would be 1 while End would be 20). The Increment value represents the step to take between iterations, normally 1.

The Example 21 below shows a For-Next statement followed by an increment other than 1. This loop would iterate 5 times even though the start and end are 1 and 21.

Example 21

For CountVariable=1 To 21 Step 4
<statement block>
Next

The other looping construct is the Do-Loop Until construct. As stated above, the Do-Loop Until construct is better suited to those conditions where the loop will terminate based upon a condition rather than a set number of iterations.

The Do-Loop Until syntax is shown by Table 14 as follows:

TABLE 14

Do
<statement block>
Loop Until (Expression)

The expression defined for this construct should evaluate to a Boolean expression, although it evaluates to true if the value is integer and non-zero.

Program Structure

At this point, you should be familiar with the basic language constructs and capabilities. This chapter combines this information with the functionality specific to an IIR script. More specifically, the sequence for a "standard" IIR script could be as follows:

1. Receive a route request.
2. Obtain customer specific information from the route request.
3. Access a customer database using one or several of the route request fields as a key.
4. Determine the correct route.
5. Send back the route select event.

This sequence represents a "standard" IIR script, although all IIR scripts may not follow this exact flow. Also, the actual logic varies for determining the appropriate route, depending on elements in the customer record and the specific routing task implemented.

The next section groups and describes the functions available for handling telephony, database, and miscellaneous tasks.

IIR Function Categorization

This section groups the available IIR functions by process, lists all functions in that group by name, and provides a short description of the functions purpose.

There are basically three logical groupings for the IIR functions. Telephony Event are those allowing read and write access to the Route Request/Select TSAPI events. Database Access are those functions providing access to the customer database. Miscellaneous Operation are those functions supporting such features as date, time, and string manipulation. Detailed information for each function is included in Section 5, Command Reference. Each function defined in the command reference includes a detailed description of the function along with examples of use for that function.

Telephony Event Functions

All of the telephony functions require that a "telephony handle" be passed to the call as the first parameter. This "telephony handle" is obtained at the beginning of the script using the global variable '$1'. The global variable '$1' represents the unique call identifier associated with this call and this instance of the running script. To obtain the telephony handle for this call, the '$1' global variable must be passed into the ICRLAtoi function to convert it to an integer handle. This operation needs to be done only once at the beginning of an IIR script to provide access to all of the telephony event information.

The call to make to convert the '$1' call identifier into a numeric telphony handle appears as follows in Example 22:

Example 22

| global | $1 | # $1 is the call identifier text string |
|---|---|---|
| local | hTelHandle | # Telephony handle for events |
| local | nRet | # Return value from calls |
| hTelHandle = ICRLAtoi($1) | | |
| . | | |
| . | | |
| SetRouteSelected (hTelHandle, "3333") | | # Route to extension 3333 |
| SetPriorityCal ( hTelHandle, 0) | | # Set priority to off |
| nRet=RouteFinal (hTelHandl) | | # return Route Select message |
| if ( nRet<>0) then | | |
|     println "error on Route Final in "+$0+ "of "+nRet | | |
| endif | | |

The telephony handle is valid from the point in the script that this call is made to the point where a RouteFinal or RouteUnknown is called. These functions inherently free the telephone handle in the system when they route the call. Any references to the telephone handle after invoking one of these functions will result in an error being returned.

In the above example, there are two Set fields which must be defined before performing the RouteFinal (mandatory components of the Route Final Request message). These two fields are priority and routeDest which are set using SetPriorityCall and SetRouteSelected respectively. The route final request will fail if these two fields have not been set before the call to RouteFinal.

Appendix C lists all telephony functions, including function types GetRteReq, SetRteSelect, and GetAgentState. Those functions with type GetRteReq access information from the Route Request message which initiates the scripts execution. Functions having type SetRteSelect set fields in the Route Select message which is sent back to the ACD/PBX with routing instructions. Finally, GetAgentState functions obtain state information on specific ACD agents. For detailed information on a specific telephony functionn, look at the detailed entry for that function.

Database Access Functions

The general classification of database functions includes all functions used to access customer information from the server based database. All functions that access the database require a database handle. This database handle defines the current record location in the database.

The database handle needs only to be created once at the beginning of the IIR script using the CreateDBHandle( ) function, and must be released before exiting the script using the DestroyDBHandle( ) function. The following script segment in Example 23 shows the calls necessary to allocate the database handle and release it upon completion of the script.

Example 23

```
local      hDBHandle      # Database handle
                          variable
local                     # Key to compare to
           keyValue       database field
local      nRet           # Return value from
                          function call
hDBHandle = CreateDBHandle()
if (hDBHandle == (0) then
           <invalid database handle, error
              processing>
else
           key Value = "(214)-612-5100"
           nRet = RunQuery( hDBHandle, "phoneNumber",
              "=", key Value )
endif
nRet = DestroyDBHandle( hDBHandle)
```

The database handle is valid from the point in the script where the CreateDBHandle is called until the DestroyDBHandle is called. The database handle must be released before exiting the IIR script to ensure proper resource management. Check the database handle returned from CreateDBHandle for a valid, non-zero value. A return value of 0 indicates that the system was unable to allocate access to the customer database and should be handled as an error condition.

The RunQuery function locates a record or records in the database. This function has four parameters: database handle, database field name, query operator (one of "<", "<=", "=", ">", ">="), and key value to compare to database values in the specified field name. The following Example 24 illustrates the RunQuery function:

Example 24

RunQuery(hDBHandle, "accountNo.", ">=", "123456789")

The literal string "accountNo" must be one of the field names defined through the database administration tool. This string is the field name stored in the database itself. The operator in this case is the literal string ">=" (greater than or equal to), while the comparison key value is the literal string "123456789."

This line directs IIR to locate the first record in the database organized by accountNo (ascending order) where "accountNo" is greater than or equal to "123456789." If the function returns 0, the query was successful.

When a query has succeeded, the database handle represents the location of the record found. Various Set . . . and Get . . . field functions can then be used to update or read the customer's record. The RunQuery operation provides no combination logic, which means that no way exists of specifying that (field1=KEY1 And field2<=KEY2). If you require this type of logic, position the database handle on a record using the field comparison that will result in the fewest number of matches. For example, in the example above field1=KEY1 would provide the most restrictive criteria.

Once the database pointer has been positioned on this record, all records that have field1=KEY1 can be cycled through using the MoveNextRecord function, while comparing field2 for being <=Key2 manually in the script. That logic would look similar to the Example 25 below:

Example 25

```
nRet = RunQuery( hDBHandle, "field1", "=", "12345"
if (nRet == 0) then
    Do
        if (GetStringFieldValue( hDBHandle, "field2")
            <="6789") then
                <process the customer record>
                Update Record( hDBHandle)
        endif
        nRet = MoveNextRecord( hDBHandle)
        fld1Tmp = GetStringFieldValue( hDBHandle,
            "field1")
    Loop Until ((nRet<>0) And (fld1Tmp == "12345"))
endif
```

Always check the result of the RunQuery function call. If the result is non-zero, the query was unsuccessful and the current record is not defined. As mentioned above, you must test the second field separately. Use the function GetStringFieldValue in combination with the field2 to check for the second condition (field2<=KEY2).

The function MoveNextRecord moves the database handle to the next record in ascending order of the field used in the RunQuery invocation, in this case field1. This next record must use field1 as well as field2 matching criteria. Although the query positions you at a matching record, it does not guarantee that the next or previous record match the same criteria, particularly in the case of the equal "=" comparison operator.

The MoveNextRecord and MovePreviousRecord operate according to the field index files stored with the database. These index files organize the field values in ascending order. In Example 26, a field1 index file might appear as:

Example 26

11111 12121 12345 15555 21221 33221 . . .

In this example, the field index file has organized the values into ascending numerical order forfield1. The key field value "12345" appears in this list, with no duplicates of this entry. For this example, the MoveNextRecord would result in the record having field1 value "15555" as the current record, showing the necessity to check the primary key each move operation when the operator is "=".

As shown in the previous paragraph, the "=" (equal to) operator requires a retest of the primary criteria on each move. This requirement is not true, however, for the remaining operators ("<", "<=", ">", and ">=") due to the nature of their comparison. Because the index file is organized in ascending order, these operators guarantee that the next or previous element in sequential order will satisfy the criteria (assuming you have not reached the beginning or end of the index file).

When using the move functions (MoveNextRecord and MovePreviousRecord), you must consider how their use relates to the comparison operator used in the RunQuery statement. In the example index file from above which uses an operator of ">" (greater than) and a key value of "12345", the first element to satisfy this query would be "15555". Using the MoveNextRecord would place you at "21221", and so forth.

If you use the operator "<" (less than) and a key value of "12345", the operation will place the database handle position at key "12121", the first element less than the key value "12345". In this case the MovePreviousRecord would be the correct function to move to the next record that meets the "<" (less than) criteria. The following Table 15 summarizes the relationship between the operator and the correct move function to use. In addition, whether or not the user needs to retest for the primary criteria on each move is defined for each operator.

TABLE 15

| Operators | Function for 'Next' Match | Retest Criteria Each Move? |
|---|---|---|
| "<" ">=" | MoveNextRecord | Not Required |
| "<" "<=" | MovePreviousRecord | Not Required |
| "=" | MoveNextRecord | Required |

Appendix C, "Command Reference," contains a summary of all database functions. This summary includes function types Database and all functions that can operate on a database, as well as a short description of operation an syntax.

Miscellaneous and System Functions

The classification of miscellaneous functions includes access to time and date information from the system. All functions accessing the time information require a time handle.

The time handle need only be created once at the beginning of the IIR script using the CreateTimeHandle( ) function, and must be released before exiting the script using the DestroyTimeHandle( ) function. The following script segment in Example 27 shows the calls necessary to allocate the time handle and release it upon completion of the script.

Example 27

```
local       hTimeHandle       # Time handle variable
local       nRet              # Return value form
                              function call
hTimeHandle=CreateTimeHandle⊖
if (hTimeHandle==0) then
    <hTimeHandle is invalid, error processing>
else
    nRet = GetCurrentTime (hTimeHandle)
println "Current date and time is:" + GetAscTime(
    hTimeHandle 0
```

-continued

```
•
•
endif
nRet = DestroyTimeHandle (hDBHandle)
```

The time handle is valid form the point in the script where the CreateTimeHandle is called until the DestroyTimeHandle is called. The time handle must be released before exiting the IIR script to ensure proper resource management. It is important to check the time handle returned from CreateTimeHandle for a valid, non-zero value. A return value of 0 indicates that the system was unable to allocate a time handle. Once the time handle is obtained successfully, the user must use the GetCurrentTime function to actually update the instance time and date data. This call must be made each time the time and date information needs to be refreshed.

System functions are those inherent functions with the ICRL prefix. These functions currently include string manipulation functions such as ICRLStrLen.

A summary of all time functions can be found in Appendix D, including function types MiscTime and System. For detailed information on a specific miscellaneous or system function, see the detailed entry for that function in the command reference section.

Guidelines to Follow

This chapter has now defined all primary script components, including the scripting language constructs and all available functions. Please be certain that you have read and understood this information before you continue.

The following section explains the components of a standard script. A standard script includes access to information from the Route Request message, comparison of this data to that stored in the customer database, and finally a determination of where to route the call.

The following call center scenario will be helpful in understanding the script example.

A credit card issuer wants to take away the laborious task of manually verifying new credit cards issued through the use of cagents. The issuer determines that a match on the caller's ANI (Automatic Number Identification, or simply put, the number from which they are calling) to the phone number in the customer database is sufficient for verification purposes, and can he automated using the IIR.

The IIR receives the adjunct route request, performs a lookup on the ANI information, and, if a match isvfound, updates the customer's record to reflect verification on the card. If a match is not found, the IIR uses the RouteMore capability to prompt the caller to enter other verification data (social security number, birth date, etc.).

Example 28 on the following page represents the IIR script that would handle these requirements. The example breaks down "blocks" of the script, A through G. The text following the example defines important issues for each section and describes the logic associated with that section.

Example 28

```
A.    global    $1–$0     $1 Is the call Identifier
                          $0 the script name
      local     hTelHandle, hDBHandle    # declare
                                         vars for DB
                                         and tel
```

-continued

```
                                                   handles
    local    queryRet, nRet, rteRet
        local       ANIValue   # ANI returned from tel
                                     call
                    # declare vars to be used as
                        constants
        local       RETOK NOT FOUND, INVALID_HNDL, FAIL
                        RTE, QUERY_SSN
        local       VALID_VDN
B.  # Initialize values for constants in the script
        RETOK = 0 INVALID_HNDL=0; FAIL_RTE="3000"
    QUERY_SSN = "3100"; VALID_VDN="3200"
        # Create DataBase and Telephone handles
        hDBHandle = CreateDBHandle()
        hTelHandle = ICRLAtoi($1)
C.  # Verify validity of database and telephony handles
            before proceeding
        If (hDBHandle == INVALID_HNDL Or hTelHandle ==
            INVALID_HNDL)  then
    SetRouteSelected (hTelHandle, FAIL_RTE_; SetPriorityCall
        (hTelHandle), (0)
        rteRet = RouteFinal ( hTelHandle )
    else # 2valid handles, proceed with card verification
D.  # the following line queries the DB for a match on
            "PhoneNo" field to ANI
        query Ret = RunQuery ( hDBHandle, "PhoneNo", "=",
            GetCallingDevice ( hTelHandle))
        # If the Query did not return OK, no match was
            found, try different KEY
        If ( query Ret=RETOK) then
        # Perform a RouteMore to a VDN that queries user to
            enter SSN
            SetRouteSelected( hTelHandle, QUERY SSN);
            SetPriorityCall ( hTelHandle 0)
            RouteMore ( hTelHandle)
            #try to locate the record by social secuirty
                num collected via Route More
            query Ret =RunQuery ( hDBHandle, "SSN", "m"
                (GetIVRDigits( hTelHandle))
            #If the SSN query does not match route to
                default hunt group
    If (query Ret <> RETOK) then
            SetRouteSelected( hTelHandle, FAIL_Rte);
                SetPriorityCall( hTelHandle, 0)
            rteRet = RouteFinal( hTelHandle)
        endif
    endif
    # If query Ret was successful, then we want to set
    VALIDATION and route to
    # VDN that will play mesage telling customer verification
    is complete.
E.  If (queryRet=RETOK)  then
            SetStringFieldValue ( hDBHandle, "Verification",
                "COMPLETE")
            nRet = UpdateRecord ( hDBHandle)
            If (nRet<>RETOK)  then
        println "Error In" + $0  + "updating DB record,
            Err="[?] +nRef
            SetRouteSelected( hTelHandle, FAIL_RTE);
                SetPriorityCall ( hTelHandle, 0)
            rteRet = UpdateRecord( hDBHandle )
        else
            SetRouteSelected( hTelHandle, FAIL_RTE); Set
                Priority Call( hTelHandle,0)
            rteRet = RouteFinal( hTelHandle)
        else
            SetRouteSelectedChTel handle, VALID_VDN; Set
                Priority Call (hTelHandle,0)
            rteRte=RouteFinal(hTelHandle)
        endif
    endif
    If ( rteRET <>RETOK) then
        println "Error In" + $0 + "routing call, Err="+
            rteRet
        endif
    endif
F.  DestroyDBHandle( hDBHandle )
```

The text below refers to the uppercase letters at the left margin of each block in the diagram.

Block A—Variable Declaration

This block declares the global and local variables. The global variables $1 and $0 are system-defined parameters that exist for every script execution. The variables are accessible by a script through the global declaration: global $1, $0. The variable $1 is a text string containing the call identifier assigned to it by the IIR when the Route Request message is received. This identifier obtains the telephony handle later in the script (the telephony handle is simply a numeric version of this identifier). The variable $0 is the script name. The script can use this variable for output to identify the script related to errors or diagnostics.

Items to note in this block include the declaration of variables to be used as constants (all variables defined with all capitals). These variables appear in uppercase in the example to make them easy to identify as constants in the script, but uppercase is not required.

Block B—Variable Initialization/Resource Handle Acquisition

This block begins with variable initialization and defines the "constants," which is a good coding practice for maintainability. The constants defined here are used to compare against return values from functions, as well as defining standard route values used throughout the script. Also notice the use of the semicolon between commands, allowing multiple commands to be placed on the same line.

The second half of this block deals with obtaining handles to the database and telephony event information. The telephony event handle is obtained by converting the call identifier ($1) to a numeric value. The database handle is created by invoking CreateDBHandle( ).

Block C—Validate Resource Handles

This block describes the validation of the resource handles obtained (telephony and database, in this case). The handles are tested against the defined constant INVALID_HNDL, and if either of the handles are invalid, the script attempts to perform a final routing of the call to an extension on the switch which might be an ACD queue for general call handling.

The RouteFinal is preceded by the SetRouteSelected and SetPriorityCall functions, which set mandatory fields in the Route Select message to send to the switch. If these two functions are not called preceding the RouteFinal, the call will not be routed successfully. The SetRouteSelected places the destination extension into the message while the SetPriorityCall places the priority of the Route Select message (0 or 1).

Block D—DB Query/RouteMore

This block displays the database query and the RouteMore function which are used when the initial query fails.

The purpose of the RunQuery call is to determine a match between the customer's ANI (obtained via GetCallingDevice) and the "PhoneNo" field in the database. The result of the operation will be zero (0) if a match is found. In this example, if the return from the query is non-zero (no record matches the caller's ANI), a secondary method verifies the account.

The secondary method attempts to match on social security number, which requires prompting and subsequent DTMF input by the caller. The RouteMore command gives control back to a VDN on the switch, while maintaining position in the current IIR script. By setting the selected route to a VDN containing prompting, digit collection (SetRouteSelected(hTelHandle,QUERY_SSN), and a subsequent adjunct route, you can wait for the second Route Request message and pick up in the IIR script after the RouteMore command.

The second RunQuery operation in this block uses information from the Route Request message as a result of the VDN that prompted for SSN digits. This example uses RouleMore only once, but the number of times that the IIR script can pass control back to a VDN on the switch is unlimited, as long as the VDN to which control is passed performs an adjunct route at some point in its processing.

The second RunQuery looks for a match between the field "SSN" in the database and the digits collected in the QUERY_SSN VDN. If the return from the query this time is not successful, the script routes to the default FAIL_RTE extension.

Block E—Update DB Record/Route Final

This block handles the case where either of the two database queries succeeded performed in Block D above. In this case the customer's record is updated to reflect the verification of the account, and the user is transferred to a VDN that notifies the caller of the verification.

The SetStringFieldValue function sets the Verification field in the database for the customer to COMPLETE. After modifying this field, the record is updated in the database using the UpdateRecord function. If the update is successful, the call is routed to the VDN that plays a message notifying the caller of the successful validation, otherwise the caller is sent to the FAIL_RTE extension for general call handling.

Block F—Release Resource Handles

This block is always executed, just as the creation of the database and telephony handles is in Block B. At this point, all resources allocated in the script must be released. The DestroyDBHandle function releases the database handle. The hTelHandle is automatically released when a RouteFinal operation is encountered.

The remainder of this chapter, Table 16, is a quick reference for scripting commands. The details for the commands are in Appendix C, "Command Reference."

TABLE 16

Command Summary

| Function Type | Function Name | Function Prototype | Description |
|---|---|---|---|
| GetRteReq | GetVDN | <string>=GetVDN(hTelHandle) | Returns a string that is the original destination VDN of the call. This field is often considered the DNIS for the call. |
| GetRteReq | GetCallingDevice | <string>=GetCallingDevice(hTelHandle) | Returns a string that is the call originating device. If outbound and PRI facilities, this is the ANI of the caller. |
| GetRteReq | GetTrunk | <string>=GetTrunk(hTelHandle) | Returns a string that is the trunk group number from which the call originate. Mutually exclusive with the calling device field. |
| GetRteReq | GetLookAheadType | <int>=GetLookAheadType(hTelHandle) | Returns an integer that represents the lookahead type for lookahead interflow. Examples of lookahead types are no interflow, all calls, threshold and vectoring interflow. |
| GetRteReq | GetLookAheadPriority | <int>=GetLookAheadPriority(hTelHandle) | Returns an integer that represents the priority in queue for a call forwarded via lookahead interflow (not in queue, low, medium, or high.) |
| GetRteReq | GetLookAheadHours | <int>=GetLookAheadHours(hTelHandle) | Returns an integer that is the hour in military time when the origin switch forwarded the call via lookahead interflow. |
| GetRteReq | GetLookAheadMinutes | <int>=GetLookAheadMinutes (hTelHandle) | Returns an integer that is the minute of the hour when the original switch forwarded the call via lookahead interflow. |
| GetRteReq | GetLookAheadSeconds | <int>=GetLookAheadSeconds(hTelHandle) | Returns an integer that is the second of the minute when the origin switch forwarded the call via lookahead interflow. |
| GetRteReq | GetLookAheadSrcVDN | <int>=GetLookAheadSrcVDN(hTelHandle) | Returns a string that is the name of the VDN on the original switch from which the call was forwarded via lookahead interflow. |
| GetRteReq ASISpecific | GetNumIVRSets | <int>=GetNumIVRSets(hTelHandle) | Returns an integer that is the number of user collected digit sets (IVR sets) as a result of multiple RouteMore calls. |
| GetRteReq ASISpecific | SetCurrentIVRSets | <int>=SetCurrentIVRSets(hTelHandle, IVRSetId) | Returns 0 on successful completion; Parameter IVRSetID is the iteration of user collected digits desired (0 based, 0 is the first route request data.) |
| GetRteReq | GetIVRType | <int>=GetIVRType(hTelHandle) | Returns an integer that is the user collected digits type (none, login digits, database provided, DTMF detector, etc.) |
| GetRteReq | GetIVRIndicator | <int>=GetIVRIndicator(hTelHandle) | Returns an integer that is the user collected digits indicator (entered or collected). |
| GetRteReq | GetIVRDigits | <string>=GetIVRDigits(hTelHandle) | Returns a string that represents the user collected digits, if any exist. For cases where RouteMore is used, the SetCurrent |

TABLE 16-continued

Command Summary

| Function Type | Function Name | Function Prototype | Description |
|---|---|---|---|
| GetRteReq | GetIVRCollectVDN | <string>=GetIVRCollectVDN(hTelHandle) | IVR Sets determines which set of collected digits is returned from this call. Returns a string with the extension number of the VDN from which the user digits were collected. |
| GetRteReq | GetIncomingUUIType | <int>=GetIncoming UUIType(hTelHandle) | Returns an integer that represents the type of UUI fields (none, user specific-binary, or ASCII text.) |
| GetRteReq | GetIncoming UUILength | <int>=GetIncoming UUILength(hTelHandle) | Returns an integer that is the length of the UUI information. field up to 32 bytes (0 represents no information in the field.) |
| GetRteReq | GetIncoming UUIData | <string>=GetIncomingUUIData(hTelHandle) | Returns a string that contains the user-to-user information. |
| SetRteSelect | SetRouteSelected | <int>=SetRouteSelected(hTelHandle, routeSelected) | Returns an integer 0 if successful, otherwise an error on setting route. The parameter routeSelected is a text string containing the route extension to store. REQUIRED field to route call. |
| SetRteSelect | SetDirectedAgentCall Split | <int>=SetDirectedAgentCallSplit(hTelHandle splitID) | Returns an integer 0 if successful, otherwise an error on setting splitID. The parameter Split ID is a text string containing the agent split/skill of the agent login-id specified in the routeSelected. |
| SetRteSelect | SetDestRoute | <int>=SetDestRoute(hTelHandle, rteInfo) | Returns an integer 0 if successful, otherwise an error on setting the destination route information. The parameter retInfo is a text string specifying the TAC/ARS/AAR information for off-PBX destinations. |
| SetRteSelect | SetPriorityCall | <int>=SetPriorityCall(hTelHandle, priority) | Returns and integer 0 if successful, otherwise an error on setting the route priority. The parameter priority is an integer that defines priority for on-PBX extension (on or off.) REQUIRED field to route call. |
| SetRteSelect | SetUserProvidedCode | <int>=SetUserProvidedCode(hTelHandle, type, code) | Returns an integer 0 if successful, otherwise an error. The parameter type is an integer with values none or database provided. The parameter code is a text field where applications can set digit strings that are treated as dial-ahead digits on return. |
| SetRteSelect | SetUserCollectCode | <int>=SetUserCollectCode(hTelHandle, type, digitsToCollect, timeout, specEvent) | Returns an integer 0 if successful, otherwise an error. <comeback> |
| SetRteSelect | SetOutgoingUUI | <int>=SetOutgoingUUI(hTelHandle), type, length, UUI) | Returns an integer 0 if successful, otherwise an error. The parameter type is an integer with possible values of none, user specific, or text. The parameter length is an integer set to the length of data, and UUI is a text field containing the UUI. |
| SetRteSelect | RouteFinal | <int>=RouteFinal(hTelHandle) | Returns an integer 0 if successful, otherwise an error from the route request. This function causes the Route Select message to be sent, and results in the telephony handlel being freed. |
| SetRteSelect ASISpecific | RouteMore | <int>=RouteMore(hTelHandle) | Returns an integer 0 if successful, otherwise an error from the route more request. This function maintains the location in the IIR script, while passing control back to a second VDN. |
| SetRteSelect | Route Unknown | <int>=RouteUnknown(hTelHandle) | Returns an integer 0 if successful. This function results in a Route Select message being sent with no route specified, resulting in the step following the adjunct step being executed at the switch. |
| GetAgentState | QueryAgentState | <int>=QueryAgentState(hTelHandle, agDevice, agSplit) | Returns an integer 0 if successful. The parameter agDevice is a text string that identifies the agent login-id. The parameter agSplit is a text string that identifies one of the valid splits/skills associated with the agent. |
| GetAgentState | GetAgentAvailable | <int>=GetAgentAvailable(hTelHandle) | Returns an integer that is the agent |

TABLE 16-continued

Command Summary

| Function Type | Function Name | Function Prototype | Description |
|---|---|---|---|
| ASISpecific | | | available state (either true or false.) This is an ASI specific combination of agentState and agent talk state. When true the agent is logged in and is ready to accept a call. |
| GetAgentState | GetAgentState | <int>=GetAgentState(hTelHandle) | Returns an integer that represents the agent state (based upon the QueryAgentState.) Possible agent state include not ready, null, ready, work not ready, and work ready. |
| GetAgentState | GetAgentWorkMode | <int>=GetAgentWorkMode(hTelHandle) | Returns an integer that represents the agent work mode (based upon the QueryAgentState.) Possible agent work modes include aux work, after call work, auto in, and manual in. |
| GetAgentState | GetAgentTalkState | <int>=GetAgentTalkState(hTelHandle) | Returns an integer that represents the agent talk (based upon the QueryAgentState.) Possible agent states are on call, and idle |
| Database | CreateDBHandle | dbHandle=CreateDBHandle( ) | Returns a numeric DB handle for this script instance. This dbHandle will he used throughout the IIR script instance to access the DB. If unable to allocate DB access, a NULL (0) will be returned. |
| Database | DestroyDBHandle | <int>=DestroyDBHandle(dbHandle) | Returns a 0 if successful. This function must be called before exiting an IIR script to release the database resources associated with the dbHandle allocated with CreateHandle( ). |
| Database | RunQuery | <int>=RunQuery(dbHandle, fieldName, queryOp, keyValue) | Returns 0 if successful, otherwise the error associated with the DB query. Parameter fieldName is the actual field name defined in the DB admin, queryOp is the operator for comparison (i.e. =., <, >, etc.), and keyValue is the key value for the query. |
| Database | InsertRecord | <int>=InsertRecord(dbHandle) | Returns 0 if successful, otherwise the error on the insert of the record. Record is created by using SetStringFieldValue and SetNumericFieldValue. The record inserted is an inherent part of the dbHandle. |
| Database | UpdateRecord | <int>=UpdateRecord(dbHandle) | Returns 0 if successful, otherwise the error on the update of the record. Record is updated by using SeStringFieldValue and SetNumericFieldValue while maintaining the key values in the record. |
| Database | ClearRecord | <int>=ClearRecord(dbHandle) | Returns 0 if successful, otherwise the error on the delete of the record. Record to delete is located initially by using the ainRunQuery function. |
| Database | MoveNextRecord | <int>=MoveNextRecord(dbHandle) | Returns 0 if successful, otherwise an error. Moves to the next record in the direction of search in the database based upon the key search value in RunQuery. |
| Database | MovePreviousRecord | <int>=MovePreviousRecord(dbHandle) | Returns 0 if successful, otherwise an error. Moves to the previous record in the direction of search in the database, based upon the key search value in RunQuery. |
| Database | GetStringFieldValue | <string>=GetStringFieldValue(dbHandle, fieldName) | Returns 0 if successful, otherwise an error. Returns the string value for the specified fieldName in the current record. |
| Database | GetNumericFieldValue | <int>=GetNumericFieldValue(dbHandle, fieldName) | Returns 0 if successful, otherwise an error. Returns the numeric value for the specified fieldName in the current record. |
| Database | SetStringFieldValue | <int>=SetStringFieldValue(dbHandle, fieldName, setValue) | Returns 0 if successful, otherwise an error. Sets the fieldName in the current record to the text string in setValue. |
| Database | SetNumericFieldValue | <int>=SetNumericFieldValue(dbHandle, fieldName, setValue) | Returns 0 if successful, otherwise an error. Sets the fieldName in the current record to the integer in setValue. |
| MiscTime | CreateTimeHandle | timeHandle=CreateTimeHandle( ) | Returns a non-zero integer if successful, otherwise no handle was allocated. Must |

TABLE 16-continued

Command Summary

| Function Type | Function Name | Function Prototype | Description |
|---|---|---|---|
| MiscTime | DestroyTimeHandle | <int>=DestroyTimeHandle(timeHandle) | be performed only once per script. Returns 0 if successful. Destroys the time handle allocated with CreateHandle( ). TimeHandle must be destroyed before exiting the IIR script. |
| MiscTime | GetCurrentTime | <int>=GetCurrentTime(timeHandle) | Returns 0 if successful. Obtains the current time associated with the timeHandle. |
| MiscTime | GetAscTime | <string>=GetASCTime(timeHandle) | Returns a string containing the date and time in string format. |
| MiscTime | GetHour | <int>=GetHour(timeHandle) | Returns an integer as the hour in military time based upon the most recent GetCurrentTime. |
| MiscTime | GetMinute | <int>=GetMinute(timeHandle) | Returns an integer as the minute of the hour based upon the most recent GetCurrentTime. |
| MiscTime | GetSecond | <int>=GetSecond(timeHandle) | Returns an integer as the second of the minute based upon the most recent GetCurrent Time. |
| MiscTime | GetDayOfMonth | <int>=GetDayOfMonth(timeHandle) | Returns an integer as the numeric day of month based upon the most recent GetCurrent Time. |
| MiscTime | GetMonth | <int>=GetMonth(timeHandle) | Returns an integer representing the month based upon the most recent GetCurrent Time. |
| MiscTime | GetYear | <int>=GetYear(timeHandle) | Returns an integer (last two digits) of the current year based upon the most recent GetCurrent Time. |
| MiscTime | GetDayOfWeek | <int>=GetDayOfWeek(timeHandle) | Returns an integer representing the day of the week (0 is Sunday, 1-Monday, etc.) based upon the most recent GetCurrent Time. |
| MiscTime | GetDayOfYear | <int>=GetDayOfYear(timeHandle) | Returns an integer representing the day of the year (out of 365) based upon the most recent GetCurrentTime. |
| MiscTime | GetDst | <int>=GetDst(timeHandle) | Returns an integer representing true/false for daylight savings time on the current system, based upon the most recent Get Current Time. |
| System | ICRLStrLen | <int>=ICRLStrLen(string) | Returns an integer that is the string length of the string parameter. |
| System | ICRLStrStr | <string>=ICRLStrStr(string, findStr) | Returns a string starting with the findStr in the string parameter passed in. |
| System | ICRLStrIndex | <int>=ICRLStrIndex(string, findStr, startIdx) | Returns an integer index where findStr is located within string. The search is started at the startIdx in the string parameter. |
| System | ICRLLeft | <string>=ICRLLeft(string, numChars) | Returns the substring that is the left most numChars of the string parameter. |
| System | ICRLRight | <string>=ICRLRight(string, numChars) | Returns the substring that is the right most numChars of the string parameter. |
| System | ICRLMid | <string>=ICRLMid(string, startChar, numChars) | Returns the substring defined to start at startChar (0 based), and of numChars length of the string parameter. |
| System | ICRLAtoi | <int>=ICRLAtoi(string) | Return the integer value for the string parameter. |
| System | ICRLStrCopy | <string>=ICRLStrCopy(string) | Makes a copy of the specified string parameter. |

Appendix C, "Command Reference," provides a detailed description with examples for each of these commands.

APPENDIX A—COMMAND REFERENCE

The commands in this section are presented in alphabetical order. Each command begins on a new page to make reference easier. For a quick summary only, see the previous section.

Function ClearRecord

The ClearRecord function removes a record in the database that has been located through the RunQuery or MoveNextRecord/MovePreviousRecord functions.

Syntax destVariable=ClearRecord(hDBHandle)

| Part | Description |
|---|---|
| destVariable | Variable receiving integer value representing success/failure of call. |
| hDBHandle | Variable that receives the allocated database handle |

Return Value

Returns 0 if successful, for an invalid database handle the function returns −5008. This function can also return errors in the range of −1 to −2000, which are negated error codes returned by Btrieve. Some of the more common errors returned by Btrieve are covered in the IIR trouble shooting guide.

Remarks

The ClearRecord function cannot be called before a database handle being obtained through the CreateDBHandle function, and a "current" record being defined through the RunQuery function call.

Note that after the record has been cleared, the current database record associated with the hDBHandle is undefined, and therefore any access to record data before another RunQuery call will result in an error.

Example—ClearRecord

```
[vanable declarations]
INVALID_HNDL = 0; RETOK=O
hDBHandle = CreateDBHandle( )
hTellHandle = ICRLAtoi($1)
# If unable to create a database handle, do default
    route processing
if (hDBHandle == INVALID_HNDL) then
perform default route processing
else
    nRet = RunQuery(hDBHandle, "AccountNo", "=",
      GetIVRDigits( hTellHandle))
    # If the Query returned return OK, then delete the
      record from the database
    if (nRet == RETOK ) then
      if (ClearRecord( hDBHandle ) < > RETOK ) then
        process error on deleting record
      endif
    endif
endif
DestroyDBHandle( hDBHandle )
```

Function CreateDBHandle

The CreateDBHandle function allocates a database handle from the resource manager, and provides the means to access and update database related information through the database related functions.

Syntax hDBHandle=CreateDBHandle( )

| Part | Description |
| --- | --- |
| hDBHandle | Variable that receives the allocated database handle |

Return Value

On failure, this function returns an integer value of 0 if the resource manager is unable to allocate a database handle.

Remarks

The CreateDBHandle function provides the access mechanism for all database related functions. The CreateDBHandle function is closely related to another of the database functions, DestroyDBHandle.

The DestroyDBHandle function must be called before exiting the IIR script to ensure proper management of the database handle resources. The allocation of a database handle does not locate a record within the database. Before performing any database record reads, updates, or deletions, the RunQuery function must be called successfully.

Example—CreateDBHandle

```
[variable declarations]
INVALID_HNDL = 0
```

```
hDBHandle = CreateDBHandle( )
hTelHandle = ICRLAtoi($1)
# If unable to create a database handle, do default
    route processing
if (hDBHandle == INVALID_HNDL) then
    perform default route processing
else
    nRet = RunQuery( hDBHandle, "AccountNo", "=",
      GetIVRDigits( hTelHandle ) )
    # If the Query returned return OK, then print
      out the customer information
    if ( nRet == RETOK) then
      1stName = GetStringFieldValue(hDBHandle,
        "LastName")
      frstName = GetStringFieldValue(hDBHandle,
        "FirstName")
      delCount = GetNumericFieldValue(hDBHandle,
        "DelinqCount")
      process caller based upon delinquent count
        and log if delinquent > 3
      if (delcount > 3) then
        println "Customer"+1stName+", "+frstName+"
          has del = "+delCount
      endif
    endif
endif
DestroyDBHandle( hDBHandle)
```

Function Create Time Handle

The CreateTimeHandle function allocates a time handle from the resource manager, and provides the means to access time/date related information through the Get time/date related functions.

Syntax hTimeHandle=CreateTimeHandle( )

| Part | Description |
| --- | --- |
| hTimeHandle | Variable that receives the time handle |

Return Value

On failure, this function returns a value of 0 if the resource manager cannot allocate a time handle.

Remarks

The CreateTimeHandle function provides the access mechanism for all time and date related functions such as GetHour, GetDayOfMonth, etc. The CreateTimeHandle function is closely related to two of the other time resource functions, DestroyTimeHandle, and GetCurrentTime.

The DestroyTimeHandle function must be called before exiting the IIR script to ensure proper management of the time handle resources. A call to GetCurrentTime after obtaining the time handle is necessary to obtain/update the time and date related information. All of the time/date Get . . . functions obtain their information based upon the most recent call to GetCurrentTime.

Example—CreateTimeHandle

```
[variable declarations]
RETOK = 0
INVALID_HNDL = 0
Create Time Handle
hTimeHandle =CreateTimeHandle( )
# make sure the time handle is valid before
    accessing the data
if (hTimeHandle < > INVALID_HNDL) then
    # obtain the time data information
    GetCurrentTIme( hTimeHandle )
```

```
        println "The current time is: " + GetAscTime(
            hTimeHandle)
        hr = GetHour( hTimeHandle ); min =
            GetMinute(hTimeHandle);
        sec = GetSecond(hTimeHandle)
        println "From components hh:min:ss: " + hr +":"
            + min +":"+ sec
        mo=GetMonth(hTimeHandle);
            day=GetDayOfMonth(hTimeHandle)
        yr=GetYear(hTimeHandle)
        println "From components, date is: " + mo + "/"
            + day + "/"+ yr
        println "Day of week:" +GetDayOfWeek
            (hTimeHandle)
        println "Daylight Savings Time (On/Off):" +
            GetDst(hTimeHandle)
        println "Day of year:" +
            GetDayOfYear(hTimeHandle)
        DestroyTimeHandle( hTimeHandle )
    endif
```

Function DestroyDBHandle

The DestroyDBHandle function frees a database handle back to the resource manager. This function is paired with the CreateDBHandle function, which allocates the database handle at the beginning of an IIR script.

Syntax
    destVariable=DestroyDBHandle(hDBHandle)

| Part | Description |
| --- | --- |
| destVariable | Variable receiving integer value representing success/failure of call |
| hDBHandle | Parameter that is the database handle in the script |

Return Value

If successful, this function returns 0. For an invalid database handle, this function returns an integer value of −5008.

Remarks

The DestroyDBHandle function must be called before exiting the IIR script to ensure proper management of the database handle resources, if a database handle has been allocated using the CreateDBHandle function before that point in the script.

Example—DestroyDBHandle

```
[variable declarations]
INVALID_HNDL = 0
hDBHandle = CreateDBHandle( )
hTelHandle = ICRLAtoi($1)
# If unable to create a database handle, do default
    route processing
if ( hDBHandle == INVALID_HNDL) then
    perform default route processing
else
    nRet = RunQuery( hDBHandle, "AccountNo", "=",
        GetIVRDigits( hTelHandle) )
    # If the Query returned return OK, then print
        out the customer information
    if ( nRet == RETOK) then
        1stName = GetStringFieldValue (hDBHandle,
            "LastName")
        frstName = GetStringFieldValue (hDBHandle,
            "FirstName")
        delCount = GetNumericFieldValue (hDBHandle,
            "DelinqCount")
        process caller based upon delinquent count
        and log if delinquent > 3
        if (delcount > 3) then
            println "Customer"+1stName+",
                "+frstName+" has del =
                "+delCount
        endif
    endif
endif
DestroyDBHandle( hDBHandle)
```

Function DestroyTime Handle

The DestroyTimeHandle function frees a time handle back to the resource manager. This function is paired with the CreateTimeHandle function which allocates the time handle at the beginning of an IIR script.

Syntax
    destVariable=DestroyTimeHandle(hTimeHandle)

| Part | Description |
| --- | --- |
| destVariable | Variable receiving integer value representing success/failure of call. |
| hTimeHandle | Variable that receives the time handle |

Return Value

This function returns a value of 0 if successful; −5008 if invalid.

Remarks

The DestroyTimeHandle function must be called before you exit the IIR script to ensure proper management of the time handle resources if a time handle has been allocated using the CreateTimeHandle function before that point in the script.

Example—DestroyTimeHandle

```
[variable declarations]
RETOK = 0
INVALID_HNDL = 0
Create Time Handle
hTimeHandle =CreateTimeHandle( )
# make sure the time handle is valid before
    accessing the data
if (hTimeHandle < > INVALID_HNDL) then
# obtain the time data information
    GetCurrentTime( hTimeHandle)
    println "The current time is: " + GetAscTime(
        hTimeHandle)
    hr = GetHour( hTimeHandle) min =
        GetMinute(hTimeHandle);
    sec = GetSecond(hTimeHandle)
    println "From components hh:mm:ss: " + hr + ":"
        + min + ":" + sec
    mo=GetMonth(hTimeHandle);
        day=GetDayOfMonth(hTimeHandIe)
    yr=GetYear(hTimeHandle)
    println "From components, date is: " + mo + "/"
        + day + "/" + yr
    println "Day of week: " +GetDayOfWeek(
        hTimeHandle)
    println "Daylight Savings Time (On/Off) : " +
        GetDst(hTimeHandle)
    println "Day of year:" +
        GetDayOfYear(hTimeHandle)
    nRet = DestroyTimeHandle( hTimeHandle )
endif
```

Function GetAgent Available

The GetAgentAvailable function returns either true or false (1,0) depending upon the state of the agent information obtained through the QueryAgentState call. The agent available state is a combination of the agent state and the agent talk state where the agent is ready and the talk state is idle.

Syntax
　　destVariable=GetAgentAvailable(hTelHandle)

| Part | Description |
| --- | --- |
| destVariable | Variable that receives the state of the agent availability. |
| hTel/Handle | Telephony handle obtained from ICRLAtoi ($1) function call. |

Return Value

This function returns an integer value that represents the available state of the agent defined in a previously executed QueryAgentState call. If the telephony handle is invalid, this function returns −4001.

Remarks

This function is dependent upon the agent information obtained in the QueryAgentState function call. This function will return an error if the QueryAgentState function has not been called with to obtain the agent state information for the specific agent.

Example—GetAgentAvailable

```
[variable declaration]
    SKILL_HUNT = "2800"
    hTelHandle = ICRLAtoi ($1)
    # "3600" represents a specific agents login-ID
    nRet = QueryAgentState( hTelHandle, "3600",
        SKILL_HUNT)
    if (GetAgentAvailable( hTelHandle ) ) then
        send caller to this specfic agent
else
        send caller to general queue for handling
endif
```

Function GetAgentState

The GetAgentState function returns the "ready" state of a given agent based upon the agent information obtained through the QueryAgentState call. This represents the agentState field from the Query Agent State Service message.

Syntax
　　destVariable=GetAgentState(hTelHandle)

| Part | Description |
| --- | --- |
| destVariable | Variable that receives the agent "ready" state, possible values are as follows:<br>0 = AG_NOT_READY - Agent is not ready to receive calls<br>1 = AG_NULL - Agent is not logged in on specified device/split<br>2 = AG_READY - Agent is available for calls or talking<br>3 = AG_WORK_NOT_READY - After call work occupied |
| hTelHandle | Telephony handle obtained from ICRLAtoi($1) function call. |

Return Value

This function retums an integer value that represents the agent "ready" state base upon the most recently executed QueryAgentState call. If the telephony handle is invalid, this function returns −4001.

Remarks

This function is dependent upon the agent information obtained in the QueryAgentState function call. This function will return an error if the QueryAgentState function has not been called with to obtain the agent state information for the specific agent.

Example—GetAgentState

```
[variable declarations]
    SKILL_HUNT ="2800"; AG_READY = 2; TS_IDLE = 1
    hTelHandle = ICRLAtoi ($1)
    "3600" represents a specific agents login-ID
    = QueryAgentState( hTelHandle, "3600", SKILL_HUNT)
    agState = GetAgentState( hTelhandle )
    agTalkState = GetAgentTalkState( hTelHandle )
    if ( agState ==AG_READY And agTalkState == TS_IDLE )
    then
        send caller to this specific agent
    else
        send caller to general queue for handling
    endif
```

Function GetAgentTalkState

The GetAgentTalkState function returns the talk state of an agent based upon the agent information obtained through the QueryAgentState call. This represents the talkState field from the Query Agent State Service message.

Syntax
　　destVariable=GetAgentState (hTelHandle)

| Part | Description |
| --- | --- |
| destVariable | Variable that receives the agent talk state, possible values are as follows:<br>0 = TS_ON_CALL - Agent is currently talking to a caller<br>1 = TS_IDLE - Agent is waiting for a caller |
| hTelHandle | Telephony handle obtained from ICRLAtoi($1) function call. |

Return Value

This function returns an integer value that represents the agent talk state base upon the most recently executed QueryAgentState call. If the telephony handle is invalid, this function returns −4001.

Remarks

This function is dependent upon the agent information obtained in the QueryAgentState function call. This function will return an error if the QueryAgentState function has not been called with to obtain the agent state information for the specific agent.

The agents talkState is only defined when the agentState is AG_READY. See GetAgentState for details on agentState.

Example—GetAgentTalkState

```
[variable declarations]
    SKILL_HUNT = "2800"; AG_READY = 2; TS_IDLE = 1
    hTelHandle = ICRLAtoi ($1)
    # "3600" represents a specific agents login-ID
    nRet = QueryAgentState( hTelHandle, "3600",
        SKILL_HUNT)
    agState = GetAgentState( hTelhandle )
    agTalkState = GetAgentTalkState( hTelHandle)
    if ( agState ==AG_READY And agTalkState ==
        TS_IDLE ) then
        send caller to this specfic agent
    else
        send caller to general queue for handling
    endif
```

Function GetAgentWorkMode

The GetAgentWorkMode function returns the work mode of a given agent based upon the agent information obtained through the QueryAgentState call. This represents the workMode field from the Query Agent State Service message.

Syntax
   destVariable=GetAgentWorkMode(hTelHandle)

| Part | Description |
| --- | --- |
| destVariable | Variable that receives the agent work mode, possible values are as follows:<br>1 = WM_AUX_WORK<br>2 = WM_AFTCAL_WK<br>3 = WM_AUTO_IN<br>4 = WM_MANUAL_IN |
| hTelHandle | Telephony handle obtained from ICRLAtoi($1) function call. |

Return Value

This function returns an integer value that represents the agent work mode based upon the most recently executed QueryAgentState call. If the telephony handle is invalid, this function returns −4001.

Remarks

This function is dependent upon the agent information obtained in the QueryAgentState function call. This function will return an error if the QueryAgentState function has not been called with to obtain the agent state information for the specific agent.

Example—GetAgentWorkMode

```
[variable declarations]
SKILL_HUNT ="2800"; AG _ READY = 2; TS_IDLE = 1
hTelHandle = ICRLAtoi($1)
# "3600" represents a specific agents login-I D
nRet = QueryAgentState( hTelHandle, "3600",
       SKILL_HUNT)
agState = GetAgentState( hTelhandle)
agTalkState = GetAgentTalkState( hTelHandle )
wkMode = GetAgentWorkMode( hTelHandle )
if ( agState ==AG_READY And agTalkState == TS_IDLE )
   then
      send caller to this specific agent
   else
      send caller to general queue for handling
endif
```

Function GetAscTime

The GetAscTime function returns a string containing the current date and time in the format "Thu Oct. 12 09:00:40 1995" based upon the date and time of the last call to GetCurrentTime in the IIR script.

Syntax
   destVanable=GetAscTime(hTimehlandle)

| Part | Description |
| --- | --- |
| destVariable | Variable receiving string that is ASCII date and time. The data is returned in the format "Thu Oct 12 09:00:40 1995". |
| hTimeHandle | Variable that was assigned a time handle via CreateTimeHandle call. |

Return Value

If successful, this function returns the string containing the formatted time and date. If unsuccessful, a zero length string will be returned (NULL string.)

Remarks

Allocate the time handle by calling CreateTimeHandle and obtain the time and date information through a call to GetCurrentTime before calling this function. The information returned by this call will be based upon the last call to GetCurrentTime in the script.

Example—GetAscTime

```
[variable declarations]
RETOK = 0
INVALID_HNDL = 0
# Create Time Hande
hTimeHandle =CreateTimeHandle()
# make sure the time handle is valid before
      accessing the data
if (hTimeHandle <> INVALID HNDL) then
      # obtain the fime data information
      GetCurrentTime( hTimeHandle )
      println "The current time is : " + GetAscTime(
            hTimeHandle )
      hr = GetHour(hTimeHandle); min =
            GetMinute(hTimeHandle);
      sec = GetSecond(hrimeHandle)
      println "From components hh:mm:ss "+ hr + ":" +
            min + ":" + sec
      mo=GetMonth(hTimeHandle);
            day=GetDayOfMonth(hTimeHandle)
      yr=GetYear(hTimeHandle).
      println "From components, date is: " + mo + "/"
            + day + "/" + yr
      println "Day of week:" +GetDayOfWeek(
            hTimeHandle)
      println "Daylight Savings Time (On/Off): " +
            GetDst(hTimeHandle)
      println "Day of Year:" +
            GetDayOfYear(hTimeHandle)
      DestroyTimeHandle:( hTimeHandle)
endif
```

Function GetCallingDevice

The GetCallingDevice function returns the calling device number (extension or phone number) of the originating party. For calls that originate on-PBX, or incoming calls over PRI facilities, the calling device number is returned. No information is returned by this command for incoming calls over non-PRI lines, however, the Trunk Group Number is available from the GetTrunk command. This parameter is obtained from the Route Request Service message (Version 2), callingDevice field.

Syntax
   destVariable=GetCallingDevice(hTelHandle)

| Part | Description |
| --- | --- |
| destVariable | Variable that receives the string returned from this function. |
| hTelHandle | Telephony handle obtained from ICRLAtoi($1) function call. |

Return Value

This function returns a string expression that represents the calling device extension/number. If the return value is a zero length string, no callingDevice information was received for this call. If the telephony handle is not valid, this function returns the string "NULL_POINTER".

Remarks

The callingDevice field in the Route Request Service message is an optional component of this message, therefore it may not exist for each call. This field, for calls incoming over PRI facilities is the ANI (Automatic Number Identification) value. The callingDevice field is mutually exclusive with the trunk field accessed through the GetTrunk function. This means one or the other of callingDevice or trunk are available in the message, but never both.

Example—GetCallingDevice

```
[variable declarations]
# obtain telephony handle by converting call ID to
    numeric value
hTellHandle = ICRLAtoi( $1 )
ANI = GetCallingDevice( hTelHandle )
# checking for a zero length string determines
    whether the field is in the message
if (ANI <> "") then
        println "The calling device (ANI) is = "+ ANI
else
        # the trunk data will be available when the
            calling device isn't
        trunkID = GetTrunk( hTelHandle )
        println "The inbound trunk group ID = "+
            trunkID
endif
```

Function GetCurrentTime

The GetCurrentTime function sets or refreshes the current date and time associated with the specified time handle. All Get . . . time and date functions receive information based upon the last invocation of this function.

Syntax
    destVariable=GetCurrentTime(hTimeHandle)

| Part | Description |
| --- | --- |
| destVariable | Variable receiving integer specifying success/failure of call. |
| hTimeHandle | Variable that was assigned a time handle via CreateTimeHandle call. |

Return Value

If successful, this function returns 0; if invalid time handle, this function a value of −5008.

Remarks

A call to GetCurrentTime after obtaining the time handle is necessary to obtain/update the time and date related information. All of the time/date Get . . . functions obtain their information based upon the most recent call to GetCurrentTime. Allocate the time handle by calling CreateTimeHandle before calling this function.

Example—GetCurrentTime

```
[variable declarations]
RETOK = 0
INVALID_HNDL = 0
Create Time Handle
hTimeHandle =CreateTimeHandle()
# make sure the time handle is valid before
    accessing the data
if (hTimeHandle <> INVALID_HNDL) then
            # obtain the time data information
            GetCurrentTime( hTimeHandle)
            println "The current time is:" +
                GetAscTime( hTimeHandle)
            hr = GetHour( hTimeHandle ); min =
                GetMinute(hTimeHandle);
            sec = GetSecond(hTimeHandle)
            println "From components hh:mm:ss " + hr +
                ":" + min + ":" + sec
            mo=GetMonth(hTimeHandle);
                day=GetDayOfMonth(hTimeHandle)
            yr=Getyear(hTimeHandle)
            println "From components, date is: "+ mo +
                "/" +day + "/" + yr
            println "Day of week:" +GetDayOfWeek(
                hTimeHandle)
            println "Daylight Savings Time (On/Off) : "
                + GetDst(hTimeHandle)
            println "Day of year:"+
                GetDayOfYear(hTimeHandle)
            DestroyTimeHandle( hTimeHandle)
endif
```

Function GetDayOfMonth

The GetDayOfMonth function returns an integer representing the current day of the month (1–31) based upon the most recent call to GetCurrentTime within the script.

Syntax
    destVariable=GetDayOfMonth(hTimeHandle)

| Part | Description |
| --- | --- |
| destVariable | Variable receiving an integer that is the current day of the month (1 -31.) |
| hTimeHandle | Variable that was assigned a time handle via CreateTimeHandle call. |

Return Value

If successful, this function returns an integer defining the current day of the month. If invalid, the function returns −5008.

Remarks

It is necessary to allocate the time handle by calling CreateTImeHandle and obtain the time and date information through a call to GetCurrentTime before calling this function. The information returned by this call will be based upon the last call to GetCurrentTime in the script.

Example—GetDayOfMonth

```
[variable declarations]
RETOK = 0
INVALID_HNDL = 0
Create Time Handle
hTimeHandle =CreateTimeHandle()
# make sure the time handle is valid before
    accessing the data
if (hTimeHandle <> INVALID_HNDL) then
        # obtain the time data information
        GetCurrentTime( hTimeHandle )
        println "The current time is:" + GetAscTime(
            hTimeHandle)
        hr = GetHour( hTimeHandle ); min =
            GetMinute(hTimeHandle);
        sec = GetSecond(hTimeHandle)
        println "From components hh:mm:ss: "+ hr + ":"
            + min + ":" + sec
        mo=GetMonth(hTimeHandle);
            day=GetDayOfMonth(hTimeHandle)
        yr=GetYear(hTimeHandle)
        println "From components, date is:" + mo + "/"
            + day + "/" + yr
        println "Day of week:" +GetDayOfWeek
            (hTimeHandle)
        println "Daylight Savings Time (On/Off): " +
            GetDst(hTimeHandle)
        println "Day of year:" +
            GetDayOfYear(hTimeHandle)
        DestroyTimeHandle:( hTimeHandle )
endif
```

Function GetDayOfWeek

The GetDayOfWeek function returns an integer representing the current day of the week (1–7); the base or first day (1) being Sunday, based upon the most recent call to GetCurrentTime within the script.

Syntax destVariable=GetDayOfWeek (hTimeHandle)

| Part | Description |
|---|---|
| destVariable | Variable receiving an integer that is the current day of the week (1-7) where the first day of the week is Sunday (I=Sunday, 2=Monday, etc.) |
| hTimeHandle | Variable that was assigned a time handle via CreateTimeHandle a call. |

Return Value

If successful, this function returns an integer defining the current day of the week; if invalid time handle, the function returns −5008.

Remarks

It is necessary to allocate the time handle by calling CreateTimeHandle and obtain the time and date information through a call to GetCurrentTime before calling this function. The information returned by this call will be based upon the last call to GetCurrentTime in the script.

Example—GetDayOfWeek

```
[variable declarations]
RETOK = 0
INVALID_HNDL = 0
Create Time Handle
    hTimeHandle =CreateTimeHandle()
    # make sure the time handle is valid before
        accessing the data
    if (hTimeHandle <> INVALID_HNDL) then
        # obtain the time data information
        GetCurrentTime( hTimeHandle )
            println "The current time is:" + GetAscTime
                (hTimeHandle)
        hr = GetHour( hTimeHandle ); min =
            GetMinute(hTimeHandle);
        sec = GetSecond(hTimeHandle)
        println "From components hh:mm:ss:" + hr + ":" + min
            + ":" + sec
        mo=GetMonth(hTimeHandle);
            day=GetDayOfMonth(hTimeHandle)
        yr-GetYear(hTimeHandle)
        prntln "From components, date is:" + mo + ":" + day
            + "/" + yr
        println "Day of week:" +GetDayOfWeek( hTimeHandle)
        println "Daylight Savings Time (On/Off):" +
            GetDst(hTimeHandle)
        println "Day of year:" + GetDayOfYear(hTimeHandle)
        DestroyTimeHandle( hTimeHandle )
    endif
```

Function GetDayOfYear

The GetDayOfYear function returns an integer representing the current day of the year (1–366); the base or first day January 1 (1=Jan 1) based upon the most recent call to GetCurrentTime within the script.

Syntax
    destVariable=GetDayOfYear(h TimeHandle)

| Part | Description |
|---|---|
| destVanable | Variable receiving an integer that is the current day of the year (I-366) where the first day of the year is Jan 1 (1=Jan 1.) |
| hTimeHandle | Variable that was assigned a time handle via CreateTimeHandle call. |

Return Value

If successful, this function returns an integer defining the current day of the year. For the case of an invalid time handle, the function returns −5008.

Remarks

It is necessary to allocate the time handle by calling CreateTimeHandle and obtain the time and date information through a call to GetCurrentTime before calling this function. The information returned by this call will be based upon the last call to GetCurrentTime in the script.

Example—GetDayOfYear

```
[variable declarations]
RETOK = 0
INVALID_HNDL = 0
Create Time Handle
    hTimeHandle =CreateTimeHandle()
    # make sure the time handle is valid before
        accessing the data
    if (hTimeHandle <> INVALID_HNDL) then
        # obtain the time data information
        GetCurrentTime( hTimeHandle )
            println "The current time is)" + GetAscTime(
                hTimeHandle )
        hr = GetHour( hTimeHandle ); min =
            GetMinute(hTimeHandle);
        sec = GetSecond(hTimeHandle)
        println "From components hh:mm:ss : " + hr +
            ":" + min + ":" + sec
        mo = GetMonth(hTimeHandle);
            day=GetDayOfMonth(hTimeHandle)
        yr=GetYear(hTimeHandle)
        println "From components, date is:" mo + "/" +
            day + "/" + yr
        println "Day of week:" +GetDayOfWeek
            (hTimeHandle)
        println "Daylight Savings Time (On/Off): " +
            GetDst(hTimeHandle)
        println "Day of year:" +
            GetDayOfYear(hTimeHandle)
        DestroyTimeHandle( hTimeHandle )
    endif
```

Function GetDst

The GetDst function returns an integer representing the current status of daylight savings time (on or off). This information is based upon the most recent call to GetCurrentTime within the script.

Syntax
    destVariable=GetDst(hTimeHandle)

| Part | Description |
|---|---|
| destVariable | Variable receiving an integer that is the state of daylight savings time (0=Off, 1=On). |
| hTimeHandle | Variable that was assigned a time handle via CreateTimeHandle call. |

Return Value

If successful, this function returns an integer defining the current daylight savings time state. For the case of an invalid time handle, the function returns −5008.

Remarks

It is necessary to allocate the time handle by calling CreateTimeHandle and obtain the time and date information through a call to GetCurrentTime before calling this function. The information returned by this call will be based upon the last call to GetCurrentTime in the script.

Example—GetDst

```
[vanable declarations]
RETOK = 0
INVALID_HNDL = 0
```

```
# Create Time Handle
hTimeHandle =CreateTimeHandle()
# make sure the time handle is valid before
    accessing the data
if (hTimeHandle <> INVALID_HNDL) then
        # obtain the time data information
        GetCurrentTime( hTimeHandle )
        println "The current time is : " + GetAscTime
            (hTimeHandle )
        hr = GetHour( hTimeHandle ); min =
            GetMinute(hTimeHandle);
        sec = GetSecond(hTimeHandle)
        println "From components hh:mm:ss: " + hr + ":"
            + min + ":" + sec
        mo=GetMonth(hTimeHandle);
            day=GetDayOfMonth(hTimeHandle)
            yr=GetYear(hTimeHandle)
        println "From components, date is : " + mo +
            "/" + day + "/" + yr
        println "Day of week:" +GetDayOfWeek
            (hTimeHandle)
        println "Daylight Savings Time (On/Off): " +
            GetDst(hTimeHandle)
        println "Day of year:" +
            GetDayOfYear(hTimeHandle)
        DestroyTimeHandle( hTimeHandle )
endif
```

Function GetHour

The GetHour function returns an integer representing the current hour based upon the most recent call to GetCurrentTime within the script.

Syntax destVariable=GetHour(hTimeHandle)

| Part | Description |
| --- | --- |
| destVariable | Variable receiving an integer that is the current hour (0–23) |
| hTimeHandle | Variable that was assigned a time handle via CreateTimeHandle call. |

Return Value

If successful, this function returns an integer defining the current hour. For the case of an invalid time handle, the function returns −5008.

Remarks

It is necessary to allocate the time handle by calling CreateTimeHandle and obtain the time and data information through a call to GetCurrentTime before calling this function. The information returned by this call will be based upon the last call to GetCurrentTime in the script.

Example—GetHour

```
[variable declarations]
RETOK = 0
INVALID_HNDL = 0
Create Time Handle
hTimeHandle =CreatTimeHandle()
# make sure the time handle is valid before
    accessing the data
if (hTimeHandle <> INVALID_HNDL) then
        # obtain the time data information
        GetCurrentTime( hTimeHandle )
println "The current time is : " + GetAscTime(
    hTimeHandle )
    hr = GetHour( hTimeHandle ); min
        GetMinute(hTimeHandle);
    sec = GetSecond(hTimeHandle)
    println "From components hh:mm:ss : " + hr +
        ":" + min + ":" + sec
    mo=GetMonth(hTimeHandle);
        day=GetDayOfMonth(hTimeHandle)
        yr=GetYear(hTimeHandle)
    println "From components, date is : " + mo +
        "/" + day + "/" + yr
    println "Day of week :" +GetDayOfWeek
        (hTimeHandle)
    println "Daylight Savings Time (On/Off) : " +
        GetDst(hTimeHandle)
    printin "Day of year" +
        GetDayOfYear(hTimeHandle)
    DestroyTimeHandle( hTimeHandle)
endif
```

Function GetIncoming UUIData

The GetIncomingUUIData function returns the user-to-user information data. The type of user-to-user information, obtained through the GetIncomingUUIType, indicates the presence of user-to-user information (UUI) including the UUI Data.

Syntax destVariable=GetIncomingUUIData(hTelHandle)

| Part | Description |
| --- | --- |
| destVariable | Variable that receives the string representing the UUI Data. |
| hTelHandle | Telephony handle obtained from ICRLAtoi($1) function call. |

Return Value

This function returns a string value that represents the user-to-user information data. For an invalid telephony handle, the function returns the string "NULL_POINTER".

Remarks

The userinfo.type, accessed through the function GetIncomingUUIType, determines whether or not any user-to-user information actually exist. If the userInfo type is none (−1), there is no user-to-user information for this call.

All userInfo parameters contained in the Route Request message are ATT private data elements. The specific field in the Route Request message (Version 2) is private data ATTUserToUserInfo.data.value.

Example—GetIncomingUUIData

```
[variable declarations]
NO_UUI = -1; UUI_ASCII = 4
# obtain telephony handle by converting call ID to
    numeric value
hTellHandle = ICRLAtoi( $1 )
# check to see if the caller entered the expected
    DTMF digits
if (GetIncomingUUIType( hTellHandle == NO_UUI ) then
    .
    Process Without user-to-user information
    .
else
    uuiLen = GetIncomingUUILength( hTelHandle )
    uuiData = GetIncomingUUIData( hTelHandle )
    if ( uuiLen == 9 ) then
            Process the uuiData as a SSN from adjacent
                switch
    endif
endif
```

Function GetIncomingUUILength

The GetIncomingUUILength function returns the user-to-user information length. The type of user-to-user information, obtained through the GetIncomingUUIType, indicates the presence of user-to-user information (UUI) including the UUI Length.

Syntax
   destVariable=GetIncomingUUILength(hTelHandle)

| Part | Description |
|---|---|
| destVariable | Variable that receives the integer representing the UUI Length. |
| hTelHandle | Telephony handle obtained from ICRLAtoi($1) function call. |

Return Value
   This function returns an integer value that represents the user-to-user information length. For an invalid telephony handle, the error −4001 (TELERR_INVALID_TEL_HANDLE) is returned.
Remarks
   The userInfo type, accessed through the function GetIncomingUUIType, determines whether or not any user-to-user information actually exists. If the userinfo type is none (−1), no user-to-user information for this call.
   All userInfo parameters contained in the Route Request message are ATT private data elements. The specific field in the Route Request message (Version 2) is private data ATTUserToUserInfo.data.length.
Example—GetIncomingUUILength

```
[vanable declarations]
NO_UUI = -1; UUI_ASCII = 4
# obtain telephony handle by converting call ID to
      numeric value
hTellHandle ICRLAtoi( $1 )
# check to see if the caller entered the expected
      DTMF digits
if (GetIncomingUUIType( hTelHandle ) == NO_UUI )
      then
            Process without user-to-user information
else
      uuiLen = GetIncomingUUILength( hTelHandle )
      uuiData = GetIncomingUUIData( hTelHandle )
      if ( uuiLen == 9 ) then
            Process the uuiData as a SSN from adjacent
                  switch
      endif
endif
```

Function GetIncomingUUIType
   The GetIncomingUUIType function returns the user-to-user informabon type. The type of user-to-user information indicates the presence of user-to-user information (UUI) and the format of the data portion of the message.
Syntax
   destVariable=GetIncomingUUIType(hTelHandle)

| Part | Description |
|---|---|
| destVariable | Variable that receives the integer representing the UUI Type.<br>-1 UUI_NONE (No UUI data specified)<br>0 UUI_USER SPECIFIC<br>1 UUI_IA5_ASCII |
| hTelHandle | Telephoney handle obtained from ICRLAtoi($1) function call. |

Return Value
   This function returns an integer value that represents the user-to-user information type. For an invalid telephony handle, the error −4001 (TELERR_INVALID_TEL_HANDLE) is returned.
Remarks
   The userInfo.type determines whether or not any user-to-user information actually exist. If the userInfo type is none (−1), there is no user-to-user information for this call.
   All userInfo parameters contained in the Route Request message are ATT private data elements.
   The specific field in the Route Request message (Version 2) is private data ATTUserToUserInfo.type.
Example—GetIncomingUUIType

```
[variable declarations]
NO_UUI = -1; UUI_ASCII = 4
# obtain telephony handle by converting call ID to
      numeric value
hTellHandle = ICRLAtoi( $1 )
# check to see if the caller entered the expected
      DTMF digits
if (GetIncomingUUIType( hTelHandle ) NO_UUI then
      Process without user-to-user information
else
      uuiLen = GetIncomingUUILength( hTelHandle )
      uuiData = GetIncorningUUIData( hTelHandle )
      if ( uuiLen == 9 ) then
            Process the uuiData as a SSN from adjacent
                  switch
      endif
endif
```

Function GetIVRCollectVDN
   The GetIVRCollectVDN function returns the VDN that collected the code/digits entered by the caller through the G3 call prompting feature of the collected digits feature.
Syntax
   destVariable=GetIVRCollectVDN(hTelHandle)

| Part | Description |
|---|---|
| destVariable | Variable that receives the string representing the VDN which collected the code/digits in the userEnteredCode data. |
| hTelHandle | Telephony handle obtained from ICRLAtoi($1) function call. |

Return Value
   This function returns a string value that represents the VDN having collected the user entered code/digits. For an invalid telephony handle, the function returns the string "NULL_POINTER".
Remarks
   The userEnteredCode type determines whether or not any code/digits actually exist and whether a CollectVDN exists. If the userEnteredCode type is none (−1), no user-entered code/digits exist for this call. All userEnteredCode parameters in the Route Request message are ATT private data elements. The specific field in the Route Request message (Version 2) is private data ATTUserEnteredCode.collectVDN.
Example—GetIVRCollectVDN

```
[variable declarations]
NO_IVRDIGITS = -1; COLLECTED=0; ENTERED=1
# obtain telephony handle by converting call ID to
      numeric value
hTellHandle = ICRLAtoi( $1 )
# check to see if the caller entered the expected
      DTMF digits
if (GetIVRType(hTelHandle) == NO_IVRDIGITS) then
      .
      Route to operator
```

-continued

```
    else
        if (GetIVRIndicator( hTelHandle ) == COLLECTED)
            then
                IVRDigits = GetIVRDigits( hTelHandle )
                collectVDN = GetIVRCollectVDN(hTelHandle)
                if (collectVDN == "3200") then
                    Process IVR Digits as Social Security
                        Number
                else
                    if (collectVDN == "3300") then
                        Process IVR Digits as Account
                            Number
                    endif
                endif
        endif
endif
```

Function GetIVRDigits

The GetIVRDigits function returns the user collected code/digits. This data is that entered by the user through collect digit commands in vector processing on the G3 switch.

Syntax destVariable=GetIVRDigits(hTelHandle)

| Part | Description |
| --- | --- |
| destVariable | Variable that receives the string representing the user entered code/digits. |
| hTeHandle | Telephony handle obtained from ICRLAtoi($1) function call. |

Return Value

This function returns a string value that represents the user collected code/digits. For an invalid telephony handle, the function returns the string "NULL_POINTER".

Remarks

The userEnteredCode type determines whether or not any code/digits actually exist. If the userEnteredCode type is none (−1), there is no user entered code/digits for this call.

All userEnteredCode parameters contained in the Route Request message are ATT private data elements. The specific field in the Route Request message (Version 2) is private data ATTUserEnteredCode.data.

Example—GetIVRDigits

```
[variable declarations]
NO_IVRDIGITS = -1; COLLECTED=0; ENTERED=1
# obtain telephony handle by converting call ID to
    numeric value
hTellHandle = ICRLAtoi( $1 )
# check to see if the caller entered the expected
    DTMF digits
if (GetIVRType( hTelHandle ) == NO_IVRDIGITS ) then
    .
    Route to operator
    .
else
    if (GetIVRIndicator( hTelHandle ) == COLLECTED)
        then
            IVRDigits = GetIVRDigits( hTelHandle )
            Process the caller entered IVR digits as
                collected
            .
            .
    endif
endif
```

Function GetIVRIndicator

The GetIVRIndicator function returns the user collected digits indicator. This indicator defines whether the data was collected or entered.

Syntax destVariable=GetIVRIndicator(hTelHandle)

| Part | Description |
| --- | --- |
| destVariable | Variable that receives the integer representing the indicator for the user-entered digits.<br>0 Collect<br>1 Entered |
| hTelHandle | Telephony handle obtained from ICRLAtoi($1) function call. |

Return Value

This function returns an integer value that represents the user collected code indicator. For an invalid telephony handle, the error −4001 (TELERR_INVALID_TEL_HANDLE) is returned.

Remarks

All userEnteredCode parameters contained in the Route Request message are ATT private data elements. The specific field in the Route Request message (Version 2) is private data ATTUserEnteredCode.indicator.

Example—GetIVRIndicator

```
[variable declarations]
NO_IVRDIGITS = -1; COLLECTED=0; ENTERED=1
# obtain telephony handle by converting call ID to
    numeric value
hTellHandle = ICRLAtoi( $1 )
# check to see if the caller entered the expected
    DTMF digits
if (GetIVRType(hTelHandle) == NO_IVRDIGITS) then
    .
    Route to operator
    .
else
    if (GetIVRIndicator(hTelHandle) == COLLECTED)
        then
            IVRDigits = GetIVRDigits( hTelHandle )
            Process the caller entered IVR digits as
                collected
            .
            .
    endif
endif
```

Function GetIVRType

The GetIVRType function returns the user collected digits type. This type defines the method used to define the user collected digits, otherwise known as IVR Digits.

Syntax destVariable=GetIVRType(hTelHandle)

| Part | Description |
| --- | --- |
| destVariable | Variable that receives the integer representing user collected digit type<br>-1 None (no code/digits were entered by the user)<br>0 Any<br>1 Login Digits<br>2 Call Prompter<br>3 Database Provided<br>4 Tone Detector |

-continued

| Part | Description |
|---|---|
| hTelHandle | Telephony handle obtained from ICRLAtoi($1) function call. |

Return Value

This function returns an integer value that represents the user collected code type. For an invalid telephony handle, the error −4001 (TELERR_INVALID_TEL_HANDLE) is returned.

Remarks

If the user collected code type is None (−1), then there is no information in the userEnteredCode for this call.

All userEnteredCode parameters contained in the Route Request message are ATT private data elements. The specific field in the Route Request message (Version 2) is private data ATTUserEnteredCode.type.

Example—GetIVRType

```
[variable declarations]
NO_IVRDIGITS = -1
# obtain telephony handle by converting call ID to
        numeric value
hTelHandle = ICRLAtoi( $1 )
# check to see if the caller entered the expected
        DTMF digits
if (GetIVRType(hTelHandle) == NO_IVRDIGITS) then
        .
        Route to operator
        -
else
        IVRDigits = GetIVRDigits( hTelHandle)
        Process the caller entered IVR digits
        .
endif
```

Function GetLookAheadHours

The GetLookAheadHours function returns the lookahead interflow Hour. The lookahead interflow is a G3 switch feature that routes some of the incoming calls from one switch to another conditionally (that is to say the destination switch can either accept or decline the call.) The lookahead hour is the hour part of the current time when the call was interflowed from the first switch. The lookahead interflow information is filled in by the switch that interflows the call.

Syntax destVariable=GetLookAheadHours(hTelHandle)

| Part | Description |
|---|---|
| destVariable | Variable that receives the integer representing the Interflow Hour. |
| hTelHandle | Telephony handle obtained from ICRLAtoi($) function call. |

Return Value

This function returns an integer value that represents the lookahead interflow hour in military form. The lookahead interflow hour will be present if the lookahead interflow type is a valid one. For an invalid telephony handle, the error −4001 (TELERR_INVALID_TEL_HANDLE) is returned.

Remarks

The lookahead interflow hour is one of six lookahead interflow information components. The remaining five are lookahead type, lookahead source VDN, lookahead priority, lookahead minutes, and seconds. The lookahead interflow type can be used to determine whether any of the interflow information exists for a given call.

All lookahead interflow parameters contained in the Route Request message are ATT private data elements.

Example—GetLookAheadHours

```
[variable declarations]
NO_IFLOW = -1
# obtain telephony handle by converting call ID to
        numeric value
hTelHandle = ICRLAtoi( $1 )
lkahdType = GetLookAheadType( hTelHandle )
lkahdHours =GetLookAheadHours( hTelHandle )
lkahdMinutes = GetLookAheadMinutes( hTelHandle )
IkahdSeconds = GetLookAheadSeconds( hTelHandle )
# If lookahead type is not no interflow, output the
        time of the switch interflow
if (lkahdType <> NO_IFLOW) then
        println "Call interflowed at: " +lkahdHours +
                ":" + lkahdMinutes + ":" lkahdSeconds
endif
```

Function GetLookAheadMinutes

The GetLookAheadMinutes function returns the lookahead interflow Minute. The lookahead interflow is a G3 switch feature that routes some of the incoming calls from one switch to another conditionally (that is to say the destination switch can either accept or decline the call.) The lookahead minute is the minute part of the current time when the call was interflowed from the first switch. The lookahead interflow information is filled in by the switch that interflows the call.

Syntax destVariable=GetLookAheadMinutes(hTelHandle)

| Part | Description |
|---|---|
| destVariable | Variable that receives the integer representing the Interflow Minute. |
| hTelHandle | Telephony handle obtained from 1CRLAtoi($1) function call. |

Return Value

This function returns an integer value that represents the lookahead interflow minute. The lookahead interflow hour will be present if the lookahead interflow type is a valid one. For an invalid telephony handle, the error −4001 (TELERR_INVALID_TEL_HANDLE) is returned.

Remarks

The lookahead interflow minute is one of six lookahead interflow information components. The remaining five are lookahead type, lookahead priority, lookahead source VDN, lookahead hours, and seconds. The lookahead interflow type can be used to determine whether any of the interflow information exists for a given call.

All lookahead interflow parameters contained in the Route Request message are ATT private data elements.

Example—GetLookAheadMinutes

```
[variable declarations]
NO_IFLOW = -1
# obtain telephony handle by converting call ID to
        numeric value
hTelHandle = ICRLAtoi( $1 )
lkahdType = GetLookAheadType( hTelHandle )
lkahdHours = GetLookAheadHours( hTelHandle )
lkahdMinutes = GetLookAheadMinutes( hTelHandle )
```

```
lkahdSeconds = GetLookAheadSeconds( hTelHandle )
# If lookahead type is not no interflow, output the
        time of the switch interflow
If (lkahdType <> NO_IFLOW) then
        println "Call interflowed at : " +lkahdHours +
                ":" + lkahdMinutes + ":" + lkahdSeconds
endif
```

Function GetLookAheadPriority

The GetLookAheadPriority function returns the Interflow Priority. The lookahead interflow is a G3 switch feature that routes some of the incoming calls from one switch to another conditionally (i.e., the destination switch can either accept or decline the call.) The priority is that assigned to the call while in queue on the first switch if interflowed while in queue. The information is filled in by the switch that interflows the call.

Syntax destVariable=GetLookAheadPriority(hTelHandle)

| Part | Description |
|---|---|
| destVariable | Variable that receives the integer representing the Interflow priority which can be one of the following:<br>0 Call was not in queue<br>1 Low<br>2 Medium<br>3 High<br>4 Top |
| hTelHandle | Telephony handle obtained from ICRLAtoi($1) function call. |

Return Value

This function returns an integer value that represents the lookahead interflow priority. The lookahead interflow priority is valid if the interflow type is one of the valid types. For an invalid telephony handle, the error −4001 (TELERR_INVALID_TEL_HANDLE) is returned.

Remarks

The lookahead interflow priority is one of six lookahead interflow information components. The remaining five are lookahead type, lookahead source VDN, lookahead hours, minutes, and second. The lookahead interflow type accessed via the GetLookaheadType can be used to determine whether the lookahead priority is included in the message. All lookahead interflow parameters contained in the Route Request message are ATT private data elements.

Example—GetLookAheadPriority

```
[variable declarations]
NOT_QUEUED = 0; LOW=1; MEDIUM=2; HIGH=3; TOP=4;
        NO_IFLOW = -1
HIGH_VDN = 3300
hTelHandle = ICRLAtoi( $1 )
lkahdType = GetLookAheadType( hTelHandle )
# if lookahead type is not No Interflow, check for
        top priority caller
if (lkahdType <> NO_IFLOW) then
        # if top priority caller, send to VDN that will
                queue top priority queue on this switch
        if (GetLookAheadPriority( hTelHandle ) == TOP)
                then
                SetPriorityCall( hTelHandle, 1);
                        SetRouteSelected(hTelHandle,
                                HIGH_VDN)
                        RouteFinal( hTelHandle )
        endif
endif
```

Function GetLookAheadSeconds

The GetLookAheadSeconds function returned the lookahead interflow Second. The lookahead interflow is a G3 switch feature that routes some of the incoming calls from one switch to another conditionally (that is to say the destination switch can either accept or decline the call.) The lookahead second is the second part of the current time when the call was interflowed from the first switch. The lookahead interflow information is filled in by the switch that interflows the call.

Syntax destVariable=GetLookAheadSeconds(hTelHandle)

| Part | Description |
|---|---|
| destVariable | Variable that receives the integer representing the Interflow Minute. |
| hTelHandle | Telephony handle obtained from ICRLAtoi($1) function call. |

Return Value

This function returns an integer value that represents the lookahead interflow second. The lookahead interflow hour will be present if the lookahead interflow type is a valid one. For an invalid telephony handle, the error −4001 (TELERR_INVALID_TEL_HANDLE) is returned.

Remarks

The lookahead interflow second is one of six lookahead interflow information components. The remaining five are lookahead type, lookahead priority, lookahead source VDN, lookahead hours, and minutes. The lookahead interflow type can be used to determine whether any of the interflow information exists for a given call.

All lookahead interflow parameters contained in the Route Request message are ATT private data elements.

Example—GetLookAheadSeconds

```
[variable declarations]
NO_IFLOW = -1 .
# obtain telephony handle by converting call ID to
        numeric value
hTelHandle = ICRLAtoi( $1 )
lkahdType = GetLookAheadType( hTelHandle )
lkahdHours =GetLookAheadHours( hTelHandle )
lkahdMinutes = GetLookAheadMinutes( hTelHandle )
lkahdSeconds = GetLookAheadSeconds( hTelHandle )
# If lookahead type is not no interflow, output the
        time of the switch interflow
if (lkahdType <> NO_IFLOW) then
        println "Call interflowed at : " +lkahdHours +
                ":" + lkahdMinutes + ":"+ lkahSeconds
endif
```

Function GetLookAheadSrcVDN

The GetLookAheadSrcVDN function returns the lookahead interflow source VDN. The lookahead interflow is a G3 switch feature that routes some of the incoming calls from one switch to another conditionally (that is to say the destination switch can either accept or decline the call.) The lookahead source VDN is included if vector processing determined interflow, and is in the form of the VDN name (not its extension) on the interflow originating switch. The lookahead interflow information is filled in by the switch that interflows the call.
Syntax
   destVariable=GetLookAheadSrcVDN(hTelHandle)

| Part | Description |
|---|---|
| destVariable | Variable that receives the string representing an Interflow determining VDN on the originating switch. |
| h TelHandle | Telephony handle obtained from ICRLAtoi($1) function call. |

Return Value
   This function returns a string value that represents the lookahead interflow source VDN name, if one exists. The lookahead interflow source VDN will be present if the lookahead interflow type is Vectoring Interflow For an invalid telephony handle, the function returns the string "NULL_POINTER".
Remarks
   The lookahead interflow source VDN is one of six lookahead interflow information components. The remaining five are lookahead type, lookahead priority, lookahead hours, minutes, and second. The lookahead interflow type can be used to determine whether any of the interflow information exists for a given call.
   All lookahead interflow parameters contained in the Route Request message are ATT private data elements.
Example—GetLookAheadSrcVDN

```
[variable declarations]
VECTOR_IFLOW = 2
# obtain telephony handle by converting call ID to
     numeric value
hTellHandle = ICRLAtoi( $1 )
lkahdType = GetLookAheadType( hTelHandle)
# If lookahead type is VECTOR_IFLOW, then get source
     VDN name
if (lkahdType <> NO_IFLOW then
     lkahdSrcVDN =GetLookAheadSrcVDN(hTelHandle)
     println "Call interflowed from VDN:" + lkahdSrcVDN
endif
```

Function GetLookAheadType
   The GetLookAheadType function returns the Interflow Type. The lookahead interflow is a G3 switch feature that routes some of the incoming calls from one switch to another conditionally (that is to say the destination switch can either accept or decline the call.) The lookahead interflow information is filled in by the switch that interflows the call.
Syntax
   destVariable=GetLookAheadType(hTelHandle)

| Part | | Description |
|---|---|---|
| destVariable | | Variable that receives the integer representing the Interflow type which can be one of the following: |
| | -1 | No Interflow (no interflow information present) |
| | 0 | All Interflow |
| | 1 | Threshold Interflow |
| | 2 | Vectoring Interflow |
| h TelHandle | | Telephony handle obtained from ICRLAtoi($1) function call. |

Return Value
   This function returns an integer value that represents the lookahead interflow type. The lookahead interflow type will always have one of the above specified values. For an invalid telephony handle, the error −4001 (TELERR_INVALID_TEL_HANDLE) is returned.
Remarks
   The lookahead interflow type is one of six lookahead interflow information components. The remaining five are lookahead priority, lookahead source VDN, lookahead hours, minutes, and seconds. The lookahead interflow type can be used to determine whether any of the interflow information exists for a given call.
   All lookahead interflow parameters contained in the Route Request message are ATT private data elements.
Example—GotLookAheadType

```
[variable declarations]

NO_IFLOW = -1; ALL_IFLOW=0; THOLD_IFLOW=1;
     VECTOR_IFLOW=2 obtain telephony handle by converting call ID to
     numeric value
hTellHandle = ICRLAtoi ( $1 )

lkahdType = GetLookAheadType( hTelHandle)

# If lookahead type is VECTOR_ IFLOW (2) we can get
     the source VDN name
if (lkahdType == VECTOR _ IFLOW) then
     println "The lookahead source VDN name is" +
          GetLookAheadSrcVDN( hTelHandle)
endif
```

Function GetMinute
   The GetMinute function returns an integer representing the current minute of the current hour, based upon the most recent call to GetCurrentTime within the script.
Syntax
   destVariable=GetMinute (HTimeHandle)

| Part | Description |
|---|---|
| destVariable | Variable receiving an integer that is the current minute (0–59.) |
| hTimeHandle | Variable that was assigned a time handle via CreateTimeHandle call. |

Return Value
   If successful, this function returns an integer defining the current minute. For the case of an invalid time handle, the function returns −5008.
Remarks
   It is necessary to allocate the time handle by calling CreateTimeHandle and obtain the time and data information through a call to GetCurrentTime before calling this function. The information returned by this call will be based upon the last call to GetCurrentTime in the script.
Example—GetMinute

```
[variable declarations]

RETOK = 0
INVALID_HNDL = 0

Create Time Handle
hTimeHandle =CreateTimeHandle ()
```

```
# make sure the time handle is valid before
    accessing the data
if (hTimeHandle <> INVALID_HNDL) then
    # obtain the time data information
    GetCurrentTime( hTimeHandle )
    println "The current time is: " + GetAscTime(
        hTimeHandle)

hr - GetHour( hTimeHandle ); min =
        GetMinute (hTimeHandle);
    sec = GetSecond(hTimeHandle)
    println "From components hh: mm:ss:" + hr + ":"
        + min +":" + sec
    mo=GetMonth(hTimeHand1e);
        day=GetDayOfMonth(hTimeHandle)
    yr=GetYear(hTimeHandle)
    println "From components, date is: " + mo + "/"
        + day + "/" + yr
    println "Day of week:" +GetDayOfWeek(
        hTimeHandle)
    println "Daylight Savings Time (On/Off): " +
        GetDst(hTimeHandle)
    println "Day of year" +
        GetDayOfYear(hTimeHandle)
    DestroyTimeHandle(hTimeHandle)
endif
```

Function GetMonth

The GetMonth function returns an integer representing the current month of the year (1–12) based upon the most recent call to GetCurrentTime within the script.

Syntax destVariable=GetMonth(hTimeHandle)

| Part | Description |
| --- | --- |
| destVariable | Variable receiving an integer that is the current month of the year (1–12.) |
| h TimeHandle | Variable that was assigned a time handle via CreateTimeHandle call. |

Return Value

If successful, this function returns an integer defining the current month of the year. For a case of an invalid time handle, the function returns −5008.

Remarks

It is necessary to allocate the time handle by calling CreateTimeHandle and obtain the time and date information through a call to GetCurrentTime before calling this function. The information returned by this call will be based upon the last call to GetCurrentTime in the script.

Example—GetMonth

```
[variable declarations]

RETOK = 0
INVALID_HNDL = 0

Create Time Handle
hTimeHandle =CreateTimeHandle ()

# make sure the time handle is valid before
    accessing the data
if (hTimeHandle <> INVALID _ HNDL) then
    # obtain the time data information
    GetCurrentTime( hTimeHandle )
    println "The current time is: " +
        GetAscTime( hTimeHandle)

hr = GetHour( hTimeHandle ); min =
        GetMinute (hTimeHandle);
    sec = GetSecond(hTimeHandle);
    println "From components hh:mm:ss: " + hr
        + ":" + min + ":" + sec
    mo=GetMonth(hTimeHandle);
        day=GetDayOfMonth(hTimeHandle)
    yr=GetYear(hTimeHandle)
    println "From components, date is: " + mo
        + "/" + day + "/" + yr
    println "Day of week:" +GetDayOfWeek
        (hTimeHandle)
    println "Daylight Savings Time (On/Off): "
        + GetDst(hTimeHandle)
    println "Day of year" +
        GetDayOfYear(hTimeHandle)
    DestroyTimeHandle( hTimeHandle)
endif
```

Function GetNumericFieldValue

The GetNumericFieldValue function returns the value for a specified numeric (integer) type field from the "current" database record. A current database record must be identified using the RunQuery operation before accessing fields within the record.

Syntax destVariable=GetNumericFieldValue(hDBHandle, fieldName)

| Part | Description |
| --- | --- |
| destVariable | Variable receiving the integer value returned from the record |
| hDBHandle | Variable that receives the allocated database handle |
| fieldName | Parameter of string type containing record field name to retrieve |

Return Value

Returns the field's numeric value if successful, otherwise the function returns the integer −99999.

Remarks

The GetNumericFieldValue function cannot be called before a database handle being obtained through the CreateDBHandle function, and a "current" record being defined through the RunQuery function call.

Example—GetNumericFieldValue

```
[variable declarations]

INVALID _ HNDL = 0; RETOK=0; END_OF_FILE = −9; GOLD
    = 1
hDBHandle = CreateDBHandle( )
hTelHandle = ICRLAtoi ($1)

# If unableto create a database handle, do default
    route processing
if ( hDBHandle == INVALID_HNDL then
    perform default route processing else
    nRet = RunQuery( hDBHandle, "AccountNo", "=",
        GetIVRDigits( hTelHandle))
    # while the field is equal to the key, set
        acctFound field
    do
        SetStringFieldValue( hDBHandle,
            "AcctNotes", "ACCT LOCATED")
        UpdateRecord( hDBHandle )
        nRet = MoveNextRecord( hDBHandle)
```

```
        if (nRet == RETOK ) then
        If (GetNumericFieldValue( hDBHandle,
            "CustClass") == GOLD) then
                acctNo = GetStringFieldValue
                    (hDBHandle, "AccountNo")
            endif
        endif
    while (nRet <> END_OF_FILE And acctNo ==
        GetIVRDigits( hTelHandle))
endif route call to default call processing VDN
DestroyDBHandle( hDBHandle )
```

Function GetNumIVRSets

The GetNumIVRSets function returns the number of IVR "sets" available to this IIR script. This function, as well as the SetCurrentIVRSets function, is related to the RouteMore function explained in the Remarks section of this description.

Syntax
    destVariable=GetNumIVRSets(hTelHandle)

| Part | Description |
|---|---|
| destVariable | Variable that receives the integer representing the number of IVR digit "sets". |
| hTelHandle | Telephony handle obtained from ICRLAtoi ($1) function call. |

Return Value

This function returns an integer value that represents the number of IVR digit "sets". For an invalid telephony handle, the function returns the value –4001.

Remarks

There are three functions related to the IVR set concept, RouteMore, GetNumIVRSets, and SetCurrentIVRSets. The RouteMore function allows an IIR script to perform multiple IVR digit queries with the caller without leading the control scope of the one IIR script.

The GetNumIVRSets allows the script to obtain the number of IVR digit sets that are potentially available, based upon the first script invocation as well as all RouteMore calls for more collected digits. The RouteMore call actually sends control back to a call prompting VDN to obtain more digits, where control is returned to the IIR script through the call vectoring adjunct command. Upon return from the RouteMore function, the most recent set of IVR collected digits is automatically available through the GetIVR functions (GetIVRType, GetIVRIndicator, and GetIVRDigits.)

The script can, however, also access any previous "set" of IVR data (within the scope of this one IIR script) by forcing the previous "set" of IVR data to focus with the SetCurrentIVRSets function.

Example—GetNumIVRSets

```
[variable declarations]

NO _ IVRDATA = -1; GET_PIN_VDN="3200"; FIRST_SET=0;
    BOTH_SETS=2
obtain telephony handle by converting call ID to
    numeric value
hTellHandle = ICRLAtoi ( $1 )
# check to see if account number was entered by
    caller, if so collect PIN number
if (GetIVRType(hTelHandle) <> NO_IVRDATA) then
    SetPriorityCall( hTelHandle, 0);
        SetRouteSelected( hTelHandle, GET_PIN_VDN)
    RouteMore( hTelHandle )
    if (GetNurnlVRSets( hTelHandle) == BOTH_SETS)
        then
            pinNum = GetIVRDigits( hTelHandle )
            SetCurrentIVRSets( hTelHandle, FIRST_SET)
            acctNum = GetIVRDigits( hTelHandle )
            Perform database match on acctNum/pinNum
                and process call
    endif
endif
```

Function GetSecond

The GetSecond function returns an integer representing the current second of the current minute based upon the most recent call to GetCurrentTime within the script.

Syntax
    destVariable=GetSecond(hTimeHandle)

| Part | Description |
|---|---|
| destVariable | Variable receiving an integer that is the current second (0–59.) |
| hTimeHandle | Variable that was assigned a time handle via CreateTimeHandle call. |

Return Value

If successful, this function returns an integer defining the current second. For the case of an invalid time handle, the function returns –5008.

Remarks

It is necessary to allocate the time handle by calling CreateTimeHandle and obtain the time and date information through a call to GetCurrentTime before calling this function. The information returned by this call will be based upon the last call to GetCurrentTime in the script.

Example—GetSecond

```
[variable declarations]

RETOK = 0
INVALID_HNDL = 0

Create Time Handle
hTimeHandle =CreateTimeHandle ()

# make sure the time handle is valid before
    accessing the data
if (hTimeHandle <> INVALID _ HNDL) then
    # obtain the time data information
    GetCurrentTime( hTimeHandle )
    println "The current time is:" + GetAscTime
        (hTimeHandle)

hr = GetHour( hTimeHandle); min =
        GetMinute(hTimeHandle);
    sec = GetSecond(hTimeHandle)
    println "From components hh:mm:ss " + hr + ":"
        + min + ":" + sec
    mo=GetMonth(hTimeHandle);
        day=GetDayOfMonth(hTimeHandle)
    yr=GetYear(hTimeHandle)
    println "From components, date is:" + mo + "/"
        + day + "/" + yr
    println "Day of week:" +GetDayOfWeek
        (hTimeHandle)
    println "Daylight Savings Time (On/Off): " +
        GetDst(hTimeHandle)
    println "Day of year" +
```

-continued

```
    GetDayOfYear(hTimeHandle)
    DestroyTimeHandle( hTimeHandle)
endif
```

Function GetStringFieldValue

The GetStringFieldValue function returns the value for a specified string type field from the "current" database record. A current database record must be identified using the RunQuery operation before accessing fields within the record.

Syntax destVariable=GetStringFieldValue(hDBHandle, fieldName)

| Part | Description |
| --- | --- |
| destVariable | Variable receiving the string field result from the operation |
| hDBHandle | Variable that receives the allocated database handle |
| fieldName | Parameter of string type containing record field name to retrieve |

Return Value

Returns the field's string value if successful, otherwise the function returns the string "<INVALID STRING>".

Remarks

The GetStringFieldValue function cannot be called before a database handle being obtained through the CreateDBHandle function, and a "current" record being defined through the RunQuery function call.

Example—GetStringFieldValue

```
[variable declarations]

INVALID_HNDL = 0; RETOK=0; END_OF_FILE = -9
hDBHandle = CreateDBHandle()
hTelHandle = ICRLAtoi ($1)

# If unable to create a database handle, do default
    route processing
if ( hDBHandle == INVALID_HNDL) then
    perform default route processing
else
    nRet = RunQuery( hDBHandle, "AccountNo", "=",
        GetIVRDigits( hTelHandle))
    # while the field is equal to the key, set
        acctFound field
    do
        SetStringFieldValue( hDBHandle,
            "AcctNotes", "ACCT LOCATED")
        UpdateRecord( hDBHandle)
        nRet = MoveNextRecord( hDBHandle)
        if (nRet == RETOK) then
            acctNo = GetStringFieldValue
                (hDBHandle, "AccountNo")
        endif
    while (nRet <> END_OF_FILE And acctNo ==
        GetIVRDigits( hTelHandle))
endif route call to default call processing VDN
DestroyDBHandle( hDBHandle )
```

Function GetTrunk

The GetTrunk function returns the Trunk Group Number of the inbound originating trunk. This information is available only for calls that are originated over non-PRI lines. The GetCallingDevice function is used to retrieve information for calls originated over PRI lines or on-PBX extensions. This parameter is obtained from the Route Request Service message (Version 2), trunk field.

Syntax destVariable=GetTrunk(hTelHandle)

| Part | Description |
| --- | --- |
| destVanable | Variable that receives the string returned from this function. |
| h TelHandle | Telephony handle obtained from 1CRLAtoi ($1) function call. |

Return Value his function returns a string expression that represents the originating trunk group number. If the return value is a zero length string, no trunk information was received for this call. For an invalid telephony handle, the string "NULL_POINTER" is returned.

Remarks

The trunk field in the Route Request Service message is an optional component of this message, therefore it may not exist for each call. The trunk field is mutually exclusive with the callingDevice field accessed through the GetCallingDevice function. This means one or the other of callingDevice or trunk are available in the message, but never both.

Example—GetTrunk

```
[vanable declarations]

# obtain telephony handle by converting call ID to
    numeric value
hTellHandle = ICRLAtoi ( $1 )

ANI = GetCallingDevice(hTelHandle)

# checking for a zero length string determines
    whether the field is in the message
if (ANI <> "") then
    println "The calling device (ANI) is "+ ANI
else
    # the trunk data will be available when the
        calling device isn't
    trunkID = GetTrunk( hTelHandle)
    println "The inbound trunk group ID = " +
        trunkID
endif
```

Function GetVDN

The GetVDN function returns the vector directory number (VDN) of the VDN that first handled the call on the switch. This parameter is obtained from the Route Request Service message (Version 2), currentRoute field.

Syntax destVariable=GetVDN(h TelHandle)

| Part | Description |
| --- | --- |
| destVariable | Variable that receives the string returned from this function. |
| h TelHandle | Telephony handle obtained from ICRLAtoi ($1) function call. |

Return Value

If the telephony handle is valid, the function returns the currentRoute member of the RouteRequestExt structure as a string, otherwise the string "NULL_POINTER" is returned.

Remarks

The currentRoute field in the Route Request Service message is a mandatory component of this message, meaning it will always be available upon receipt of a route request. This field is often used in the same manner as DNIS on an off-PBX inbound call.
Example—GetVDN

```
[variable declarations]

# obtain telephony handle by converting call ID to
    numeric value
hTellHandle = ICRLAtoi ( $1 )

# if the VDN is equal to accounting DNIS, route to
    acct hunt group extension
if (GetVDN( hTelHandle ) == "2222" ) then
    SetRouteSelected( hTelHandle, "3000")
else # if VDN is rnarketing DNIS, route to mktg hunt
    group extension
    if (GetVDN( hTelHandle ) == "3333" ) then
        SetRouteSelected( hTelHandle, "3100")
    endif
endif define parameters required to route call
SetPriorityCall( hTelHandle, 0)
RouteFinal ( hTelHandle )
```

Function GetYear
The GetYear function returns an integer representing the current year of the century (i.e. 1995 will return 95) based upon the most recent call to GetCurrentTIme within the script.
Syntax
destVariable=GetYear(hTimeHandle)

| Part | Description |
| --- | --- |
| destVariable | Variable receiving an integer that is the current year of the century (0–99.) |
| hTimeHandle | Variable that was assigned a time handle via CreateTimeHandle call. |

Return Value
If successful, this function returns an integer defining the current year of the century. For the case of an invalid time handle, the function returns −5008.
Remarks
It is necessary to allocate the time handle by calling CreateTimeHandle and obtain the time and date information through a call to GetCurrentTime before calling this function. The information returned by this call will be based upon the last call to GetCurrentTIme in the script.
Example—GetYear

```
[vanable declarations]

RETOK = 0
INVALID_HNDL = 0

Create Time Handle
hTimeHandle =CreateTimeHandle ()

# make sure the time handle is valid before
    accessing the data
if (hTimeHandle <> INVALID _ HNDL) then
    # obtain the time data information
    GetCurrentTime( hTimeHandle )
    println "The current time is: " + GetAscTime
        (hTimeHandle)

hr = GetHour( hTimeHandle ); min =
        GetMinute(hTimeHandle);
    sec = GetSecond(hTimeHandle)
    println "From components hh:mm:ss " + hr + ":"
        + min + ":" + sec
    mo=GetMonth(hTimeHandle);
        day=GetDayOfMonth(hTimeHandle)
    yr-GetYear(hTimeHandle)
    println "From components, date is: " + mo + "/"
        + day + "/" + yr
    println "Day of week:" +GetDayOfWeek
        (hTimeHandle)
    println "Daylight Savings Time (On/Off) : " +
        GetDst(hTimeHandle)
    println "Day of year" +
        GetDayOfYear(hTimeHandle)
    DestroyTimeHandle( hTimeHandle)
endif
```

Function ICRLAtoi
The ICRLAtoi function returns an integer version of the string passed in as the paramter.
Syntax
destVariable=ICRLAtoi(string)

| Part | Description |
| --- | --- |
| destVariable | Variable receiving the integer representation of the string. |
| string | String parameter to convert to numeric format. The string passed here must contain numeric characters only (0–9) or an error will be returned. |

Return Value
If successful, this function returns a numeric representation of the string parameter.
Remarks
NONE
Example—ICRLAtoi

```
[variable declarations]

# search and extract string components from the
    comma delimited file
hTelHandle = ICRLAtoi ($1)
```

Process the call using the numeric telephony handle converted above.
Function ICRLLeft
The ICRLLeft function returns the leftmost (first in a sequence) number of characters specified from the string parameter and returns this string.
Syntax
destVariable=ICRLLeft(stringParam, numChars)

| Part | Description |
| --- | --- |
| destVariable | Variable receiving the sub-string extracted from leftmost numChars. |
| stringParam | String parameter to extract leftnost numChars from. |
| numChars | Integer parameter defining how many characters to extract. |

Return Value
If successful, this function returns a string that is the leftmost numChars specified from the stringParam. A null string (0 length string) is returned if the function is unable to perform the extraction due to inconsistent or invalid parameters.

Remarks

NONE

Example—ICRLLeft

[variable declarations]

```
# search and extract string components from the
    comma delimited file
tststr = "'This', 'is', 'the', 'data', 'from',
    'the', 'file', end'"
Count = 0
do
    # locate the starting ' single quote of a word,
        and assign tstStr to start there
    tstSTr = ICRLStrStr(tstStr,"'")
    # Extract the rightmost characters, less the
        starting ' single quote
    tstStr = ICRLRight(tstStr, ICRLStrLen(tstStr)
        −1)
    # Now extract the word up to the next single
        quote mark
    subStr = IRLLeft(tstStr, ICRLStrindex(tstStr,
        "'",0))
    # Reassign the test string to the rightmost
        characters, minus the substring
    tstStr = ICRLRight(tstStr, ICRLStrLen(tstStr) −
        (ICRLStrLen (subStr)+1))

print subStr+"'"
    Count = Count +1
loop until (subStr == "end" Or Count 7 = 10)
```

Function ICRLMid

The ICRLMid function returns a sub-string from a string defined by a starting character index and a length of the sub-string.

Syntax destVariable=ICRLMid(stringParam, startChar, numChars)

| Part | Description |
|---|---|
| destVariable | Variable receiving the sub-string extracted from right most numChars. |
| stringParam | String parameter to extract right most numChars from. |
| startChar | Index of starting character within stringParam (0 based index.) |
| numChars | Integer parameter defining how many characters to extract. |

Return Value

If successful, this function returns a string that is the middle numChars specified starting at index startChar from the stringParam. A null string (0 length string) is returned if the function is unable to perform the extraction due to inconsistent or invalid parameters.

Remarks

The startChar parameter is a zero based index. The first character in a string is the 0th character. with the second character being the 1st, and so on. This is important to keep in mind when performing string manipulations, to assure the intended sub-string is obtained in the ICRLMid function call.

Example—ICRLMid

[variable declarations]

```
# search and extract string components from the
    comma delimited file
tstStr = "This is the test string."

subStr = ICRLMid(tstStr, 5, 6)
println "Sub String:" + subStr
<the resultant output would be "'Sub String:is the">
The fifth character in the string is a blank, but 0
    based the fifth character is the "i" in is.
```

Function ICRLRight

The ICRLRight function returns the right most (last in a sequence) number of characters specified from the string parameter and returns this string.

Syntax destVariable=ICRLLeft(stringParam, numChars)

| Part | Description |
|---|---|
| destVariable | Variable receiving the sub-string extracted from right most numChars. |
| stringParam | String parameter to extract right most numChars from. |
| numChars | Integer parameter defining how many characters to extract. |

Return Value

If successful, this function returns a string that is the right most numChars specified from the stringParam. A null string (0 length string) is returned if the function is unable to perform the extraction due to inconsistent or invalid parameters.

Remarks

NONE

Example—ICRLRight

[variable declarations]

```
# search and extract string components from the
    comma delimited file
tstStr = "'This', 'is', 'the', 'data', 'from',
    'the', 'file', 'end'".
Count = 0
do
do      # locate the starting ' single quote of a word,
            and assign tstStr to start there
        tstStr = ICRLStrStr( tstStr"'" )
        # Extract the rightmost characters, less the
            starting ' single quote
        tstStr = ICRLRight( tstStr, ICRLStrLen
            ( tstStr )−1)
        # Now extract the word up to the next single
            quote mark
        subStr = ICRLLeft( tstStr, ICRLStrIndex(
            tstStr, "'", 0) )
        # Reassign the test string to the rightmost
            characters, minus the substring
        tstStr = ICRLRight( tstStr, ICRLStrLen( tstStr)
            − (ICRLStrLen(subStr)+1))

print subStr+" "
        Count = Count + 1
loop until (subStr == "end" Or Count >= 10)
```

Function ICRLStrCopy

The ICRLStrCopy function returns a persistent copy of the string passed in.

Syntax destVariable=lCRLStrCopy(stringParam)

| Part | Description |
| --- | --- |
| destVariable | Variable receiving the copy of the stringParam. |
| stringParam | String parameter to copy. |

Return Value

If successful, this function returns a string that is a copy of the stringParam. A null string (0 length string) is returned if the function is unable to perform the extraction due to inconsistent or invalid parameters.

Remarks

NONE

Example—ICRLStrCopy

```
[variable declarations]

# search and extract string components from the
    comma delimited file
tstStr ="This is the test string."

strCopy = ICRLStrCopy(tstStr)
```

Function ICRLStrIndex

The ICRLStrIndex function searches a string for a specified sub-string starting at a given index in the string, and if found, returns the index of the first character in the sequence.

Syntax destVariable=ICRLStrIndex(stringParam, findStr, startIdx)

| Part | Description |
| --- | --- |
| destVariable | Variable receiving the integer index of the sub-string or failure code. |
| stringParam | String variable being searched for occurrence of findStr. |
| findStr | String variable to locate in the stringParam. |
| startIdx | Index in stringParam (0 based) to start searching for findStr. |

Return Value

If successful, this function returns an index to the findStr within the stringParam. If the findStr is not located in the stringParam, starting at the designated startIdx, then the function returns a −1. The function also returns a −1 in the case where the string parameters and start index have inconsistent or illegal data.

Remarks

The index returned from this function as well as the startIdx parameter are both 0 based. That is to say the first character index of any string is 0, rather than 1. If searching for the string "cat" in the string "raining cats and dogs", and giving a startIdx of 0 (start at the beginning of the string), the resulting index would be 8, even through the word cat begins with the ninth (9th) character. Once again, the indexes are 0 based, and are therefore counting the first character of a string as the 0th character.

This index can be used to select a sub-string from a super-string using functions such as ICRLMid.

Example—ICRLStrIndex

```
[variable declarations]

# search and extract string components from the
    comma delimited file
tstStr     tstStr = "'This', 'is', 'the', 'data', 'from',
               'the', 'file', 'end'"

Count = 0
         do
do       # locate the starting ' single quote of a word,
               and assign tstStr to start there
         tstStr = ICRLStrStr( tstStr, "'")
         # Extract the rightmost characters, less the
               starting ' single quote
         tstStr = ICRLRight (tstStr, ICRLStrLen
               ( tstStr )−1)
         # Now extract the word up to the next single
               quote mark
         subStr = ICRLLeft( tstStr, ICRLStrindex
               ( tstStr, "'", 0))
         # Reassign the test string to the rightmost
               characters, minus the substring
         tstStr = ICRLRight( tstStr, ICRLStrLen( tstStr)
               − (ICRLStrLen( subStr )+1))

print subStr+" "
         Count = Count + 1
loop until (subStr == "end" Or Count >= 10)
```

Function ICRLStrLen

The ICRLStrLen function returns an integer representing the length of the string passed in as a parameter to the function.

Syntax destVariable=ICRLStrLen(stringParam)

| Part | Description |
| --- | --- |
| destVariable | Variable receiving an integer that is the length of the string parameter. |
| stringParam | String variable for which the length is requested. |

Return Value

If successful, this function returns an integer >=0 that is the string length. If the stringParam is invalid, this function returns −1.

Remarks

This function returns the length of the string, not counting the null terminator. For instance, the string "this" would have a string length of 4.

Example—ICRLStrLen

```
[variable declarations]
# the following string length operation would return
    a string length of (11)
strLen = ICRLStrLen( "This String")
```

Function ICRLStrStr

The ICRLStrStr function searches a string for a specified sub-string, and if found, returns a pointer into the search string where the sub-string was found.

Syntax
    destVariable=ICRLStrStr(StringParam, findStr)

| Part | Description |
|---|---|
| destVariable | Variable receiving sub-string of stringParam if findStr is located. |
| stringParam | String variable being searched for occurrence of findStr. |
| findStr | String variable to locate in the stringParam. |

Return Value

If successful, this function returns a string that is the sub-string starting with the findStr parameter. If the findStr is not located in the stringParam then the function returns a 0 length string.

Remarks
    NONE

Example—ICRLStrStr

```
[variable declarations]

# Find the substring starting with the word
    "Petrified"
resultStr = ICRLStrStr( "Walk through the Petrified
    Forest", "Petrified")
println "SubString is: " + resultStr <this would result in the string "SubString is:
    Petrified Forest" being displayed>
```

Function InsertRecord

The InsertRecord function adds a newly defined record to the database. This record's fields are defined using the SetStringFieldValue and SetNumericFieldValue functions, before insertion. The insertion of a record is dependent upon those fields defined as unique keys (through the database administrator) having unique values assigned to them before insertion.

Syntax
    destVariable=InsertRecord(hDBHandle)

| Part | Description |
|---|---|
| destVariable | Variable receiving integer value representing success/failure of call |
| hDBHandle | Variable that receives the allocated database handle |

Return Value

Returns 0 if successful, for an invalid database handle the function returns −5008. This function can also return errors in the range of −1 to −2000, which are negated error codes returned by Btrieve. Some of the more common errors returned by Btrieve are covered in the IIR trouble shooting guide.

Remarks

The InsertRecord function cannot be called before a database handle being obtained through the CreateDB-Handle function. The fields defined as "primary" keys through the IIR database administrator, need to have been set to unique values using the SetStringFieldValue, as well as all other fields being defined before the insertion occurs.

Example—InsertRecord

```
[variable declarations]

INVALID_HNDL = 0; RETOK=0
hDBHandle = CreateDBHandle()
hTelHandle = ICRLAtoi ($1)

# If unable to create a database handle, do default
    route processing
if (hDBHandle == INVALID _ HNDL) then
    perform default route processing
else
    nRet = RunQuery( hDBHandle, "AccountNo", "=",
        GetIVRDigits( hTelHandle))
    # If the Query returned return OK, then modify
        key fields and save as new record
    if ( nRet == RETOK ) then
        SetStringFieldValue (hDBHandle,
            "AccountNo", "333333333")
        SetShingFieldValue (hDBHandle, "LastName",
            "Smith")
        SetStringFieldValue (hDBHandle,
            "FirstNamew, "James")
        If (InsertRecord( hDBHandle ) <> RETOK )
            then
            process error on inserting new record
        endif
    endif
endif DestroyDBHandle ( hDBHandle )
```

Function MoveNextRecord

The MoveNextRecord function reassigned the hDB-Handle to the next record in the database, based upon the field index most recently referenced in a RunQuery command. For example, if a record is located using the RunQuery function using "AccountNo" as the comparison field name, the MoveNextRecord moves to the next record in the AccountNo field index file, or returns an error for end of file.

Syntax
    destVariable=MoveNextRecord(hDBHandle)

| Part | Description |
|---|---|
| destVariable | Variable receiving integer value representing success/failure of call. |
| hDBHandle | Variable that receives the allocated database handle |

Return Value

Returns 0 is successful, for an invalid database handle the function returns −5008. This function can also return errors in the range of −1 to −2000, which are negated error codes returned by Btrieve. Some of the more common errors returned by Btrieve are covered in the IIR trouble shooting guide. When there is no next record (end of file), this function will return Btrieve error −9.

Remarks

The MoveNextRecord function cannot be called before a database handle being obtained through the CreateDB-Handle function, and a "current" record being defined through the RunQuery function call.

Example—MoveNextRecord

```
[variable declarations]

INVALID _HNDL = 0; RETOK=0; END_OF_FILE = −9
```

```
hDBHandle = CreateDBHandle
( hTelHandle = ICRLAtoi ($1)

# If unable to create a database handle, do default
    route processing
if ( hDBHandle == INVALID_HNDL) then
    perform default mute processing
else
    nRet = RunQuery( hDBHandle, "AccountNo", "=",
        GetIVRDigits( hTelHandle))
    # while the field is equal to the key, set
        acctFound field
    do
        SetStringFieldValue( hDBHandle,
        "AcctNotes", "ACCT LOCATED")
        UpdateRecord( hDBHandle )
        nRet = MoveNextRecord(hDBHandle)
        if (nRet == RETOK ) then
            acctNo = GetStringFieldValue
                (hDBHandle, "AccountNo")
        endif
    while (nRet <> END_OF_FILE And acctNo ==
    GetIVRDigits( hTelHandle))
endif route call to default call processing VDN
DestroyDBHandle( hDBHandle)
```

Function MovePreviousRecord

The MovePreviousRecord function reassigns the hDBHandle to the preceding record in the database, based upon the field index most recently referenced in a RunQuery command. For instance, if a record has been located using the RunQuery function using "AccountNo" as the comparison field name, the MovePreviousRecord will move to the preceding record in the AccountNo field index file, or return an error for end of file.

Syntax
    destVariable=MovePreviousRecord(hDBHandle)

| Part        | Description                                                     |
|-------------|-----------------------------------------------------------------|
| destVariable | Variable receiving integer value representing success/failure of call. |
| hDBHandle   | Variable that receives the allocated database handle            |

Return Value

Returns 0 if successful, for an invalid database handle the function returns −5008. This function can also return errors in the range of −1 to −2000, which are negated error codes returned by Btrieve. Some of the more common errors returned by Btrieve are covered in the IIR trouble shooting guide. When there is not preceding record (beg of file), this function will return Btrieve error −9.

Remarks

The MovePreviousrecord function cannot be called before a database handle being obtained through the CreateDBHandle function, and a "current" record being defined through the RunQuery function call.

Example—MovePreviousRecord

```
[variable declarations]

INVALID HNDL = 0; RETOK= 0; BEG_OF_FILE = -9
hDBHandle = CreateDBHandle()
hTelHandle = ICRLAtoi ($1)

# If unable to create a database handle, do default
    route processing
if ( hDBHandle == INVALID _ HNDL then
    perform default route processing
else
    nRet = RunQuery( hDBHandle, "AccountNo", "<",
        GetIVRDigits( hTelHandle)
    # while the field is less than the entered
        digits
    do
        SetStringFieldValue( hDBHandle,
            "AcctNotes", "ACCT LOCATED")
        UpdateRecord( hDBHandle)
        nRet = MoveProvioueRecord( hDBHandle)
    while (nRet <> BEG_OF_FILE)
endif route call to default call processing VDN
DestroyDBHandle( hDBHandle)
```

Function QueryAgentState

The QueryAgentState function obtains information on the state of an agent on the DEFINITY G3 switch. The agents device ID (extension for splits/login ID for skills based routing) and agent split/skill are used to obtain the information. After calling this function, various Get . . . functions related to the agent status can be called (GetAgentAvailable, GetAgentState, GetAgentWorkMode, and GetAgentTalkState.)

Syntax
    destVariable=QueryAgentState(hTelHandle, agDevice, agSplit)

| Part         | Description                                                         |
|--------------|---------------------------------------------------------------------|
| destVariable | Variable that receives the success/failure notification for this call. |
| hTelHandle   | Telephony handle obtained from ICRLAtoi ($1) function call.         |
| agDevice     | Mandatory parameter defining a valid agent extension.               |
| agSplit      | Mandatory parameter defining a valid ACD split/skill.               |

Return Value

This function returns an integer value that represents the success/failure of the call. If the call succeeds, a 0 is returned, for an invalid telephony handle, −4001 is returned. If there are inconsistencies between parameters or an invalid parameter is passed, −4002 is returned. For failures at the TSERVER, see the trouble shooting section for possible error Return Values.

Remarks

The agDevice parameter can be the agent login-ID when using skills based routing on the switch. Likewise, the agSplit can be one of the skill extensions assigned to the agent (i.e. the hunt group extensions of the related skills.)

Example—QueryAgentState

```
[variable declarations]

SKILL_HUNT = "2800"
hTelHandle = ICRLAtoi ($1)

"3600" represents a specific agents login-ID
nRet = QueryAgentState( hTelHandle, "3600",
    SKILL_HUNT)
if (GetAgentAvailable( hTelHandle ) ) then
```

```
    send caller to this specific agent
else
    send caller to general queue for handling
endif
```

Function RouteFinal

The RouteFinal function is one of three route specification functions (RouteMore, RouteFinal, and RouteUnknown.) An IIR script uses this function to route a call for the last time in the context of the current script execution. Any use of the telephony handle after execution of this function will return an error.

Syntax destVariable=RouteFinal(hTelHandle)

| Part | Description |
| --- | --- |
| destVariable | Variable that receives the integer representing success/failure of call. Any non-zero failure code received can include any of the error codes defined for the telephony functions in the trouble-shooting guide. |
| hTelHandle | Telephony handle obtained from ICRLAtoi ($1) function call. |

Return Value

If successful the function returns 0, for an invalid telephony handle −4001. All other non-zero error codes can be referenced to the telephony function error codes in the trouble-shooting guide.

Remarks

Performing the RouteFinal operation implies that the FINAL destination for the call has been determined for the execution of this script. The RouteFinal command inherently releases the telephony handle obtained from the call to ICRLAtoi($1). Any reference to the telephony handle after the RouteFinal call in the script will result in an invalid telephony handle error being returned.

The RouteFinal function call must be preceded by the setting of the mandatory route fields priorityCalling and routeSelected through the functions SetPriorityCall and SetRouteSelected respectively. If these fields are not defined before the RouteFinal is attempted, the G3 Telephony Services driver will reject the RouteSelect message and will result in the call not being routed.

When this occurs, the VDN on the switch which has transferred control to the IIR Script will timeout waiting for a response from the adjunct request, and will subsequently execute the next command in the vector processing the that call.

Example—RouteFinal

```
[variable declarations]
DFLT_RTE ="3100"
hTellHandle = ICRLAtoi ( $1)

# if the VDN is equal to accounting DNIS, route to
    acct hunt group extension
if (GetVDN( hTelHandle ) == "2222") then
    DFLT_RTE = "3300"
endif SetRouteSelected( hTelHandle, DFLT_RTE)
```

```
SetPriorityCall( hTelHandle, 0)
RouteFinal( hTelHandle)
```

Function RouteMore

The RouteMore function is one of three route specification functions (RouteMore, RouteFinal, and RouteUnknown.) This function requests that call control be routed back to an intermediate VDN for collection of more user entered digits, while maintaining control of the call in the IIR script.

Syntax destVariable=RouteMore (hTelHandle)

| Part | Description |
| --- | --- |
| destVariable | Variable that receives the integer representing success/failure of call. |
| hTelHandle | Telephony handle obtained from ICRLAtoi ($1) function call. |

Return Value

If successful the function returns 0, for an invalid telephony handle −4001, and for a timeout waiting for the RouteRequest message, the function returns error −208.

Remarks

There are three functions related to the IVR set concept, RouteMore, GetNumIVRSets, and SetCurrentIVRSets. The RouteMore function allows an IIR script to perform multiple IVR digit queries with the caller without leaving the control scope of the one IIR script.

The GetNumIVRSets allows the script to obtain the number of IVR digit sets that are potentially available, based upon the first script invocation as well as all RouteMore calls for more collected digits. The RouteMore call actually sends control back to a call prompting VDN to obtain more digits, where control is returned to the IIR script through the call vectoring adjunct command. Upon return from the RouteMore function, the most recent set of IVR collected digits is automatically available through the GetIVR functions (GetIVRType, GetIVRIndicator, and GetIVRDigits.)

The script can, however, also access any previous "set" or IVR data (within the scope of this one IIR script) by forcing the previous "set" of IVR data to focus with the SetCurrentIVRSets function.

When the RouteMore function is used, the script will continue executing at the command following the RouteMore call when the intermediate VDN completes its call vectoring task and issues an adjunct route request.

The RouteMore function call must be preceded by the setting of the mandatory route fields priorityCalling and routeSelected through the calls SetPriorityCall and SetRouteSelected respectively.

Additionally, the SetRouteSelected function should identify a VDN having digit collection capabilities and most importantly an adjunct route command in the body of the associated call vector on the G3 switch. This adjunct route command assures that control will be returned to the awaiting IIR script.

If control is not returned within the default time out period, the IIR script will automatically terminate based upon the "RouteMoreTimer—nn" entry in the CTI.CFG file found in the installation directory of the NetWare NLMs.

Example—RouteMore

```
[variable declarations]
    NO_IVRDATA = -1; GET_PIN_VDN="3200"; FIRST_SET=0;
        BOTH_SETS=2
obtain telephony handle by converting call ID to
    numeric value
hTellHandle = ICRLAtoi ( $1 )

# check to see if account number was entered by caller,
    if so collect PIN number
if (GetIVRType( hTelHandle ) <> NO _ IVRDATA) then
    SetPriorityCall( hTelHandle, 0); SetRouteSelected
        (hTelHandle, GET_PIN_VDN)
    RouteMore( hTelHandle )
    if (GetNumIVRSets(hTelHandle) == BOTH_SETS) then
        pinNum = GetIVRDigits( hTelHandle )
        SetCurrentIVRSets( hTelHandle, FIRST _ SET)
        acctNum = GetIVRDigits( hTelHandle )
        Perform database match on acctNum/pinNum and
            process call
    endif
endif
```

Function RouteUnknown

The RouteUnknown function is one of three route specification functions (RouteMore, RouteFinal, and RouteUnknown). An IIR script uses this function to route a call for the last time in the context of the current script when there is no known route as determined by the script. The result is execution of the command immediately following the adjunct route command in the VDN requesting route direction.

Syntax destVariable=RouteUnknown(hTelHandle)

| Part | Description |
| --- | --- |
| destVariable | Variable that receives the integer representing success/failure of call. Any non-zero failure code received can include any of the error codes defined for the telephony functions in the trouble-shooting guide. |
| hTelHandle | Telephony handle obtained from ICRLAtoi ($1) function call. |

Return Value

If successful the function returns 0, for an invalid telephony handle −4001. All other non-zero error codes can be referenced to the telephony function error codes in the trouble-shooting guide.

Remarks

Performing the RouteUnknown operation implies that no FINAL destination for the call has been determined for the execution of this script. The RouteUnknown command inherently releases the telephony handle obtained from the call to ICRLAtoi($1). Any reference to the telephony handle after the RouteUnknown call in the script will result in an invalid telephony handle error being returned.

The RouteUnknown function, unlike the RouteFinal and RouteMore commands, does NOT require that the priority-Calling and routeSelected fields to be defined before invocation. If the route is unknown, these fields would obviously be meaningless in the message. When this occurs, the VDN on the switch which has transferred control to the IIR Script will timeout waiting for a response from the adjunct request, and will subsequently execute the next command in the vector processing for that call.

Example—RouteUnknown

```
[variable declarations]

hTellHandle = ICRLAtoi ($1)

# if the VDN is equal to accounting or marketing
    DNIS, route to default hunt group extension
if (GetVDN( hTelHandle ) == "2222" Or
GetVDN(hTelHandle) == "3333") then
    SetRouteSelected(hTelHandle, DFLT_RTE);
        SetPriorityCall( hTelHandle, 0)
    RouteFinal( hTelHandle)
else
    # no valid route is known for the call, leave
        handling of call to originating VDN
    RouteUnknown( hTelHandle)
endif
```

Function Run Query

The RunQuery function is used to query the IIR database and locate a matching record in the database. Based upon the query criteria, a matching database record may or may not be found. If the RunQuery function returns successfully, and hDBHandle can be used in combination with other database functions to read, update, or delete the current record.

Syntax destVariable=RunQuery(hDBHandle, fieldName, queryOp, keyValue)

| Part | Description |
| --- | --- |
| destVariable | Variable receiving integer value representing success/failure of call. |
| hDBHandle | Parameter that is the database handle in the script |
| fieldName | Parameter of string type that is the "key" field name to search for a match against the keyValue field. This "key" field name can be any of the field names defined through the IIR Database Administration utility. |
| queryOp | Parameter of string type that is the comparison operator for the query. Valid query criteria are- "<" -Values of fieldName that are less than keyValue "<=" -Values of fieldName that are less than or equal to keyValue "=" -Values of fieldName that are equal to keyValue ">" -Values of fieldName that are greater than keyValue ">=" Values of fieldName that are greater than or equal to keyValue |
| keyValue | Parameter of string type to be compared to fieldName values in the DB |

Return Value

If successful, this function returns 0. If all parameters are valid, but no record is found to match the search criteria, the function will return −4. For an invalid database handle, this function returns an integer value of −5008. If any of the parameters are inconsistent or are invalid, the function will return −5004. This function can also return errors in the range of −1 to −2000, which are negated error codes returned by Btrieve. Some of the more common errors returned by Btrieve are covered in the IIR trouble shooting guide.

Remarks

A database handle must be allocated before invoking this function using the CreateDBHandle function. All functions accessing the database for specific records should not be invoked until this function has been called to successfully locate a record in the database.

Example—RunQuery

```
[variable declarations]

INVALID_HNDL = 0
hDBHandle = CreateDBHandle()
hTelHandle = ICRLAtoi ($1)

# If unable to create a database handle, do default
    route processing
if (hDBHandle == INVALID_HNDL) then
    perform default route processing else
    nRet = RunQuery( hDBHandle, "AccountNo", "=",
        GetIVRDigits( hTelHandle))
# If the Query returned return OK, then print
    out the customer information
    if ( nRet == RETOK) then
        1stName = GetStringFieldValue(hDBHandle,
            "LastName")
        frstName = GetStringFieldValue(hDBHandle,
            "FirstName")
        delCount = GetNumericFieldValue(hDBHandle,
            "DelinqCount")

process caller based upon delinquent count
            and log if delinquent > 3
        if (delCount > 3) then
            println "Customer"+1stName+",
                "+firstName+" has del =
                "+delCount
        endif
    endif
endif DestroyDBHandle( hDBHandle )
```

Function SetCurrentIVRSets

The SetCurrentIVIRSets function specifies for which "set" of IVR collected digits the GetIVR functions (GetIVRType, GetIVRIndicator, and GetIVRDigits) apply.

Syntax destVariable=SetCurrentIVRSets(hTelHandle, setIdx)

| Part | Description |
| --- | --- |
| destVariable | Variable that receives the integer representing the success or failure of the function call. |
| h TelHandle | Telephony handle obtained from ICRLAtoi ($1) function call. |
| setIdx | Specifies the "set" of IVR data to access (O based index value) |

Return Value

This function returns an integer value of 0 if successful; or returns the value −4001 for invalid telephony handle. If the setIdx parameter is invalid, it returns −4002.

Remarks

Three functions relate to the IVR set concept, RouteMore, GetNumIVRSets, and SetCurrentIVRSets. The RouteMore function allows an IIR script to perform multiple IVR digit queries with the caller without leaving the control scope of the one IIR script.

The GetNumIVRSets allows the script to obtain the number of IVR digit sets that are potentially available, based upon the first script invocation as well as all RouteMore calls for more collected digits. The RouteMore call sends control back to a call prompting VDN to obtain more digits, returning control to the IIR script through the call vectoring adjunct command. Upon return from the RouteMore function, the most recent set of IVR collected digits is available through the GetIVR functions (GetIVRType, GetIVRIndicator, and GetIVRDigits.) The script can also access any previous "set" of IVR data (within the scope of this one IIR script) by forcing the previous "set" of IVR data to focus with the SetCurrentIVRSets function.

Example—SetCurrentIVRSets

```
[variable declarations]
NO_IVRDATA = −1; GET_PIN_VDN="3200"; FIRST_SET=0;
    BOTH_SETS=2 obtain telephony handle by converting call ID to
    numeric value hTellHandle = ICRLAtoi ( $1 )

# check to see if account number was entered by
    caller, if so collect PIN number
if (GetIVRType( hTelHandle ) <>NO_IVRDATA ) then
    SetPriorityCall( hTelHandle, );
        SetRouteSelected( hTelHandle, GET_PIN_VDN)
    Handle, 0);
    RouteMore( hTelHandle )
    if (GetNumIVRSets( hTelHandle ) == BOTH_SETS)
        then
        pinNum = GetIVRDigits( hTelHandle )
        SetCurrentIVRSets( hTelHandle, FIRST_SET)
        acctNum = GetIVRDigits( hTelHandle )
        Perform database match on acctNum/pinNum
            and process call
    endif
endif
```

Function SetDestRoute

The SetDestRoute function is used to specify optional TAC/ARS/AAR route control information for off-PBX destinations, if the information is not included in the route-Selected. This parameter is placed in the Route Select Service message (Version 2), destRoute field.

Syntax destVariable=SetDestRoute(hTelHandle, routeinfo)

| Part | Description |
| --- | --- |
| destVariable | Variable that receives the integer success/failure of the call. |
| hTelHandle | Telephony handle obtained from ICRLAtoi ($1) function call. |
| routeInfo | This parameter is a string containing the destRoute information. |

Return Value

If the set of the destRoute field in the RouteSelectRequest succeeds, this function returns 0. For an invalid telephony handle, the function returns −4001. If the routeInfo parameter is invalid, this function returns −4002.

Remarks

The destRoute field of the RouteSelectRequest defines route control information for TAC/AAR/ARS. Common values for this field are "8" for AAR and "9" for ARS, however these are definable on the PBX.

Example—SetDestRoute

```
[variable declarations]

# obtain telephony handle by converting call ID to
    numeric value
hTellHandle = ICRLAtoi ( $1 )

# if the VDN is equal to accounting DNIS, route to
    external number, use ARS
if (GetVDN( hTelHandle ) == "2222" ) then
    SetDestRoute( hTelHandle, "9")
    SetRouteSelected( hTelHandle, "6125183000"
else # if VDN is marketing DNIS, route to mktg hunt
    group extension
    if (GetVDN( hTelHandle ) == "3333" ) then
        SetRouteSelected( hTelHandle, "3100")
    endif
endif define parameters required to route call
SetPriorityCall( hTelHandle, 0 )
RouteFinal( hTelHandle )
```

Function SetDirectedAgentCallSplit

The SetDirectedAgentCallSplit defines one of the optional fields, directAgentCallSplit, in the RouteSelectRequest. This field should be provided if the routeSelected is directed to a specific agent rather than to any available agent (hunt group.) This field should contain the ACD agent's split/skill if a call is directed to a specific logged-in agent (i.e. the routeSelected is an agent login-ID rather than an extension.)

Syntax destVariable=SetDirectedAgentCallSplit (hTelHandle, splitID)

| Part | Description |
| --- | --- |
| destVariable | Variable that receives the integer success/failure of the call. |
| hTelHandle | Telephony handle obtained from ICRLAtoi ($1) function call. |
| split/D | This parameter is a string containing the split/skill ID where an agent specified in the routeSelected must be logged in. |

Return Value

If the set of the directAgentCallSplit field in the RouteSelectRequest succeeds, this function returns 0. For an invalid telephony handle, the function returns −4001. If the splitID parameter is invalid, this function returns −4002.

Remarks

The splitID field of the RouteSelectRequest is only necessary if the routeSelected field has been directed to a logged in agent (agent login-ID), rather than an equipment or service extension.

Example—SetDirectedAgentCallSplit

```
[variable declarations]

# obtain telephony handle by converting call ID to
    numeric value hTellHandle = ICRLAtoi ($1 )

# if the VDN is equal to accounting DNIS, route to
    agent login-ID 3501
if (GetVDN( hTelHandle ) == "2222" ) then
    SetRouteSelected( hTelHandle, "3501")
    # The specified agent login-ID (3501) will be
        logged into skill hunt group "2000"
    SetDirectedAgentCallSplit( hTelHandle, "2000")
else # if VDN is marketing DNIS, route to mktg hunt
    group extension
    if (GetVDN( hTelHandle ) == "3333" ) then
        SetRouteSelected( hTelHandle, "3100")
    endif
endif define parameters required to route call
SetPriorityCall( hTelHandle, 0 )
RouteFinal( hTelHandle )
```

Function SetNumericFieldValue

The SetNumericFieldValue function sets the specified field name of the "current" database record to the integer value passed in as a parameter. A current database record must be identified using the RunQuery operation before accessing fields within the record.

Syntax destVariable=SetNumericFieldValue(hDBHandle, fieldName, setValue)

| Part | Description |
| --- | --- |
| destVariable | Variable receiving the string field result from the operation |
| hDBHandle | Variable that receives the allocated database handle |
| fieldName | Parameter of string type containing record field name to retrieve |
| setValue | Parameter of integer type defining value to set the field to |

Return Value

Returns 0 if successful, −5008 for an invalid database handle. This function can also return errors in the range of −1 to −2000, which are negated error codes returned by Btrieve. Some of the more common errors returned by Btrieve are covered in the IIR trouble shooting guide.

Remarks

The SetNumericFieldValue function cannot be called before a database handle being obtained through the CreateDBHandle function, and a "current" record being defined through the RunQuery function call.

Example—SetNumericFieldValue

```
[variable declarations]
INVALID_HNDL = 0; RETOK=0; END_OF_FILE =− 9
hDBHandle = CreateDBHandle()
hTelHandle = ICRLAtoi ($1)
# If unable to create a database handle, do default
    route processing
if ( hDBHandle == INVALID _ HNDL) then
    perform default route processing
else
    nRet = RunQuery( hDBHandle, "AccountNo", "=",
        GetIVRDigits( hTelHandle
    # while the field is equal to the key, set
        acctFound field
    do
        SetNumericFieldValue( hDBHandle,
            "AccCount", 2 )
        UpdateRecord( hDBHandle )
        nRet = MoveNextRecord( hDBHandle )
        if (nRet == RETOK ) then
            acctNo = GetStringFieldValue
```

-continued

```
        (hDBHandle, "AccountNo")
    endif while (nRet <> END_OF_FILE And acctNo ==
        GetIVRDigits( hTelHandle ) )
endif route call to default call processing VDN
DestroyDBHandle( hDBHandle )
```

Function SetOutgoingUUI

The SetOutgoingUUI function allows the IIR script to associate caller information, up to 32 bytes, with a call. This information can be any meaningful data (such as account no, social security number, etc.) that is an alphanumeric string. It is propagated with the call whether the call is routed locally or is interflowed to another switch. Providing expected data to an awaiting VDN if the data is known in the IIR script.

Syntax destVariable=SetOutgoingUUI(hTelHandle, UUIType. UUILength, UUIData)

| Part | Description |
| --- | --- |
| destVariable | Variable that receives the integer success/failure of the call. |
| hTelHandle | Telephony handle obtained from ICRLAtoi ($1) function call. |
| UUIType | This parameter is an integer value that specifies the codeType. The possible values are as follows:<br>−1 = UUI_NONE (indicates UUI not specified)<br>0 = UUI_USER_SPECIFIC (not supported for IIR release 1.0)<br>4 = UUI_IA5_ASC1I (ASCII string supported by IIR) |
| UUILength | This parameter is an integer value that represents the string length stored in the UUIData field (does not count null terminator.) |
| UUIData | This parameter is a string of up to 32 bytes in length containing alphanumeric data to be the UUI associated with this call record. |

Return Value

If the set of the UserToUserInfo field in the RouteSelectRequest succeeds, this function returns 0. For an invalid telephony handle, the function returns −4001. If any of the parameters are inconsistent or invalid, this function returns −4002.

Remarks

The UserToUserInfo structure in the Route Select structure can be used to send along with the call pertinent information concerning the call or caller. This data field is generic and is sent along with a call transfer either locally on the PBX or when interflowed. It is important to understand that this information must be understood by the destination, whether that be another IIR script or other adjunct, and the user must make sure that the destinations for the call routing are not expecting other UserToUserInfo in this field.

The initial version of the IIR only supports the UUI_ IA5_ASCII (4) UUIType. The IIR scripts are not able to manipulate binary data in this release.

Example—SetOutgoingUUI

```
[variable declarations]

UUI_ASCII = 4; COLL_VDN ="3000"
# obtain telephony handle by converting call ID to
    numeric value
hTellHandle = ICRLAtoi ( $1 )

# if the VDN is equal to accounting DNIS, route to
    VDN that will collect phone number
if (GetVDN( hTelHandle ) == "2222" ) then
    SetRouteSelected( hTelHandle, COLL_VDN )
    ANI = GetCallingDevice( hTelHandle )
    # if the callers ANI is known pass it to the
        next IIR script
    if (ANI <>"") then
        SetOutgoingUUI( hTelHandle, UI_ASCII,
            ICRLStrLen (ANI), ANI)
    endif
endif define parameters required to route call
SetPriorityCall( hTelHandle, 0 )
RouteFinal( hTelHandle )
```

Function SetPriority Call

The SetPriorityCall function is used to specify the priority calling field in the RouteSelectRequest. This parameter is placed in the Route Select Service message (Version 2), priorityCalling, field and is a required component of the message before the IIR can send the Route Select message.

Syntax destVariable=SetPriorityCall(hTelHandle, priority)

| Part | Description |
| --- | --- |
| destVariable | Variable that receives the integer success/failure of the call. |
| hTelHandle | Telephony handle obtained from ICRLAtoi ($1) function call. |
| routeSelected | This parameter is an integer specifying the priority of the on-PBX call as either "On" (1) or "Off" (0). |

Return Value

If the set of the priorityCalling field in the RouteSelectRequest succeeds, this function returns 0. For an invalid telephony handle, the function returns −4001. If the routeSelected parameter is invalid, this function returns −4002.

Remarks

The priorityCalling field is one of two mandatory fields that must be set before the route request being returned from the IIR. This function must be called before calling either of the RouteFinal or RouteMore functions.

The value must be set to "Off" (0) for all off-PBX specified destinations in the routeSelected field. If this is not done, the call will be denied.

Example—SetPriorityCall

```
[variable declarations]

# obtain telephony handle by converting call ID to
    numeric value
hTellHandle = ICRLAtoi ( $1 )

# if the VDN is equal to accounting DNIS, route to
    acct hunt group extension
if (GetVDN( hTelHandle ) == "2222" ) then
```

```
        SetRouteSelected( hTelHandle, "3000")
    else # if VDN is marketing DNIS, route to mktg hunt
        group extension
        if (GetVDN( hTelHandle ) == "3333") then
            SetRouteSelected( hTelHandle, "3100")
        endif
endif
    # define parameters required to route call
    SetPriorityCall( hTelHandle, 0 )
    RouteFinal( hTelHandle )
```

Function SetRoute Selected

The SetRouteSelected function is used to specify the destination route field in the RouteSelectRequest, which can be an extension, VDN, hunt group, or external number. This parameter is placed in the Route Select Service message (Version 2), routeSelected field and is a required component of the message before the IIR can send the Route Select message.

Syntax destVariable=SetRouteSelected(hTelHandle, routeSelected)

| Part | Description |
| --- | --- |
| destVariable | Variable that receives the integer success/failure of the call. |
| hTelHandle | Telephony handle obtained from ICRLAtoi ($1) function call. |
| routeSelected | This parameter is a string containing the routing specification for the call. This can be an extension, or if an off-PBX number, it can also contain the TAC/ARS/AAR route control information. |

Return Value

If the set of the routeSelected field in the RouteSelectRequest succeeds, this function returns 0. For an invalid telephony handle, the function returns –4001. If the routeSelected parameter is invalid, this function returns –4002.

Remarks

The routeSelected field of the RouteSelectRequest is one of two mandatory fields that must be set before the route request being returned from the IIR. This function must be called before calling either of the RouteFinal or RouteMore functions. The data provided on this field can be an extension (representing an extension, agent login-ID, hunt group, or VDN), or if an off-PBX number, can also contain the TAC/ARS/AAR route control information.

Example—SetRouteSelected

```
[variable declarations]

# obtain telephony handle by converting call ID to
    numeric value
hTellHandle = ICRLAtoi ( $1 )

# if the VDN is equal to accounting DNIS, route to
    acct hunt group extension
if (GetVDN( hTelHandle ) == "2222" ) then
    SetRouteSelected( hTelHandle, "3000")
else # if VDN is marketing DNIS, route to mktg hunt
    group extension
    if (GetVDN( hTelHandle ) == "3333") then
        SetRouteSelected( hTelHandle, "3100")
    endif
endif
    # define parameters required to route call
    SetPriorityCall( hTelHandle, 0 )
    RouteFinal( hTelHandle)
```

Function SetStringFieldValue

The SetStringFieldValue function sets the specified field name of the "current" database record to the string value passed in as a parameter. A current database record must be identified using the RunQuery operation before accessing fields within the record.

Syntax destVariable=SetStringFieldValue (hDBHandle, fieldName, setValue)

| Part | Description |
| --- | --- |
| destVariable | Variable receiving the string field result from the operation |
| hDBHandle | Variable that receives the allocated database handle |
| fieldName | Parameter of string type containing record field name to retrieve |
| setValue | Parameter of string type defining value to set the field to |

Return Value

Returns 0 if successful, –5008 for an invalid database handle. This function can also return errors in the range of –1 to –2000, which are negated error codes returned by Btrieve. Some of the more common errors returned by Btrieve are covered in the IIR trouble shooting guide.

Remarks

The SetStringFieldValue function cannot be called before a database handle being obtained through the CreateDBHandle function, and a "current" record being defined through the RunQuery function call.

Example—SetStringFieldValue

```
[variable declarations]

INVALID_HNDL = 0; RETOK=0; END_OF_FILE = -9
hDBHandle = CreateDBHandle()
hTelHandle = ICRLAtoi ($1)

# If unable to create a database handle, do default
    route processing
if (hDBHandle == INVALID_HNDL) then
    perform default route processing
else
    nRet = RunQuery( hDBHandle, "AccountNo", "=",
        GetIVRDigits( hTelHandle ) )
    # while the field is equal to the key, set
        acctFound field
    do
        SetStringFieldValue ( hDBHandle,
            "AcctNotes", "ACCT LOCATED")
        UpdateRecord( hDBHandle )
        nRet = MoveNextRecord( hDBHandle )
        if (nRet == RETOK) then
            acctNo = GetStringFieldValue
                (hDBHandle, "AccountNo")
        endif
    while (nRet <> END_OF_FILE And acctNo ==
        GetIVRDigits( hTelHandle ) )
``` endif
route call to default call processing VDN
DestroyDBHandle( hDBHandle )

Function SetUserProvidedCode

The SetUserProvidedCode function allows the IIR script to send code/digits (ASCII string with 0-9, *, and # only) with the routed call. These code/digits are treated as dial-ahead digits stored in the dial-ahead digit buffer. They can then be collected by subsequent collect digit vector commands on the switch. This function provides expected data to an awaiting VDN if the data is known in the IIR script.

Syntax destVariable=SetUserProvidedCode((hTelHandle, codeType, codeData)

| Part | Description |
| --- | --- |
| destVariable | Variable that receives the integer success/failure of the call. |
| hTelHandle | Telephony handle obtained from ICRLAtoi ($1) function call. |
| codeType | This parameter is an integer value that specifies the codeType. Values include:<br>0 = UP_NONE (indicates UPC not present)<br>17 = UP_DATA_BASE_PROVIDED (IIR input, for instance) |
| codeData | String of up to 24 numeric characters making up code/digits to be placed in dial-ahead digit buffer upon RouteSelect (0-9, *, #) |

Return Value

If the set of the UserProvidedCode field in the RouteSelectRequest succeeds, this function returns 0. For an invalid telephony handle, the function returns -4001. If any of the parameters are inconsistent or invalid, this function returns -4002.

Remarks

The UserProvidedCode structure in the Route Select structure can be used to "feed" a subsequent VDN/vector known code/digits that would otherwise be collected from the caller. In the case where the data is known by the IIR, there is no need to prompt the caller for the data, and with this method the caller would not be prompted in the subsequent vector if the digits were already placed there for the caller.

Example—SetUserProvidedCode

[variable declarations]

```
DB_PROVIDED = 17; COLL_VDN ="3000"
# obtain telephony handle by converting call ID to
    numeric value
hTellHandle = ICRLAtoi ( $1 )

# if the VDN is equal to accounting DNIS, route to
    VDN that wIll collect phone number
if (GetVDN( hTelHandle ) == "2222" ) then
    SetRouteSelected( hTelHandle, COLL_VDN)
    ANI = GetCallingDevice( hTelHandle )
    # if the callers ANI is known, go ahead and put
        in type ahead buffer
    if (ANI <> "") then
        SetUserProvidedCode( hTelHandle,
            DB_PROVIDED, ANI)
    endif
endif define parameters required to route call
SetPriorityCall( hTelHandle, 0 )
RouteFinal( hTelHandle )
```

Function UpdateRecord

The UpdateRecord function updates a record in the database that has been located through the RunQuery or MoveNextRecord/MovePreviousRecord functions. The record to be updated, once located, will have the targeted fields modified through the SetStringFieldValue and SetNumericFieldValue functions, before update.

Syntax destVariable=UpdateRecord(hDBHandle)

| Part | Description |
| --- | --- |
| destVariable | Variable receiving integer value representing success/failure of call. |
| hDBHandle | Variable that receives the allocated database handle |

Return Value

Returns 0 if successful, for an invalid database handle the function returns -5008. This function can also return errors in the range of -1 to -2000, which are negated error codes returned by Btrieve.

Remarks

The UpdateRecord function cannot be called before obtaining a database handle through the CreateDBHandle function, and defining a "current" record through the RunQuery function call.

The fields that are intended for update can be modified using the SetStringFieldValue or SetNumericFieldValue. Once the fields have been modified, the record is updated in the database by calling this function, UpdateRecord.

Example—UpdateRecord

[variable declarations]

```
INVALID_HNDL = 0; RETOK=0
hDBHandle = CreateDBHandle
hTelHandle = ICRLAtoi ($1)

# If unable to create a database handle, do default
    route processing
if (hDBHandle == INVALID _ HNDL) then
    perform default route processing
else
    nRet = RunQuery( hDBHahdle, "AccountNo", "=",
        GetIVRDigits( hTelHandle ) )
    # If the Query returned return OK, then modify
        the record and update it
    if ( nRet == RETOK ) then
        SetStringFieldValue (hDBHandle,
            "CustStatus", "LOCATED")
        if (UpdateRecord(hDBHandle) <> RETOK) then
            process error on updating record
        endif
    endif
endif DestroyDBHandle( hDBHandle )
```

021271.0105 PATENT APPLICATION

APPENDIX B - SAMPLE SCRIPTS
　　　The following scripts are samples for you to use in writing your own scripts.
Sample #1
```
#------------------------------------------------------------
#     Test Script Name: VDN.icr
```

021271.0105                                          PATENT APPLICATION

215

```
        #
        #    Test Script Description: This script tests the following
        #         *GetVDN
        #-----------------------------------------------------------
 5      #
        #    declare variables
        global $0, $1
        global g_pICRLExecuteContext 10      local   hTelHandle              # Telephony Handle
        local   hDbHandle               # Handle to the Database
        local   nRet,vdn
        local   RETOK
        local   INVALID_HNDL            # to be set to 0 for return of
15                                        invalid handle
        local   DEFAULT_RTE             # set to the default VDN
        local   ROUTEMR_RTE             # route more route
        local   OTHER_RTE 20      #initialize variables RETOK = 0
        INVALID_HNDL = 0
        DEFAULT_RTE = "2088"
25      ROUTEMR_RTE = "3008"
        OTHER_RTE = "3006"

begin code, Route Request has arrived 30      hDbHandle  =  CreateDBHandle ( )
        hTelHandle = ICRLatoi ($1)
```

021271.0105                                                    PATENT APPLICATION

216

```
         # If unable to create a database handle or telephony handle, then
             route to
         default location
         if ( hDBHandle == INVALID_HNDL Or hTelHandle == INVALID_HNDL
5    then
                 nRet = SetRouteSelected( hTelHandle, DEFAULT_RTE )
                 nRet = SetPriorityCall( hTelHandle, 0)
                 nRet = RouteFinal( hTelHandle)
         else
10               println "VDN = "+ GetVDN(hTelHandle)
                 println "Calling Device = "+ GetCallingDevice(hTelHandle)

vdn = GetVDN(hTelHandle)
             Select Case (vdn)
15                   Case ("2098")
                         SetRouteSelected(hTelHandle, ROUTEMR_RTE)
                         RouteMore(hTelHandle)
                         printIn "Routed to " + ROUTEMR_RTE 20                       SetPriorityCall(hTelHandle, 1);
                         RouteFinal(hTelHandle);
                         End Case
                     Case ("2099")
                         SetRouteSelected(hTelHandle,
25                           "DEFAULT_RTE")
                         RouteMore (hTelHandle)
                         println "Routed to" + DEFAULT_RTE
                         SetPriorityCall(hTelHandle, 1);
                         RouteFinal(hTelHandle);
30                   End Case
                     Case ("3006")
                         SetRouteSelected(hTelHandle,
                             "OTHER_RTE")
```

021271.0105 PATENT APPLICATION

217

```
                            RouteMore(hTelHandle)

SetPriorityCall( hTelHandle, 1);
                            RouteFinal(hTelHandle);
        End Case
        End Select endif
println "vdn.icr Done"
eof Sample #2

---------------------------------------------------------------------------

#       Test Script Name: LIVE1.ICR

#       Test Script Description: This script will perform several operations:
#              * if it's after 5:30 pm it will transfer to VDN <??> for a message
#              * if there is a ForceExtension entered, it will route to that ext.
#              * otherwise, based upon the outstanding balance it will route to
#                two different VDNs (if acctBal > 10000 then overdrawn, else default
#                ext).

--------------------------------------------------------------------------- declare variables global $0, $1     $0 is the name of the script, $1 is the script identification
number local   hDBHandle             # Handle to the DataBase
local   hTelHandle            # Telephony handle
local   hTimeHandle           # Time handle
local   nRet                  # Return Value variable
local   queryStr              # Query String to pass in to Query DB
local   RETOK                 # To be set to 0 for return OK from function
calls
local   INVALID_HNDL          # To be set to 0 for return of invalid handle
local   DEFAULT_RTE           # Set to default VDN or extension to route to
when a critical error occurs
local   AFTERHR_RTE, HIGHBAL_RTE initialize variables
```

021271.0105                                                    PATENT APPLICATION

218

```
            RETOK = 0
            INVALID_HNDL = 0
            DEFAULT_RTE = "3003"
            AFTERHR_RTE = "2088"
 5          HIGHBAL_RTE = "2087"

#begin code
            hTimeHandle = CreateTimeHandle( )
            GetCurrentTime(hTimeHandle)
10          println "Entered Script at " + GetAscTime(hTimeHandle)

# Create DataBase, Telephone, and Time Handles
            hDBHandle = CreateDBHandle( )
            GetCurrentTime(hTimeHandle)
15          println "DB Handle Obtained at " + GetAscTime(hTimeHandle)
            hTelHandle = ICRLAtoi($1)

# If unable to create a database handle or telephony handle, then route to
    default location
20
            if ( hDBHandle == INVALID_HNDL Or hTelHandle == INVALID_HNDL Or hTimeHandle
            ==   INVALID_HNDL) then println "Invalid time or telephone handle, DBhandle =" + hDBHandle +
25          "timeHandle =" + hTimeHandle
                    nRet = SetRouteSelected( hTelHandle, DEFAULT_RTE )
                    nRet = SetPriorityCall( hTelHandle, 0)
                    nRet = RouteFinal( hTelHandle )
            else
30              GetCurrentTime(hTimeHandle)
            # -----------------------------------------------------------
            # Check to see if it is after 5:30, if so route to after hours VDN
            # -----------------------------------------------------------
            println "Hour" + GetHour (hTimeHandle) + "; Minute"+GetMinute(hTimeHandle)
35          if ( GetHour( hTimeHandle) >17 Or (GetHour(hTimeHandle)==17 And GetMinute
    (hTimeHandle) > 30) ) then
                            nRet = SetRouteSelected( hTelHandle, AFTERHR_RTE )
                            nRet = SetPriorityCall( hTelHandle, 0)
                            nRet = RouteFinal( hTelHandle )
40          else
                    # -----------------------------------------------------------
                    # Query the database using the IVRDigits as the account no key
                    # -----------------------------------------------------------
                    nRet = RunQuery( hDBHandle, "AccountNo", "=", GetIVRDigits
45          (hTelHandle))
                            println " "
                            println "Customer ID = " + GetIVRDigits( hTelHandle )
                            println "Name    = " + GetStringFieldValue( hDBHandle, "LastName")
            + ", " + GetStringFieldValue( hDBHandle, "FirstName")
```

021271.0105 ENT APPLICATION

219

```
                        # If the Query returned return OK, then print out the customer
        information
                        if ( nRet == RETOK ) then
                                if ( GetStringFieldValue( hDBHandle, "ForceExtension"
        "") then
                                        println "Routing on Force Extension = "
        GetStringFieldValue(hDBHandle, "ForceExtension")
                                        nRet    =    SetRouteSelected(    hTelHandle
        GetStringFieldValue(hDBHandle, "ForceExtension")
                                        nRet = SetPriorityCall( hTelHandle, 0)
                                        println "RouteFinal = " + RouteFinal( hTelHandle )
                                else
                                        if (GetNumericFieldValue (hDBHandle, "AcctBal"
        10000 ) then
                                                println "Account Balance > 10000 of = "
        GetNumericFieldValue( hDBHandle, "AcctBal")
                                                nRet  =  SetRouteSelected(  nTelHandle
        HIGHBAL_RTE)
                                                nRet = SetPriorityCall( hTelHandle, 0)
                                                println "RouteFinal = " + RouteFinal
        (hTelHandle )
                                        else
                                                println "Default routing, acct balance
        <10000 of = " + GetNumericFieldValue( hDBHandle, "AcctBal")
                                                nRet  =  SetRouteSelected(  hTelHandle
        DEFAULT_RTE)
                                                nRet = SetPriorityCall( hTelHandle, 0)
                                                println "RouteFinal = "+ RouteFinal
        (hTelHandle )
                                        endif
                                endif
                        else
                                println "Query returned an error of " + nRet
                                nRet = SetRouteSelected( hTelHandle, DEFAULT_RTE
                                nRet = SetPriorityCall( hTelHandle, 0)
                                println "RouteFinal = " + RouteFinal( hTelHandle
                        endif # else query returned an error
                endif # else not after hours
                endif # else valid handles GetCurrentTime(hTimeHandle)

println "End Script at " + GetAscTime(hTimeHandle)
                nRet = DestroyDBHandle( hDBHandle )

nRet = DestroyTimeHandle( hTimeHandle )
```

021271.0105                                           PATENT APPLICATION
                              220

SAMPLE#3

```
     #-----------------------------------------------------------------
     #      Test Script Name:  LookAh.ICR
 5   #
     #      Test Script Description: This script tests the telephony look ahead
     #                               functions.
     #                    GetLookAheadType
     #                    GetLookAheadPriority
10   #                    GetLookAheadHours
     #                    GetLookAheadMinutes
     #                    GetLookAheadSeconds
     #                    GetLookAheadSrcVDN
     #-----------------------------------------------------------------
15   #define variables
     global $0, $1           # $0 is the name of the script, $1 is the script
     identification number local  hDBHandle        # Handle to the DataBase
20   local  hTelHandle       # Telephony handle
     local  hTimeHandle      # Time handle
     local  nRet             # Return Value variable
     local  queryStr         # Query String to pass in to Query DB
     local  RETOK            # To be set to 0 for return OK from function calls
25   local  INVALID_HNDL     # To be set to 0 for return of invalid handle
     local  DEFAULT_RTE      # Set to default VDN or extension to route to when
     a critical error occurs
     local  OTHER_RTE 30   #initialize variables
     RETOK = 0
     INVALID_HNDL = 0
     DEFAULT_RTE = "2201"
     OTHER_RTE = "3008"
35
     # Create DataBase, Telephone, and Time Handles
     hDBHandle = CreateDBHandle( )
     hTelHandle = ICRLAtoi($1)
     hTimeHandle = CreateTimeHandle( )
40
     # If unable to create a database handle or telephony handle, then route to
     default location
            if ( hDBHandle == INVALID_HNDL Or hTelHandle == INVALID_HNDL ) then
                    nRet = SetRouteSelected( hTelHandle, DEFAULT_RTE)
45                  nRet = SetPriorityCall( hTelHandle, 0
                    nRet = RouteFinal( hTelHandle )
            else
                    # logic for valid state
                            println"VDN = " + GetVDN(hTelHandle)
```

021271.0105                                                    PATENT APPLICATION

221

```
                println"LookAheadType = " + GetLookAheadType(hTelHandle)
                println"Look Ahead Priority = " + GetLookAheadPriority(hTelHand
                println"Look Ahead Hours = " + GetLookAheadHours(hTelHandle)
                println"Look Ahead Minutes = " + GetLookAheadMinutes(hTelHand
5               println"Look Ahead Seconds = " + GetLookAheadSeconds(hTelHand
                println"Look Ahead Src VDN = " + GetLookAheadSrcVDN(hTelHand
            nRet = SetRouteSelected( hTelHandle, OTHER_RTF)
            nRet = SetPriorityCall( hTelHandle, 0)
            nRet = RouteFinal( hTelHandle )
10      endif
            nRet = DestroyDBHandle( hDBHandle )
            nRet = DestroyTimeHandle( hTimeHandle )
```

APPENDIX C—TERMS AND ACRONYMS

The terms listed here in Table 17 are defined according to their meaning as related to the Intelligent Information Router.

TABLE 17

| | |
|---|---|
| ACD | (Automatic Call Distribution) Phone system designed to answer incoming calls and distribute the calls based on instructions in the database. |
| Administrator | Designated person who is responsible for defining Call Treatment Tables and other program setup features. |
| Agent | Person who is a member of an ACD split extension. |
| Agent Instrument | Physical device, usually a telephone or a headset. |
| Agent Status | Current status of an Agent (Logged In/Out, Work Ready/Not Ready, etc.). |
| ANI | (Automatic Number Identification) The information passed to the switch, identifying incoming calls. If you also have Caller ID, you can then view the ANI. |
| Busy Hour | Hour of the day during which a telephone system carries the most traffic. |
| Call Treatment | see Call Vector. |
| Call Vector | Method that manages inbound calls via the use of routing tables. |
| Caller ID | Service provided by the local and long distance phone companies that identifies and displays information (name and phone number) about an incoming call. See also ANI. |
| CDR | (Call Detail Record) Telephone system feature which collects and records information on phone calls, such as phone number, duration, time, date. |
| CNE | (Certified NetWare Engineer) Designation awarded by Novell, Inc. to persons who pass the Novell rating. |
| CTT | (Call Treatment Table [see Call Vector]) |
| DEFINITY | AT&T brand of telephone switching systems. |
| DNIS | (Dialed Number Identification Service) For 800 numbers, this service identifies the number the caller dialed for routing purposes. |
| EAS | (Expert Agent Selection) |
| GUI | (Graphical User Interface) Standard Windows presentation of application information. |
| Hunt Group | Ordered group of stations. |
| IIR | (Intelligent Information Router) Telephony application that routes incoming calls based on a rules database. |
| IIR Client | IIR system components that run on Windows desktop computers. |
| IIR Administrator | IIR-defined Administrator. |
| IIR Agent | IIR-defined call center Agents. |
| IIR_Route | Call routed via the IIR engine (also see IIR Rule). |
| IIR Server | IIR system components that run on network servers. |
| II Digits | Call origination Digits/Identification |
| ISDN | (Integrated Services Digital Network) |
| IVR Digits | Interactive Voice Response information collected during call vectoring (i.e. prompted or collected digits) |
| NLM | (Netware Loadable Module) |
| Novell NetWare | Novell's network server software. |
| PBX | (Private Branch Exchange) Telephone system within an organization, which supports and operates all the phones and the telephony switch. |
| PBX_Route | Call routed via the DEFINITY PBX (also see PBX vector) see IIR. |
| Router | |
| Routing Path | The flow (path) a call takes to arrive at final desination. |
| Rule | Defined set of trigger events and match criteria. |
| Station | Physical location of an Agent and Agent instrument. |
| Step | Single process/function in Rule. |
| Switch | Electronic device that runs the telephone system and PBX. For example, DEFINITY is the AT&T switch. |
| Telephony Server | Networked server running Novell's NetWare Telephony Services software. |
| UUI | (User-to-user Information) |
| VDN | Vector Directory Number |
| Vector | Routing table containing a set of instructions that is used to process incoming calls. |

TABLE 17-continued

| | |
|---|---|
| | PBX vector indicates processing is performed in the switch. IIR Rule indicates processing is performed in the IIR. |
| Windows NT ® | Microsoft's network server software. |

APPENDIX D—ERROR MESSAGES AND CODES

The following description of error messages and codes answers common questions about installing and using the Intelligent Information Router.

IIR Simulator Errors as Shown in Table 18

Important: Win 32s is required to run the IIR Simulator. Make sure that you have correctly installed Win 32/s before attempting to run the IIR Simulator.

TABLE 18

| Error Message | Resolution |
|---|---|
| Runtime Error: Unknown function: TelSimulate | The Simulator did not start correctly. Stop the application and restart. You should see messages similar to the following in the output window: AutoInit in progress. ICRMSG load succeeded. ICRDB load succeeded. DBinit Succeeded. ICRTEL load succeeded. ICRTelInitialize returned 0. AutoInit Done. Resolve the error before continuing. |
| DBInit failed. | When the Simulator starts, the software connects to the Btrieve database referenced in the ASI.INI file. If this process fails, you will see a DBInit failed message. This message will be followed by an error Return Code. If the return code is −1 to −2000, it is a Btrieve error. Refer to your Btrieve manual for more information. If the any other value is returned, it is an IIR error. Common problems: Verify that the IIRS Simulator Database section in your ASI.INI file (located in your windows directory) references the correct location, and that a database exists in that location. (Btrieve error 12) If your database is on a network drive, verify that you still have access to that drive. (Btrieve error 12) Make sure that Btrieve is running on the system that owns the drive referenced as your database location. For a local database, you must be running Btrieve on your workstation. (Btrieve error 20) |
| Ran out of memory allocating symbol pOS. | Your Windows resources are low. Close some of the applications that are running and restart Windows to clear this error. After you have freed some of your Windows resources, restart the IIR simulator. |
| Expected Delimiter, but got End-Of-File | Your script is missing a carriage return or a semicolon ";" after the last statement in your script. The IIR Script Language uses these delimiters to identify statements. Add a Carriage Return or ";" to the end of the last statement in your script. |
| Some of the Script statements are not being | This message occurs if you are passing the wrong type of parameter to a command. For example, When using the RunQuery command and you pass a 5 rather than "5", even if |

TABLE 18-continued

| Error Message | Resolution |
| --- | --- |
| executed; no error is returned. Strange things are happening. | the field you are matching against is a numeric field, you must pass the value enclosed in double quotation marks. Enclose all string parameters for all commands in double quotation marks, including integers, such as 5. Passing a string to a command that expects an integer will also cause unpredictable results. For instance, if you are using the SetNumericFieldValue command and you pass "5" rather than 5, strange things may happen. Check all Command parameters and make sure that you are using the correct type. |
| RunTime error Symbol "your variable" not initialized. | One of the variables used as an input parameter to a command has never been assigned a value. For example, if you declare hDatabase as a variable, and you pass hDatabase to the RunQuery command without first executing hDatabase=CreateDatabaseHandle () you will see this message. Review your commands and make sure that all of the input parameters have been correctly initialized prior to execution of the command. |
| The Icon installed in the IIR Program Group for the Simulator is the Default DOS Application Icon. | When you try to start the application you get a DOS error. Win 32s must be installed before you can use the IIR Simulator. |

IIR Database Administration Tool as Shown by Table 19

Important: ODBC is required to run the Database Administration tool. Make sure that you have installed ODBC correctly and that you have an entry in your ODBC setup window (from the Windows Control panel) for ICRBTR.

TABLE 19

| Error Message | Resolution |
| --- | --- |
| Data source name not found. No default driver specified. | ODBC is required to run the Database Administration Tool. You may not have installed the ODBC drivers correctly. Check the ODBC drivers: Open the ODBC setup window from the Windows Control Panel. ICRBTR is the Data Source Name. The Database directory should point to the database location referenced in the IIR Simulator Database section of your ASI.INI file found in either your Windows directory for testing, or in the IIR database subdirectory on the IIR server for production setup. |
| Couldn't find object (unknown). | ODBC is required to run the Database Administration Tool. Open ODBC setup window from the Windows Control Panel. 1CRBTR is the Data Source Name. The Database directory should point to the database location referenced in the IIR Simulator Database section of your ASI.INI file found in your Windows directory for testing. Or the IIR/DbData subdirectory on the IIR server for production setup. 1. Verify that the ODBC directory points to a location that contains a File.DDF file. 2. Make sure that you have access to |

TABLE 19-continued

| Error Message | Resolution |
| --- | --- |
| | the drive that contains the File.DDF file. |

IIR Agent Tool as Shown by Table 20

Important: ODBC is required to run the Database Administration tool. Make sure that you have installed ODBC correctly and that you have an entry in your ODBC setup window (from the Windows Control panel) for ICRBTR.

TABLE 20

| Error Message | Resolution |
| --- | --- |
| Data source name not found no default driver specified. | ODBC is required to run the Database Administration Tool. Open ODBC setup window from the Windows Control Panel. ICRBTR is the Data Source Name. The Database directory should point to the database location referenced in the IIR Simulator Database section of your ASI.INI file found in your Windows directory for testing, or in the IIR/DbData subdirectory on the IIR server for production setup. |
| Error | Resolution |
| Couldn't find object (unknown). | ODBC is required to run the Database Administration Tool. Open ODBC setup window from the Windows Control Panel. ICRBTR is the Data Source Name. The Database directory should point to the database location referenced in the IIR Simulator Database section of your ASI.INI file found in your Windows directory for testing, or in the IIR/DbData subdirectory on the IIR server for production setup. 1. Verify that the ODBC directory points to a location that contains a File.DDF file. 2. Make sure that you have access to the drive that contains the File.DDF file. |

Error Codes as Shown by Table 21

Time Command Errors

TABLE 21

| Error Code | Description | Possible Resolution |
| --- | --- | --- |
| −6 | Invalid Handle | This error is returned from the Get Time commands which return integer values when the handle passed as input to the command was not a valid time handle. A time hande is created by using the CreateTimeHandle( ). The value returned from this command should be passed as an input parameter to all Get Time commands. |
| "<INVALID TIME>" | Invalid Time | This error is returned from the GetAscTime command, usually when the parameter passed to the command was not a valid time handle. A time handle is created by using the CreateTimeHandle( ). The value returned from this command |

TABLE 21-continued

| Error Code | Description | Possible Resolution |
|---|---|---|
| | | should be passed as an input parameter to all Get Time commands. |

Database Error Codes as Shown by Table 22

Database commands can return two types of errors: Btrieve Errors and IIR Errors. If the error code returned has a value of −1 to −2000, it is a Btrieve error. Some common Btrieve errors are listed below. Refer to your Btrieve Manuals for a complete listing of errors and resolutions. The error codes are listed in the Btrieve Manuals as positive rather than negative values.

TABLE 22

| Error Code | Description | Possible Resolution |
|---|---|---|
| −4 | The application cannot find the key value. | There are no records in the database that meet the match criterion you have specified in your RunQuery command. If this error is returned while running the Simulator, make sure that the IIR Simulator Database section of your ASI.INI file found in your windows directory point to the correct database. |
| −5 | The record has a key field containing a duplicate key value. | The database has a primary key defined, and the record being inserted or updated has a key value matching a record that already exists in the database. |
| −12 | Btrieve cannot find the specified file. | This usually means one of two things: The IIR Simulator Database section in your ASI.INI file located in your Windows directory is not correct. You no longer have access to that networked drive. |
| −18 | The disk is full. | You are out of space on the Drive where the database resides. If you are running the simulator, Check the IIR Simulator Database section of your ASI.INI file located in your windows directory to determine the database location. If this error was returned from the IIR, you need to free up space on the IIR drive. |
| −20 | The Record Manager or Requester is inactive. | This usually means that the database you are referencing resides on a machine that does not have Btrieve loaded. You either need to start Btrieve on that machine, or move the database to a machine where Btrieve is running. |

The following Table 23 contains a list of the IIR Database errors and possible resolutions:

TABLE 23

| Error Code | Description | Possible Resolution |
|---|---|---|
| −5001 | Out of Memory | If this error occurs while running the script under the simulator, then your Windows resources are low. You may need to stop some of the applications that are running and restart Windows to clear this error. Once you have freed some of your Windows resources, restart the IIR |

TABLE 23-continued

| Error Code | Description | Possible Resolution |
|---|---|---|
| | | simulator. If this error occurs when the script is run form the IIR, then IIR server is out of memory. It may be necessary to stop some of the other applications running on the machine to free up the necessary memory. If this problem happens repeatedly you may need to add more memory to the machine. |
| −5002 | Invalid File Name | The full path to the database file name must be 18 characters or less. Move your database to a directory structure with a shorter name, and update the IIR Simulator Database section in your ASI.INI file located in your Windows directory to point to the new location. You must stop and re-start the IIR simulator to pick up the new database path. |
| −5004 | Invalid Where Clause | One of the match condition parameters passed to the RunQuery command is invalid. Verify that all the match condition parameters passed to the RunQuery command are enclosed by double quotes. Even integer values must be enclosed by double quotes. Example: RunQuery (hDatabase, "Field16", "=", "5") |
| −5005 | Invalid Relational Operand | The relational operand used in the RunQuery command is not valid. Check to make sure that the RunQuery command is formatted properly. |
| −5006 | Field Name not Found | The Field Name used in the RunQuery command does not match the Field Names currently defined for the Database. Use the Database Administration tool to find out the currently defined Field Names. Make sure that the Database Administration tool points to the same database that the script is running against. Use the Windows Control Panel / ODBC setup to determine the database location for the Database Administration Tool (ICRBTR). If you are running the simulator, check the IIR Simulator Database section of the ASI.INI file found in your Windows directory. If you encountered this error while running from the IIR, point the Database Administration tool to the production database located in the IIR/dbdata subdirectory on the IIR server. Notes: If you change the Database Field Names, you must stop and re-start the simulator and IIR NLM before the new Field Names are available to a script. Database Field Names are case sensitive. Make sure the Field Names used in the Script match exactly the Field Names defined in the Database Administration Tool |
| −5008 | Invalid Handle | The database handle passed in the Command is invalid. Use the CreateDbHandle command to create the database handle to be used in Database commands. If you are using a handle that was created by the CreateDbHandle command, make sure that your script is not altering |

TABLE 23-continued

| Error Code | Description | Possible Resolution |
|---|---|---|
| | | the value of the variable. Make sure you are using double equal signs ("==") for all comparison operations. A single = will change the value of the variable on the left. |
| −5009 | Not Implemented | This command has not yet been implemented. Remove this command from your script. |
| −5006 | Field Name not Found | The Field Name used in the RunQuery command does not match the Field Names currently defined for the Database. Use the Database Administration tool to find out the currently defined Field Names. Make sure that the Database Administration tool points to the same database that the script is running against. Use the Windows Control Panel / ODBC setup to determine the database location for the Database Administration Tool (ICRBTR). If you are running the simulator, check the IIR Simulator Database section of the ASI.INI file found in your Windows directory. If you encountered this error while running from the IIR, point the Database Administration tool to the production database located in the IIR/dbdata subdirectory on the IIR server. Notes: If you change the Database Field Names, you must stop and re-start the simulator and IIR NLM before the new Field Names are available to a script. Database Field Names are case sensitive. Make sure the Field Names used in the Script match exactly the Field Names defined in the Database Administration Tool |
| −5010 | Field Data Too Large | The database supports a maximum field size of 100 characters. Make sure that the Value passed in the SetStringFieldValue is not more than 100 characters. |
| −5011 | Label Database is Corrupted | The Labeldef.DTA file has been corrupted. If running the simulator, verify that the IIR Simulator Database section in the ASI.INI file in your windows directory points to the correct location. If this is correct, it may be necessary to restore this file from a backup. This file contains the Field Names for the database. If you do not have a backup of this file, you will need to perform the following steps to create an empty Labeldef.DTA file. 1. Backup your production database. 2. Re-install the IIR NLM. This will create an empty database. 3. Save off the empty Labeldef.DTA file. 4. Restore the previously backup database. 5. Copy the empty Labeldef.DTA file over the corrupted file. 6. Use the Database Administration Tool to define your database labels. |
| "<INVALID STRING>" | GetStringField Value failed | This error is returned from the GetStringFieldValue command. There are two common causes for this error: Database Handle passed is invalid. Check to see that your Database Handle is valid. Use the CreateDbHandle command to create the database handle. If your a handle was created by the CreateDbHandle command, make sure that your script is not altering the value of the variable. Use "==" (double =) for all comparison operations. A single = will change the value of the variable on the left. The Field Name passed is not a valid field name in the database. Use the Database Administration tool to see the currently defined Field Names. The Database Administration tool must point to the same database that the script is running against. Use the Windows Control Panel / ODBC setup to determine the database location for the Database Administration Tool (ICRBTR). If you are running the simulator, check the IIR Simulator Database section of the ASI. INI file found in your Windows directory. If this error was encountered while running from the IIR, point the Database Administration tool to the Notes: If you change the Database Field Names, you must stop and re-start the simulator and IIR NLM before the new Field Names are available to a script. Database Field Names are case sensitive. Make sure the Field Names used in the Script match exactly the Field Names defined in the Database Administration Tool |
| −99999 | GetNumericFieldValue failed | This error is returned from the GetNumericFieldValue command. There are two common causes for this error: Database Handle passed is invalid. Check to make sure that the Database Handle you are passing is a valid handle. Use the CreateDbHandle command to create the database handle. If you are using a handle that was created by the CreateDbHandle command, make sure that your script is not altering the value of the variable. Make sure you are using "==" (double =) for all comparison operations. A single = will change the value of the variable on the left. The Field Name passed is not a valid field name in the database. Use the Database Administration tool to find out the currently defined Field Names. Make sure that the Database Administration tool is pointed to the same database that the script is running against. Use the Windows Control Panel ODBC setup to determine the database location for the Database Administration Tool (ICRBTR). If you are running the simulator, check the IIR Simulator Database section of the ASI.INI file found in your Windows directory. If this error was encountered while running from the IIR, point the Database Administration tool to the production database located in the IIR/DBDATA sub-directory on the IIR server. Notes: |

TABLE 23-continued

| Error Code | Description | Possible Resolution |
|---|---|---|
| | | If you change the Database Field Names, you must stop and re-start the simulator and IIR |

Telephony Error Codes

Telephony commands can return four types of errors: Local ACS Errors, Tserver ACS Errors, Tserver CSTA Errors, and IIR Errors. Note: Any object used as the Destination for a Route command is considered a device. The device may be a VDN, Agent Extension, Agent Login ID, or Hunt Group. All Devices must be administered using the Telephony Services Administration tool before they are recognized by the IIR.

VDNs used to accept Inbound calls and VDNs used as the destination of a RouteMore command must have Route Sessions initiated before being recognized by the IIR. Use the VDN Administration Tool to start and stop Route Sessions.

Local ACS Errors

If the error code returned has a value of −1 to −99, it is a Local ACS error. Refer to your Telephony Services Manuals for a description and resolution.

Tserver ACS Errors

If the error code returned has a value of 100 to 1999, it is a Tserver ACS Error. Refer to your Telephony Services Manuals for a description and resolution. The errors are listed in the Telephony Services manual under an Error Code that is 100 less than the error code returned by the IIR. In Example 29, if 100 is returned by the IIR, look for 0 in the Telephony Services Manuals.

Example 29

| Error Code | Description | Possible Resolution |
|---|---|---|
| 127 | TSAPI (27) No Device Record Found. | This error usually means that the Device (VDN, Agent Extension, Agent Login, Hunt Group) has not been setup using the Telephony Service Administration Tool. All devices must be administered using the Telephony Services Administration tool before they are recognized by the IIR. This includes Agent Login Ids, Agent Extensions, VDNs and Huntx Groups. |

CSTA Tserver Errors

If the error code returned has a value of 2000 to 2999, it is a Tserver CSTA Error. Some common CSTA errors are listed below. Refer to your Telephony Services manuals for a complete listing of errors and resolutions. The errors are listed in the Telephony Services manual under an Error Code that is 2000 less than the error code returned by the IIR. In Example 30, if 2000 is returned by the IIR, look for 0 in the Telephony Services Manuals.

Common CSTA Errors

Example 30

| Error Code | Description | Possible Resolution |
|---|---|---|
| 2012 | TSAPI (12) An invalid | This error can be returned from any Telephony Command which requires a |
| | device identifier has been specified in the device parameter. | devices as an input parameter. For example, QueryAgentState requires a valid agent extension as an input parameter. If the input parameter is not a valid agent extension, this error will be returned. All devices must be administered using the Telephony Services Administration tool before they are recognized by the IIR. This includes Agent Login Ids, Agent Extensions, VDNs and Hunt Groups. |
| 2044 | (TSAPI 44) The specified routing device already has a registered routing server. | This error can be returned when the IIR is trying to initiate a routing session for a VDN. If there is already a routing session in process for that VDN, the a request will fail. You must stop the session that is already in process before you can initiate a new session for that VDN. |

IIR Telephony Errors

The following Table 24 contains a list of the IIR Telephony errors and possible resolutions:

TABLE 24

| Error Code | Description | Possible Resolution |
|---|---|---|
| −4000 | Generic Failure | An unexpected error has occurred. It may be necessary to stop and restart the IIR. If this problem happens repeatedly contact Technical Support. |
| −4001 | Invalid Telephony Handle | The telephony handle passed in the Command is invalid. Use the TELAtoi command to convert the $1 parameter to the telephony handle to be used in Telephony commands. If you are using a handle that was created by the TELAtoi command, make sure that your script is not altering the value of the variable. Make sure you are using "==" (double=) for all comparison operations. A single will change the value of the variable on the left. |
| −4002 | Invalid parameter | One of the parameters passed to the command is invalid. Make sure that all of the parameters are of the appropriate type, Strings, Integers or Variables. |
| −4003 | Wait Structure Allocate Failure | The IIR server is out of memory. It may be necessary to stop some of the other applications running on the machine to free up the necessary memory. If this problem happens repeatedly you may need to add more memory to the machine. |
| −4004 | Event Allocate Failure | The IIR server is out of memory. It may be necessary to stop some of the other applications running on the machine to free up the necessary memory. If this problem happens repeatedly you may need to add more memory to the machine. |
| −4005 | Ini file failure | IIR is unable to read/write necessary information to the CTI.CFG file. Verify that the file exists on the IIR server and that the information in the file is correct. If the problem persists it may be necessary to restore this file from a Backup, or re-install the IIR NLM. |
| −4006 | Begin Thread Failure | The IIR server is out of memory. It may be necessary to stop some of the other applications running on the machine to free up the necessary memory. If this problem happens repeatedly you may need to add more memory to the machine. |
| −4007 | Wait on Event Time out | The command did not receive the expected response event within 10 seconds. This |

TABLE 24-continued

| Error Code | Description | Possible Resolution |
|---|---|---|
| | | normally means there is some type of problem with the Tserver. It may be necessary to stop and start the Tserver and IIR server to correct the problem. |
| −4008 | No Valid ACS connection | The IIR has lost it's telephony connection. It automatically tries to reconnect based on the settings in the CTI.CFG file. |
| −4009 | Memory Allocation Failed | The IIR server is out of memory. It may be necessary to stop some of the other applications running on the machine to free up the necessary memory. If this problem happens repeatedly you may need to add more memory to the machine. |
| −4010 | VDN Record Not Found | You are trying to stop a session for a VDN that currently has no routing session established. Use the Refresh option of the VDN Administration tool to re-sync the display with the IIR setup. If you still have a problem, you need to stop and re-start the VDN Administration tool. If the problem persists it may be necessary to stop and re-start the IIR. |
| −4011 | VDN Record Already Exists | You can have only one routing session for each VDN. A script can be associated with multiple VDNs, but a VDN can be associated with only one script. Make sure that the VDN you are trying to define is not already defined. If you do not see an entry for the VDN, use the refresh option to re-sync the display with the IIR setup. If you still have a problem, you need to stop and re-start the VDN Administration tool. If the problem persists it may be necessary to stop and re-start the IIR. |
| −4012 | Create Script Failed | This is an IIR runtime error. It is not returned in response to a command. If this error appears in the IIR log file, use the VDN administration tool to verify that the correct scripts are "turned on", and verify that these scripts exists in the IIR directory on the IIR server. If the VDN configuration is correct and the Scripts are located in the appropriate directory, try stopping and re-starting the session(s) for the script referenced in the Error Message. If this fails, it may be necessary to stop and re-start the IIR. |
| 4013 | Execute Script Failed | This is an IIR runtime error. It is not returned in response to a command. If this error appears in the IIR log file, use the VDN administration tool to verify that the correct scripts are "turned on". If the setup is correct, you may have a logic problem in your script. Use the Simulator to verify that your script logic is correct. If the script appears to be correct, try stopping and re-starting the VDN session(s) for the script referenced in the Error Message. If this fails, it may be necessary to stop and re-start the IIR. |

Miscellaneous Low Level Error Codes are Shown by Table 25

TABLE 25

| Error Code | Description | Possible Resolution |
|---|---|---|
| −200 | Unable to Open Log File | If you are running the Simulator, check the Log section of your ASI.INI file located in the windows directory to determine your Log File location. Make sure that you are Read/Write access to this Drive/File. If this error is returned as a Run Time error from the IIR, check Log section in the CTI.CFG file located on the IIR server to determine the log file location. Make sure that the IIR server has Read/Write access to this Drive/File. |
| −201 | Disk Full | If you are running the Simulator, check the Log section of ASI.INI file located in the windows directory to determine your Log File location. Make sure that disk space is available on this drive. If this error is returned as a Run Time error from the IIR, check Log section in the CTI.CFG file located on the IIR server to determine the log file location. Make sure that disk space is available on this drive. |
| −202 | Invalid Resource Name | Low level error. This error is usually accompanied by other errors in the log file which provide more specific information. |
| −203 | Invalid Resource Size | Low level error. This error is usually accompanied by other errors in the log file which provide more specific information. |
| −204 | Insufficient Memory | If this error occurs while running the simulator, then your Windows resources are low. You may need to stop some of the applications that are running and restart Windows to clear this error. Once you have freed some of your Windows resources, restart the IIR simulator. If this error occurs in the IIR, then IIR server is out of memory. It may be necessary to stop some of the other applications running on the machine to free up the necessary memory. If this problem happens repeatedly you may need to add more memory to the machine. |
| −205 | Invalid Handle | Low level error. This error is usually accompanied by other errors in the log file which provide more specific information. |
| −206 | Resource Not Found | Low level error. This error is usually accompanied by other errors in the log file which provide more specific information. |
| −207 | Resource Already Exists | Low level error. This error is usually accompanied by other errors in the log file which provide more specific information. |
| −208 | Semaphore Time-out | The RouteMore command uses Semaphores to control the amount of the IIR waits before terminating the command. A Semaphore time out in response to a RouteMore command means that the call did not complete the VDN processing and return to the IIR within the amount of time allowed. There are several possible reasons for this error: Make sure the RouteMoreTimer parameter in the IIRTEL section of the CTI.CFG file on the IIR server is set correctly. This parameter controls the number of seconds that |

TABLE 25-continued

| Error Code | Description | Possible Resolution |
|---|---|---|
| | | the IIR will wait before timing out the RouteMore request. The DestinationVDN used in the RouteMore request is not programmed to send the call back to the IIR. The caller terminated the call. |
| −209 | Semaphore already owned | Low level error. This error is usually accompanied by other errors in the log file which provide more specific information. |
| −210 | Semaphore not owned | Low level error. This error is usually accompanied by other errors in the log file which provide more specific information. |
| −211 | Invalid Resource Sign | Low level error. This error is usually accompanied by other errors in the log file which provide more specific information. |
| −212 | Resource Not Owned | Low level error. This error is usually accompanied by other errors in the log file which provide more specific information. |
| −213 | Resource is Owned | Low level error. This error is usually accompanied by other errors in the log file which provide more specific information. |
| −214 | Invalid Parameter | Low level error. This error is usually accompanied by other errors in the log file which provide more specific information. |
| −215 | Read Time-out | Low level error. This error is usually accompanied by other errors in the log file which provide more specific information. |
| −216 | Write Time-Out | Low level error. This error is usually accompanied by other errors in the log file which provide more specific information. |
| −217 | Message Truncated | Informational Message |
| −218 | Message File Missing | If this error is reported from the IIR Simulator, check the MsgFile keyword in the Log section of your ASI.INI file located in the windows directory. Make sure that this entry points the correct file. This is normally setup to point the CTIERR.MSG file located in the same directory as the IIR Simulator software. If this error is reported from the IIR NLM, check the MsgFile keyword in the Log section of the CTI.CFG file located in the IIR directory on the server. Make sure that this entry points the correct file. This is normally setup to point the CTIERR.MSG file located in the same directory as the IIR NLM software. |
| −219 | Message Read Error | Check the CTIERR.MSG file and make sure it has not been corrupted. It may be necessary to restore this file from a backup, or Re-Install the IIR software. If this error is reported from the IIR Simulator, check the MsgFile keyword in the Log section of your ASI.INI file located in the windows directory. Make sure that this entry points the correct file. This is normally setup to point the CTIERR.MSG file located in the same directory as the IIR Simulator software. If this error is reported from the IIR NLM, check the MsgFile keyword in the Log section of the CTI.CFG file located in the IIR directory on the server. Make sure that this entry points the correct file. This is normally setup to point the CTIERR.MSG file located in the same directory as the IIR NLM software. |
| −220 | Message Not Found | Informational Message. |
| −221 | Duplicate Handle | Low level error. This error is usually accompanied by other errors in the log file which provide more specific information. |
| −222 | Resource Removed | Low level error. This error is usually accompanied by other errors in the log file which provide more specific information. |
| −223 | Resource Allocate Failed | Low level error. This error is usually accompanied by other errors in the log file which provide more specific information. |
| −300 | Invalid Index | Low level error. This error is usually accompanied by other errors in the log file which provide more specific information. |
| −301 | Shared Blocks Exceeded | Low level error. This error is usually accompanied by other errors in the log file which provide more specific information. |
| −302 | Too Many Keys | Low level error. This error is usually accompanied by other errors in the log file which provide more specific information. |
| −303 | Invalid Key Length | Low level error. This error is usually accompanied by other errors in the log file which provide more specific information. |
| −304 | Record Too Small | Low level error. This error is usually accompanied by other errors in the log file which provide more specific information. |
| −305 | Record Too Large | Low level error. This error is usually accompanied by other errors in the log file which provide more specific information. |
| −306 | Allocate Record Failed | possible low memory situation. Low level error. This error is usually accompanied by other errors in the log file which provide more specific information. |
| −307 | Invalid Record Id | Low level error. This error is usually accompanied by other errors in the log file which provide more specific information. |
| −308 | Internal Error in Memory Database | possible low memory situation. Low level error. This error is usually accompanied by other errors in the log file which provide more specific information. |
| −309 | Maximum number of records exceeded | Low level error. This error is usually accompanied by other errors in the log file which provide more specific information. |
| −310 | Index already exists | Low level error. This error is usually accompanied by other errors in the log file which provide more specific information. |
| −311 | Duplicate Key | Low level error. This error is usually accompanied by other errors in the log file which provide more specific information. |
| −312 | Record Not Found | Low level error. This error is usually accompanied by other errors in the log file which provide more specific information. |
| −313 | Memory Database not locked | Low level error. This error is usually accompanied by other errors in the log file which provide more |

TABLE 25-continued

| Error Code | Description | Possible Resolution |
|---|---|---|
| | | specific information. |
| −314 | Read only memory database | Low level error. This error is usually accompanied by other errors in the log file which provide more specific information. |
| −315 | Failed to meet index criterion | Low level error. This error is usually accompanied by other errors in the log file which provide more specific information. |
| −316 | Invalid record buffer | Low level error. This error is usually accompanied by other errors in the log file which provide more specific information. |
| −317 | Not supported for Shared | Low level error. This error is usually accompanied by other errors in the log file which provide more specific information. |
| −318 | Owner no longer exists | Low level error. This error is usually accompanied by other errors in the log file which provide more specific information. |

What is claimed is:

1. An apparatus for routing an external event, comprising:

a telephony controller in communication with a telephone switching station, the telephony controller, in response to an external event of the telephone switching station, operable to create or retrieve a handle for the external event, the handle comprising a script identifier;

an external data manager in communication with an external link, the external data manager, in response to an external event of the external link, operable to create or retrieve a handle for the external event, the handle comprising a script identifier;

a script interpreter engine in communication with the telephony controller and the external data manager, the script interpreter engine, in response to receiving a script identifier, operable to create or retrieve a script handle associated with the script identifier, retrieve from a script storage a script associated with the script handle, and to invoke the script to render an output event for the external event; and a handle manager in communication with the telephony controller, the script interpreter engine, and the external data manager, the handle manager operable to store handles and script handles.

2. The apparatus of claim 1, further comprising a database system, the database system comprising:

a database controller in communication with the script interpreter engine and the handle manager, the database controller, in response to the output event, operable to access a database engine; and the database engine operable to access a database storage to retrieve database information associated with the external event.

3. The apparatus of claim 2, further comprising an agent station, the agent station comprising:

a communication link operable to receive the external event; and a display operable to display the database information associated with the external event.

4. The apparatus of claim 1, further comprising an administration station, the administration station comprising:

a router administrator operable to receive a simulator script;

a system simulator comprising;

a user interface operable to receive a simulator external event;

a simulator telephony controller in communication with the user interface, the simulator telephony controller, in response to an simulator external event for the user interface, operable to get a simulator handle associated with the simulator external event, the simulator handle comprising a simulator script identifier;

a simulator external data manager in communication with a simulator external link, the simulator external data manager, in response to a simulator external event from the simulator external link, operable to get a simulator handle associated with the simulator external event, the simulator handle comprising a simulator script identifier;

a simulator script interpreter engine in communication with the simulator telephony controller and the simulator external data manager, the simulator script interpreter engine, in response to receiving a simulator script identifier, operable to get a simulator script handle associated with the simulator script identifier, retrieve from a simulator script storage a simulator script associated with the simulator script handle, and to invoke the simulator script to render a simulator output event for said simulator external event;

a simulator handle manager in communication with the simulator telephony controller, the simulator script interpreter engine, and the simulator external data manager, the simulator handle manager operable to store simulator handles and simulator script handles; and the router administrator operable to download the simulator script as a script to the script storage.

5. The apparatus of claim 4, further comprising:

a database system, the database system comprising:

a database controller in communication with the script interpreter engine and the handle manager, the database controller, in response to the output event, operable to access a database engine;

the database engine operable to access a database storage to retrieve database information associated with the external event; and the administration station further comprising a database administrator operable to receive information and to download the information to the database storage.

6. The apparatus of claim 5, further comprising an agent station, the agent station comprising:

a communication link operable to receive the external event; and a display operable to display the database information associated with the external event.

7. The apparatus of claim 6, further comprising:

a network comprising:

a network interface in communication with the script interpretation engine and the handle manager; and a link coupled to the agent station, the administration station, and the network interface, the link operable to communicate between the agent station, the administration station, and the network interface.

8. The apparatus of claim 1, further comprising:

a time utility operable to commence and monitor time-based events;

a string parse utility operable to preform string searches and to parse data; and an input/output utility operable to access the script storage.

9. The apparatus of claim 1, the external event further comprising a telephony communication.

10. The apparatus of claim 1, the output event further comprising a telephony route select.

11. The apparatus of claim 1, the external event further comprising a stock price.

12. The apparatus of claim 1, the output event further comprising a buy/sell command.

13. The apparatus of claim 1, the script identifier further comprising a script file name.

14. The apparatus of claim 1, further comprising:
   the script handle comprising a reference count indicating a status of the script; and
   the handle manager operable to delete from the script storage a script having a script handle with a predefined reference count.

15. The apparatus of claim 1, further comprising:
   the script handle comprising a reference count;
   the script interpreter engine operable to adjust the reference count of the script handle to indicate a status of the script; and
   the handle manager operable to delete from the script storage a script having a script handle with a predefined reference count.

16. The apparatus of claim 1, further comprising:
   the script handle comprising a reference count indicating a status of the script;
   the script interpreter engine, in response to receiving a script identifier, operable to increment the reference count of the script handle associated with the script identifier;
   the script interpreter engine, in response to invoking the script, operable to decrement the reference count of the script handle associated with the script; and
   the handle manager operable to delete from the script storage a script having a script handle with a predefined reference count.

17. An apparatus for routing a telephone communication, comprising:
   a telephony controller in communication with a telephone switching station, the telephony controller, in response to a route request of the telephone switching station, operable to create or retrieve a handle for the route request, the handle comprising a script identifier;
   a script interpreter engine in communication with the telephony controller, the script interpreter engine, in response to receiving a script identifier, operable to create or retrieve a script handle for the script identifier, retrieve from a script storage a script associated with the script handle, and to invoke the script to render an output event for the telephony communication; and
   a handle manager in communication with the telephony controller and the script interpreter engine, the handle manager operable to store handles and script handles.

18. The apparatus of claim 17, further comprising a database system, the database system comprising:
   a database controller in communication with the script interpreter engine and the handle manager, the database controller, in response to the output event, operable to access a database engine; and
   the database engine operable to access a database storage to retrieve database information associated with the telephony communication.

19. The apparatus of claim 18, further comprising an agent station, the agent station comprising:
   a communication link operable to receive the telephony communication; and
   a display operable to display the database information associated with the telephony communication.

20. The apparatus of claim 17, further comprising an administration station, the administration station comprising:
   a router administrator operable to receive a simulator script;
   a system simulator comprising;
      a user interface operable to receive a simulator telephony communication;
      a simulator telephony controller in communication with the user interface, the simulator telephony controller, in response to an simulator telephony communication from the user interface, operable to get a simulator handle associated with the simulator telephony communication, the simulator handle comprising a simulator script identifier;
      a simulator script interpreter engine in communication with the simulator telephony controller and the simulator script interpreter engine, in response to receiving a simulator script identifier, operable to get a simulator script handle associated with the simulator script identifier, retrieve from a simulator script storage a simulator script associated with the simulator script handle, and to invoke the simulator script to render a simulator output event for said simulator telephony communication;
      a simulator handle manager in communication with the simulator telephony controller and the simulator script interpreter engine, the simulator handle manager operable to store simulator handles and simulator script handles; and
   the router administrator operable to download the simulator script as a script to the script storage.

21. The apparatus of claim 20, further comprising:
   a database system, the database system comprising:
   a database controller in communication with the script interpreter engine and the handle manager, the database controller, in response to the output event, operable to access a database engine;
   the database engine operable to access a database storage to retrieve database information associated with the telephony communication; and
   the administration station further comprising a database administrator operable to receive information and to download the information to the database storage.

22. The apparatus of claim 21, further comprising an agent station, the agent station comprising:
   a communication link operable to receive the telephony communication; and
      a display operable to display the database information associated with the telephony communication.

23. The apparatus of claim 22, further comprising:
   a network comprising:
      a network interface in communication with the script interpretation engine and the handle manager; and
      a link coupled to the agent station, the administration station, and the network interface, the link operable to communicate between the agent station, the administration station, and the network interface.

24. The apparatus of claim 17, further comprising:

a time utility operable to commence and monitor time-based events;

a string parse utility operable to preform string searches and to parse data; and an input/output utility operable to access the script storage.

25. The apparatus of claim 17, the output event further comprising a telephony route select.

26. The apparatus of claim 17, the script identifier further comprising a script file name.

27. The apparatus of claim 17, further comprising:

the script handle comprising a reference count indicating a status of the script; and the handle manager operable to delete from the script storage a script having a script handle with a predefined reference count.

28. The apparatus of claim 17, further comprising:

the script handle comprising a reference count;

the script interpreter engine operable to adjust the reference count of the script handle to indicate a status of the script; and the handle manager operable to delete from the script storage a script having a script handle with a predefined reference count.

29. The apparatus of claim 17, further comprising:

the script handle comprising a reference count indicating a status of the script;

the script interpreter engine, in response to receiving script identifier, operable to increment the reference count of the script handle associated with the script identifier;

the script interpreter engine, in response to invoking the script, operable to decrement the reference count of the script handle associated with the script; and the handle manager operable to delete from the script storage a script having a script handle with a predefined reference count.

30. A method of routing a telephone communication, comprising the steps of:

receiving a route request;

creating or retrieving a telephony handle for the route request;

using the telephony handle, determining a script identifier for the route request; and invoking a script associated with the script identifier to render an output event for the telephone communication.

31. The method of claim 30, further comprising the steps of:

creating or retrieving a script handle for the script identifier; and using the script handle to invoke the script.

32. The method of claim 30, wherein the output event comprises a telephony route select.

33. The method of claim 30, wherein the output event comprises a request for database records.

34. The method of claim 30, wherein the script identifier comprises a script file name.

35. A method of routing an external event, comprising the steps of:

receiving an external event;

creating or retrieving a handle for the external event;

using the handle, determining a script identifier for the external event; and invoking a script associated with the script identifier to render an output event for the external event.

36. The method of claim 35, further comprising the steps of:

creating or retrieving a script handle for the script identifier; and using the script handle to invoke the script.

37. The method of claim 35, wherein the external event comprises a telephony communication.

38. The method of claim 35, wherein the output event comprises a telephony route select.

39. The method of claim 35, wherein the external event comprises a stock price.

40. The method of claim 35, wherein the output event comprises a buy/sell command.

41. The method of claim 35, wherein the output event comprises a request for database records.

42. The method of claim 35, wherein the script identifier comprises a script file name.

* * * * *